April 11, 1944.  J. W. BRYCE  2,346,249
COMPOUND DENOMINATE NUMBER CALCULATING MACHINE
Filed Oct. 5, 1938  37 Sheets—Sheet 1

April 11, 1944.   J. W. BRYCE   2,346,249
COMPOUND DENOMINATE NUMBER CALCULATING MACHINE
Filed Oct. 5, 1938   37 Sheets-Sheet 2
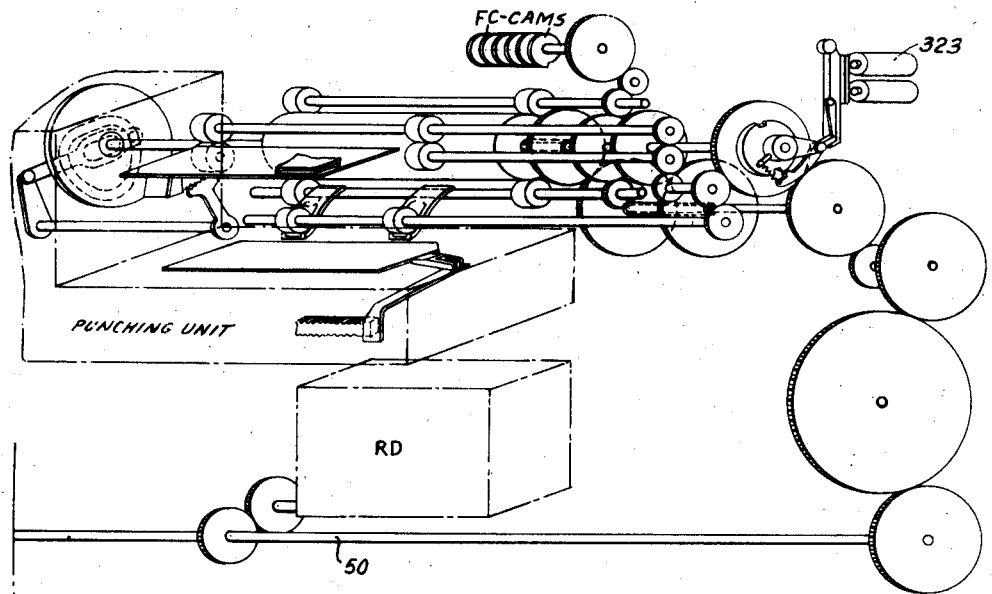
FIG. 1a.
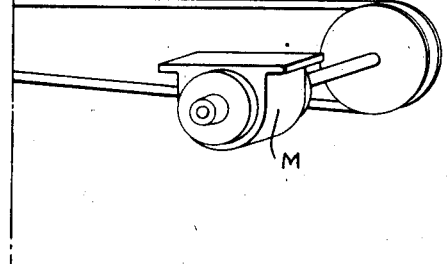
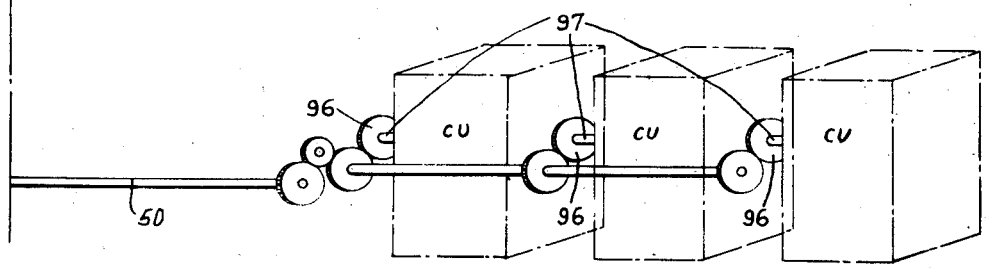
INVENTOR.
James W. Bryce
BY Cooper, Kerr & Dunham
ATTORNEYS April 11, 1944. J. W. BRYCE 2,346,249
COMPOUND DENOMINATE NUMBER CALCULATING MACHINE
Filed Oct. 5, 1938  37 Sheets-Sheet 3

INVENTOR.
James W. Bryce
BY Cooper, Kerr & Dunham
ATTORNEYS

April 11, 1944.  J. W. BRYCE  2,346,249
COMPOUND DENOMINATE NUMBER CALCULATING MACHINE
Filed Oct. 5, 1938  37 Sheets-Sheet 4

INVENTOR.
James W. Bryce
BY Cooper, Kerr & Dunham
ATTORNEYS

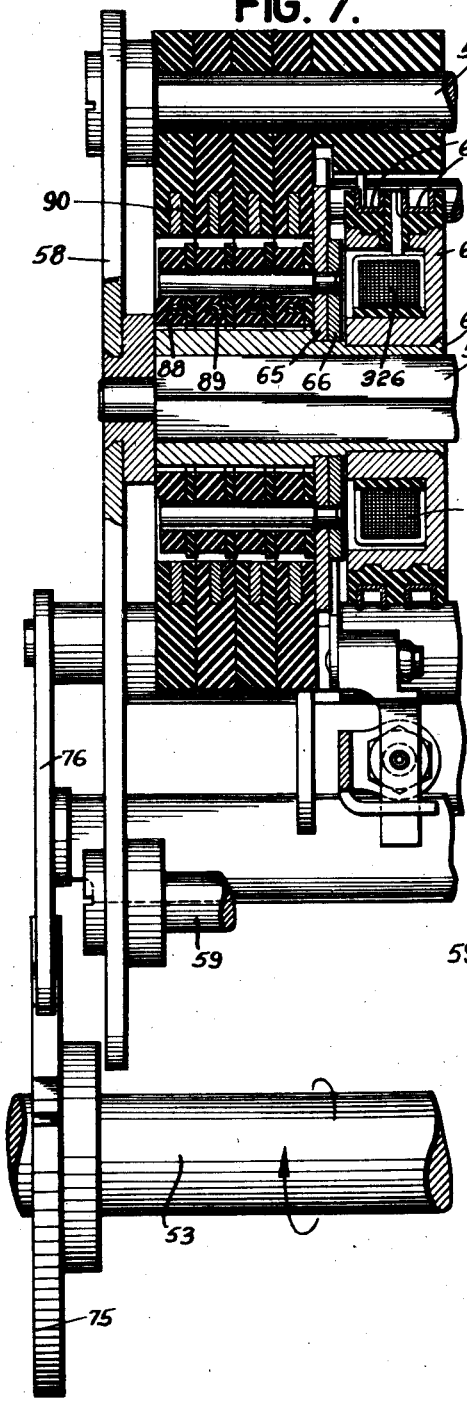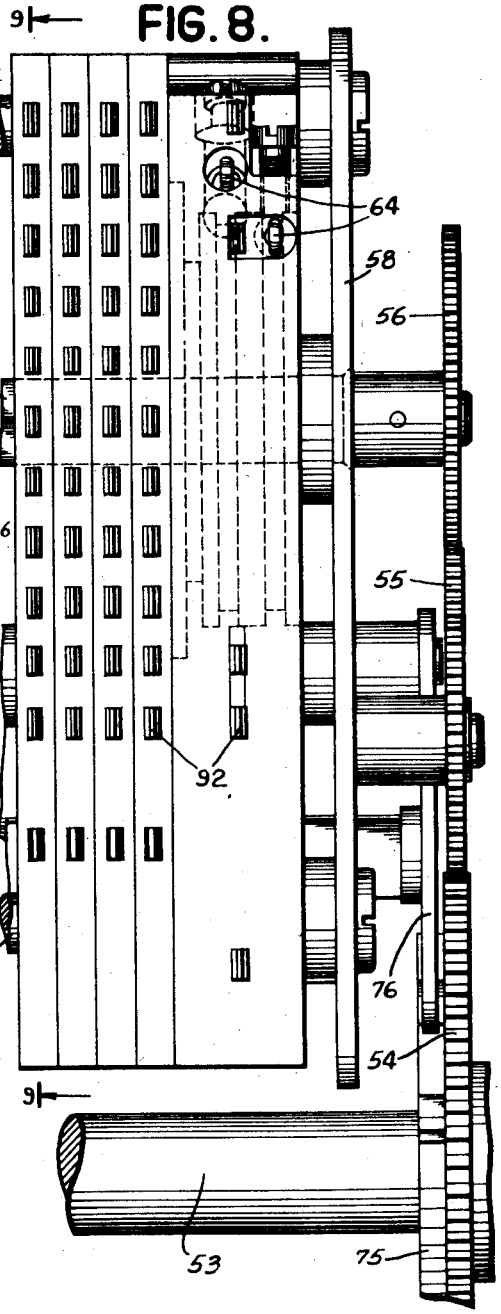

April 11, 1944.  J. W. BRYCE  2,346,249

COMPOUND DENOMINATE NUMBER CALCULATING MACHINE

Filed Oct. 5, 1938  37 Sheets-Sheet 6

INVENTOR.
James W. Bryce
BY
Cooper, Kerr & Dunham
ATTORNEYS

April 11, 1944.     J. W. BRYCE     2,346,249
COMPOUND DENOMINATE NUMBER CALCULATING MACHINE
Filed Oct. 5, 1938     37 Sheets-Sheet 7

INVENTOR
James W. Bryce
BY Cooper, Kerr & Dunham
ATTORNEYS

April 11, 1944.  J. W. BRYCE  2,346,249
COMPOUND DENOMINATE NUMBER CALCULATING MACHINE
Filed Oct. 5, 1938  37 Sheets-Sheet 8

INVENTOR.
James W. Bryce
BY Cooper, Kerr & Dunham
ATTORNEYS

April 11, 1944.    J. W. BRYCE    2,346,249
COMPOUND DENOMINATE NUMBER CALCULATING MACHINE
Filed Oct. 5, 1938    37 Sheets-Sheet 9
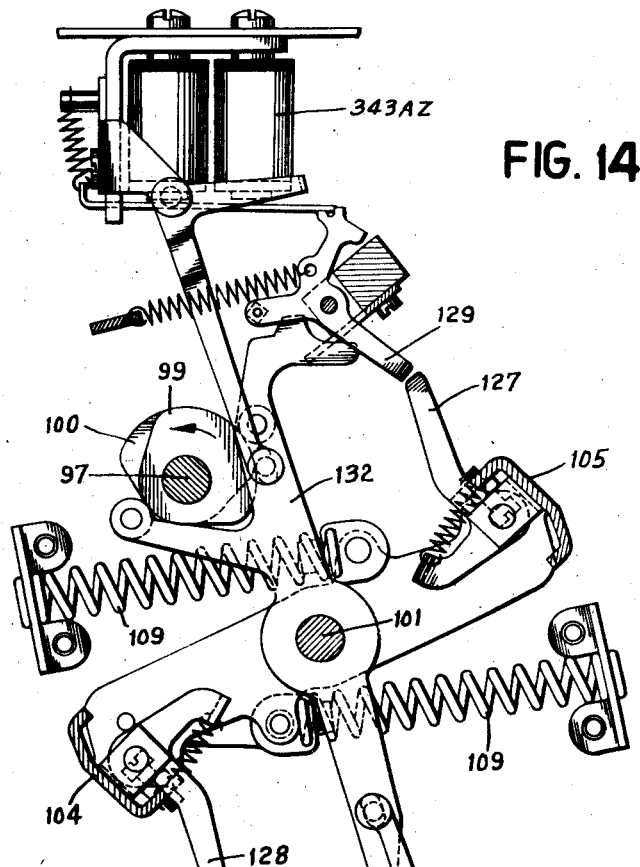
FIG. 14.
FIG. 24.
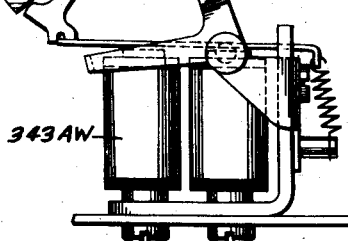
| | | FIG. 23a. |
|---|---|---|
| | FIG. 22b. | FIG. 23b. |
| FIG. 21c. | FIG. 22c. | FIG. 23c. |
| FIG. 21d. | FIG. 22d. | FIG. 23d. |
| FIG. 21e. | FIG. 22e. | FIG. 23e. |
| FIG. 21f. | FIG. 22f. | FIG. 23f. |
INVENTOR.
James W. Bryce
BY Cooper, Kerr & Dunham
ATTORNEYS April 11, 1944. J. W. BRYCE 2,346,249
COMPOUND DENOMINATE NUMBER CALCULATING MACHINE
Filed Oct. 5, 1938 37 Sheets-Sheet 10
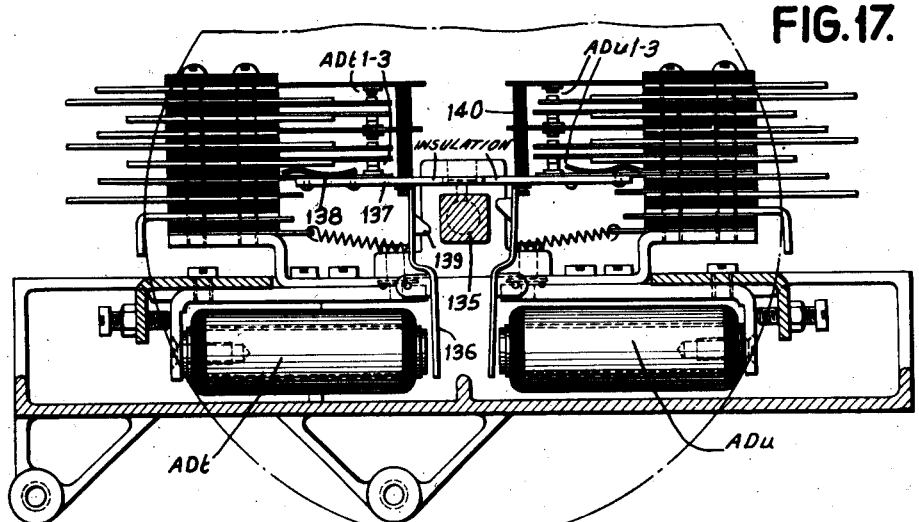
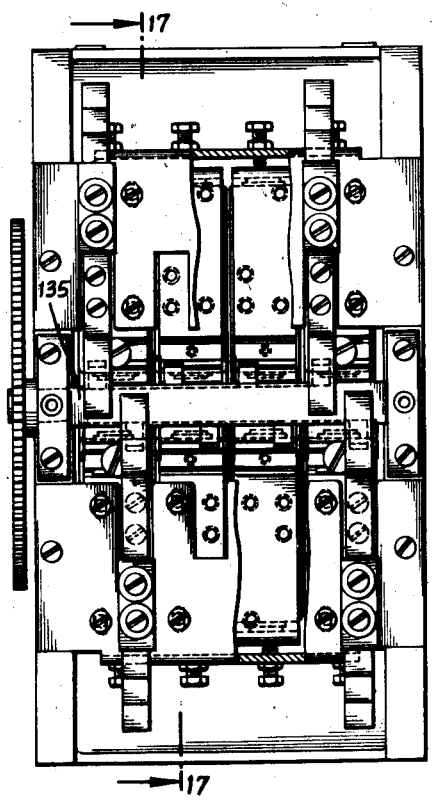
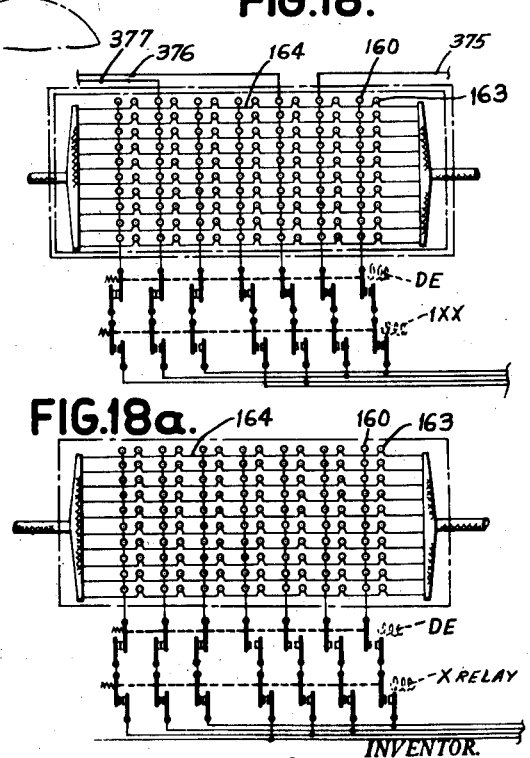
INVENTOR.
James W. Bryce
BY Cooper, Kerr + Dunham
ATTORNEYS April 11, 1944.  J. W. BRYCE  2,346,249
COMPOUND DENOMINATE NUMBER CALCULATING MACHINE
Filed Oct. 5, 1938    37 Sheets-Sheet 11

INVENTOR.
James W. Bryce
BY Cooper, Kerr & Dunham
ATTORNEYS

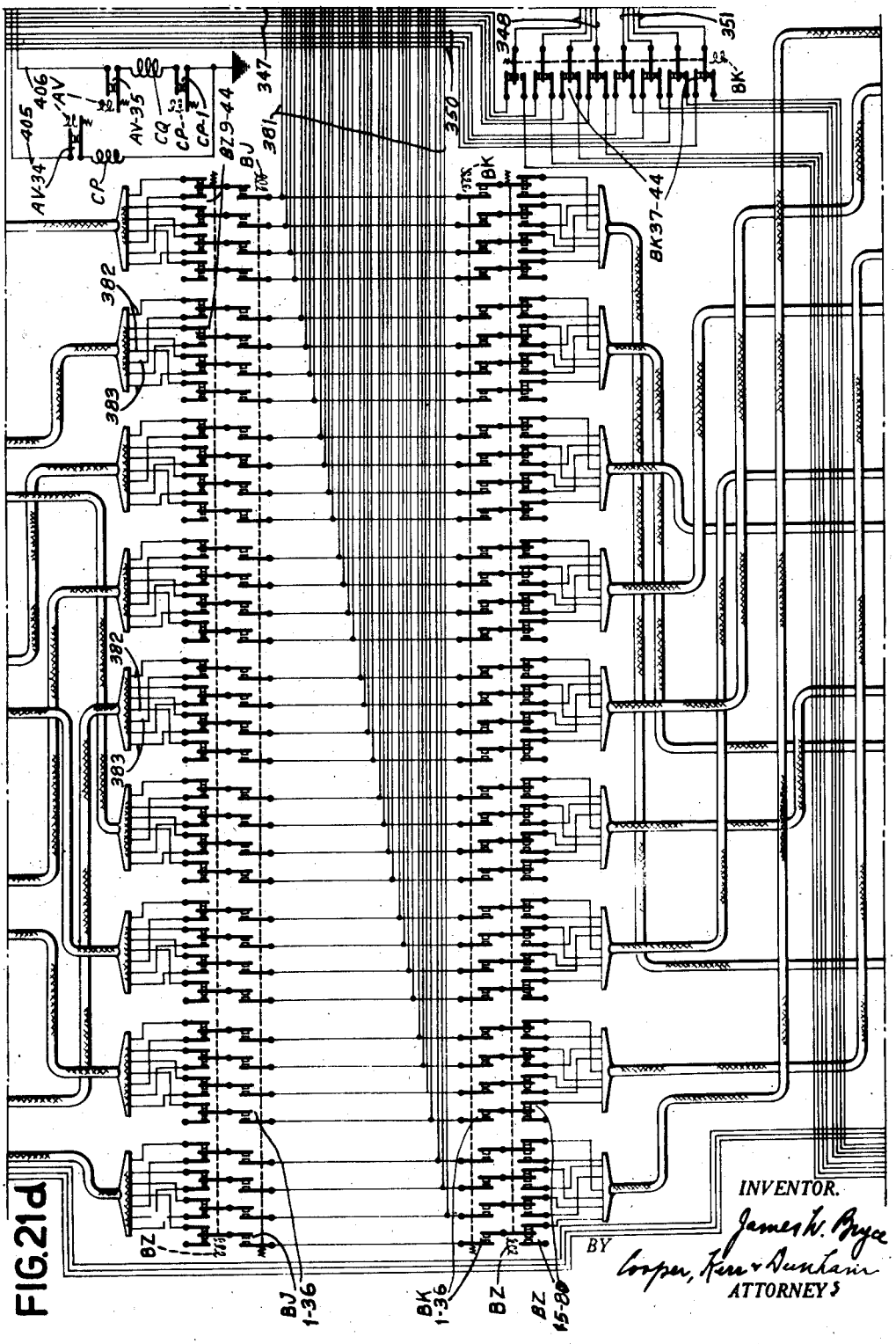

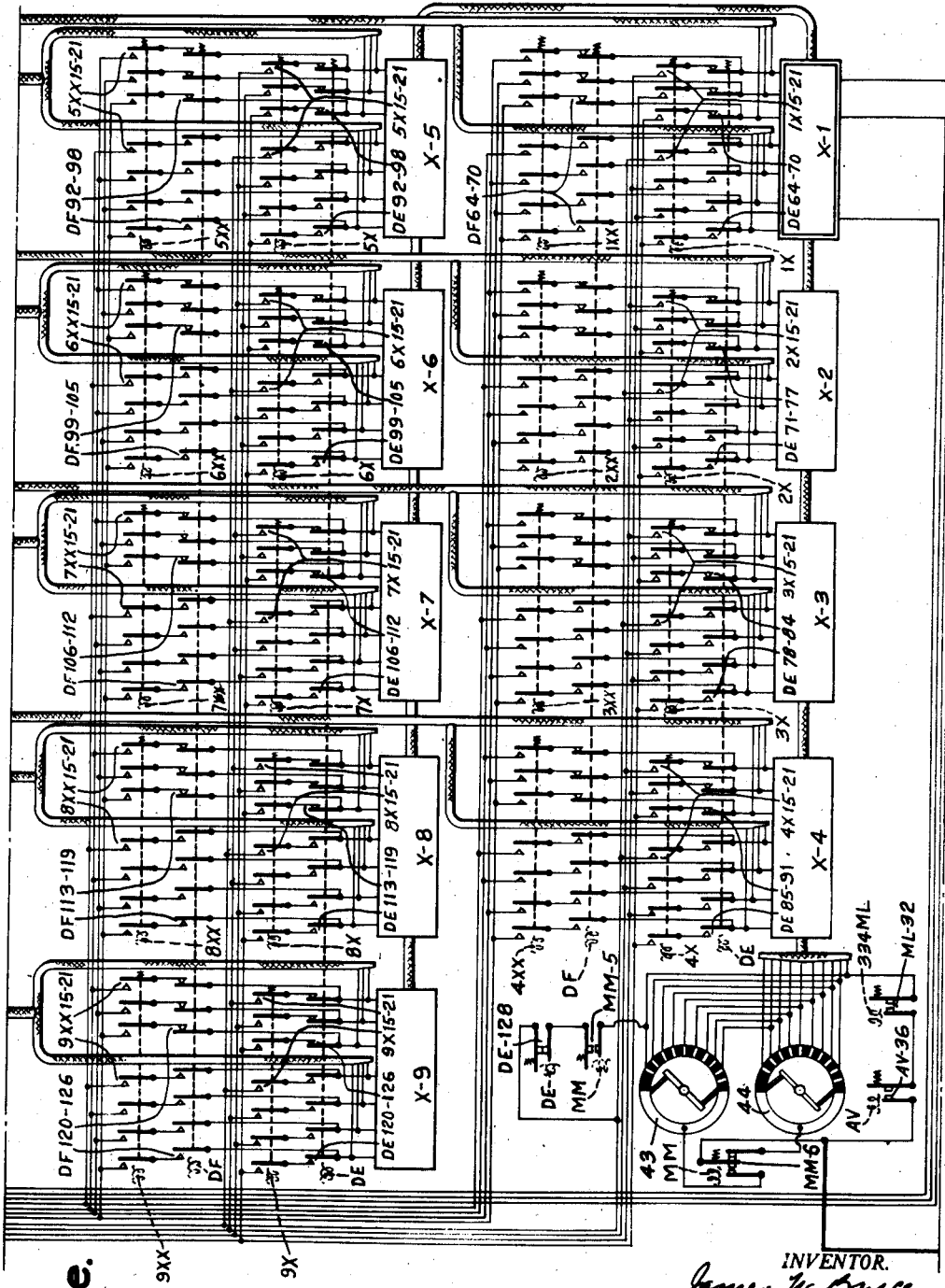

April 11, 1944.  J. W. BRYCE  2,346,249
COMPOUND DENOMINATE NUMBER CALCULATING MACHINE
Filed Oct. 5, 1938  37 Sheets-Sheet 15

INVENTOR.
James W. Bryce
BY Cooper, Kerr & Dunham
ATTORNEYS

April 11, 1944.   J. W. BRYCE   2,346,249
COMPOUND DENOMINATE NUMBER CALCULATING MACHINE
Filed Oct. 5, 1938   37 Sheets-Sheet 17

INVENTOR.
James W. Bryce
BY Cooper, Kerr & Dunham
ATTORNEYS

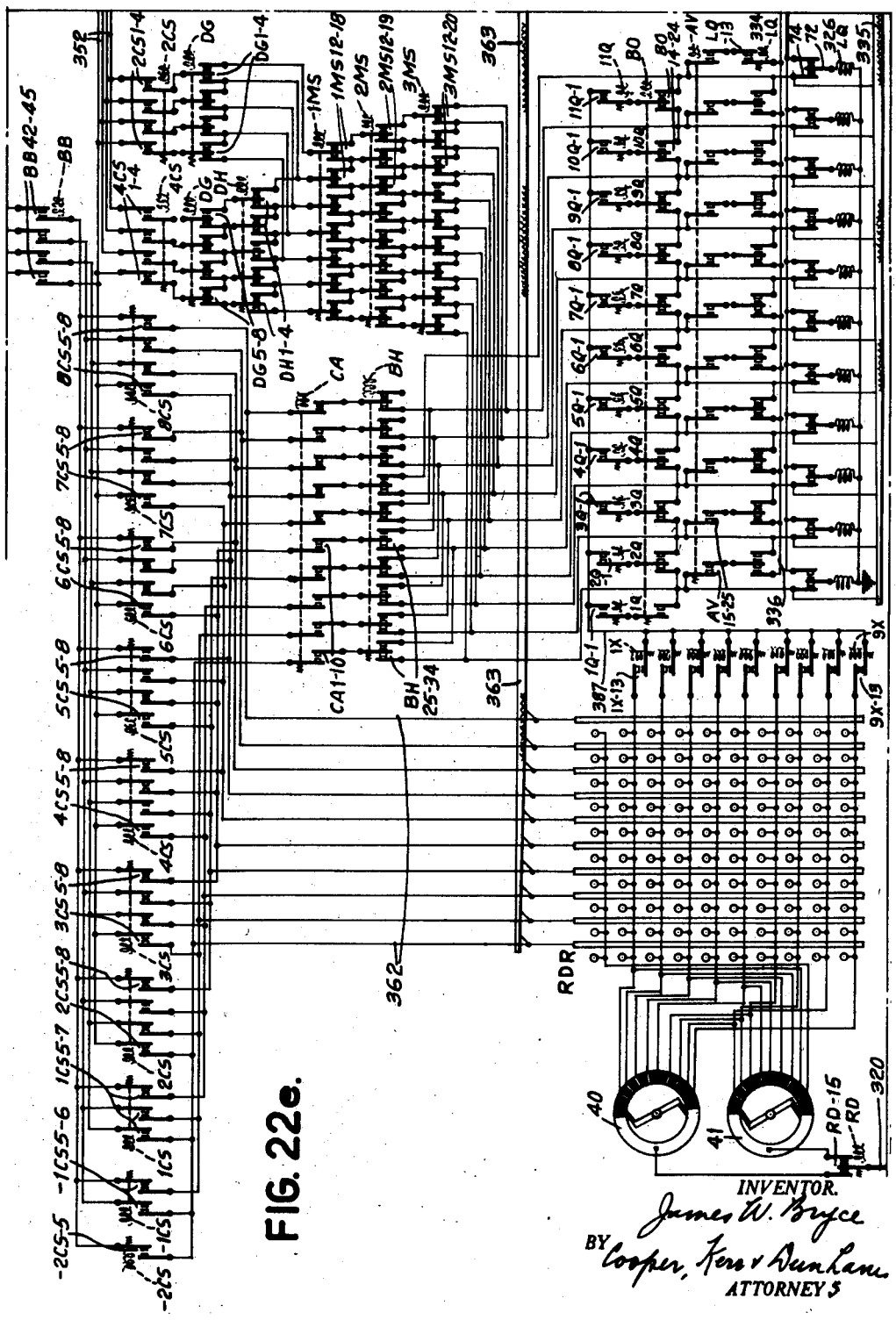

April 11, 1944.   J. W. BRYCE   2,346,249
COMPOUND DENOMINATE NUMBER CALCULATING MACHINE
Filed Oct. 5, 1938   37 Sheets-Sheet 20

INVENTOR.
James W. Bryce
BY Cooper, Kerr & Dunham
ATTORNEYS

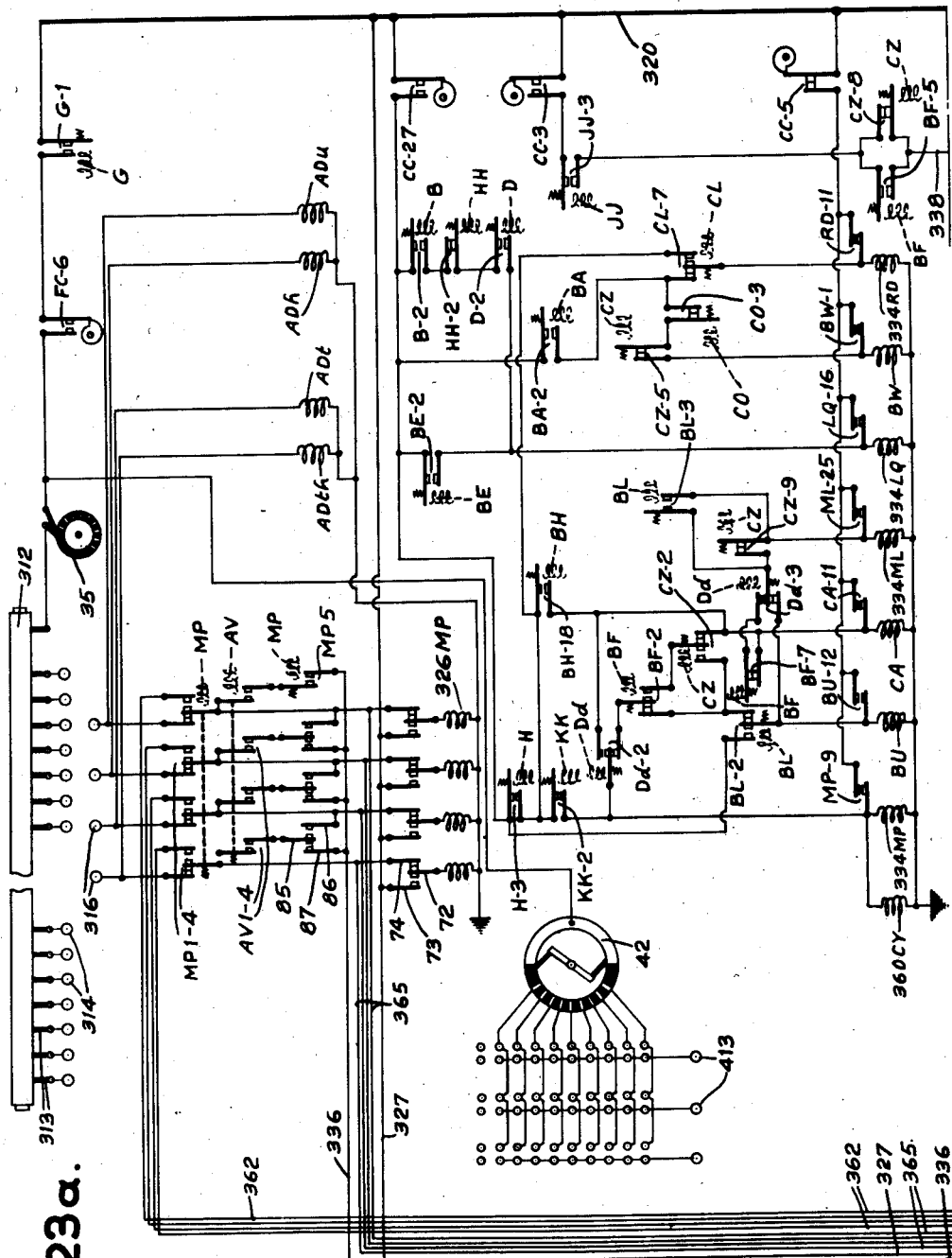

April 11, 1944.    J. W. BRYCE    2,346,249
COMPOUND DENOMINATE NUMBER CALCULATING MACHINE
Filed Oct. 5, 1938    37 Sheets-Sheet 23

INVENTOR.
James W. Bryce
BY Cooper, Kerr & Dunham
ATTORNEYS

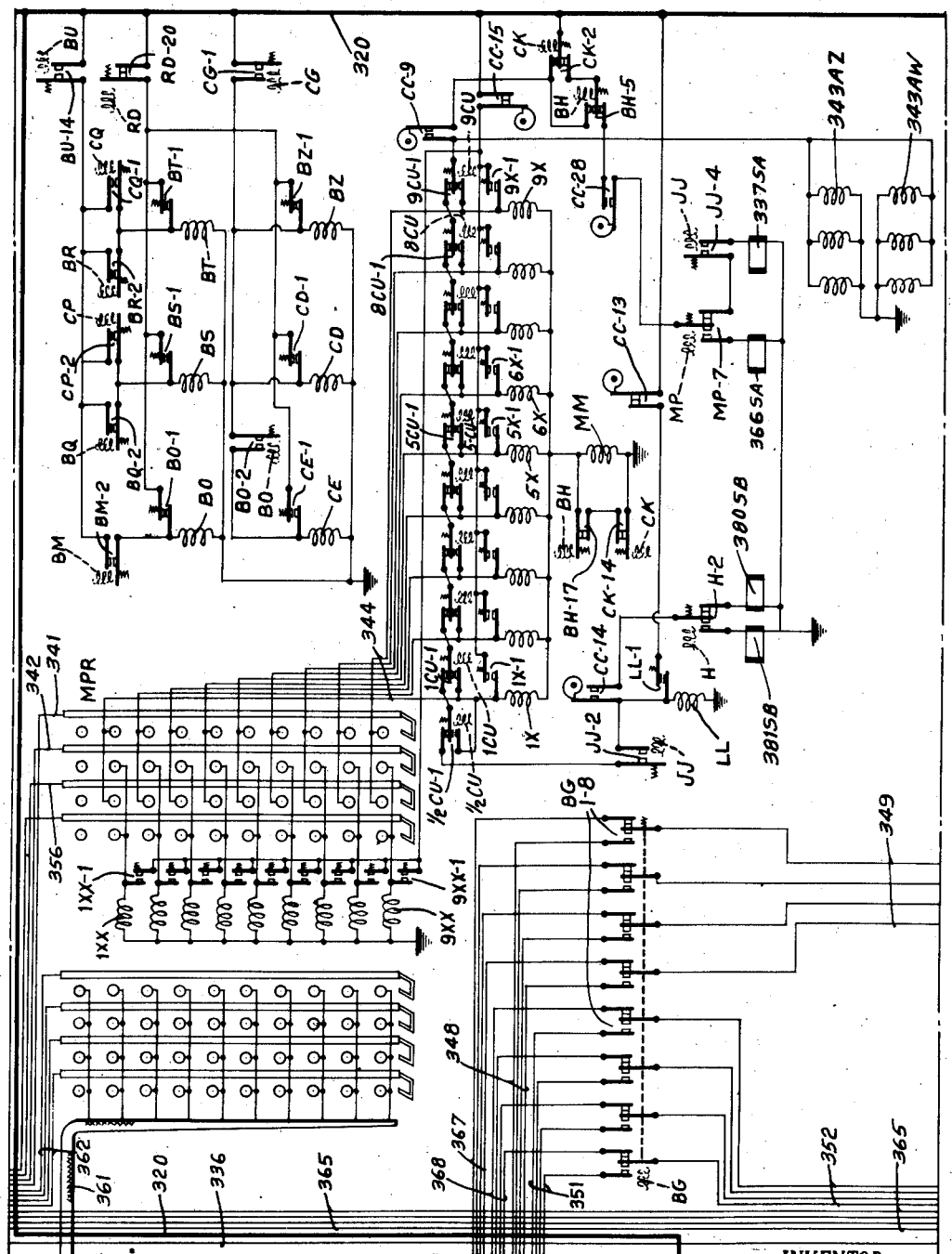

April 11, 1944.   J. W. BRYCE   2,346,249
COMPOUND DENOMINATE NUMBER CALCULATING MACHINE
Filed Oct. 5, 1938   37 Sheets-Sheet 25

INVENTOR.
James W. Bryce
BY Cooper, Kerr & Dunham
ATTORNEYS

April 11, 1944. J. W. BRYCE 2,346,249
COMPOUND DENOMINATE NUMBER CALCULATING MACHINE
Filed Oct. 5, 1938 37 Sheets-Sheet 27
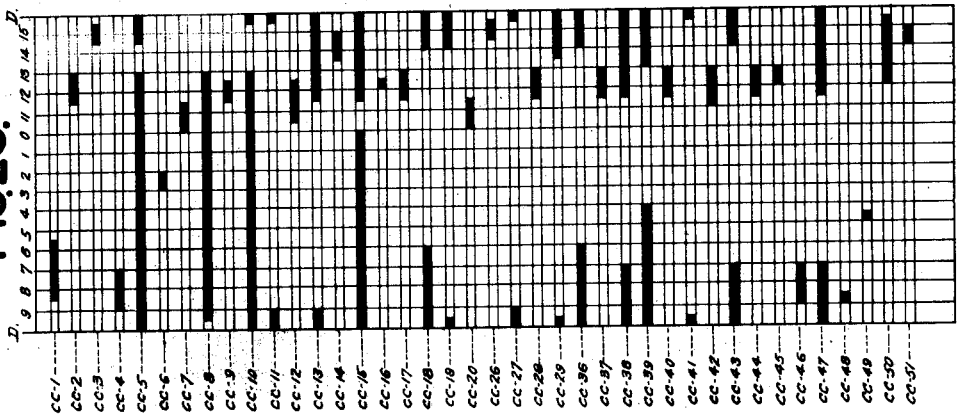
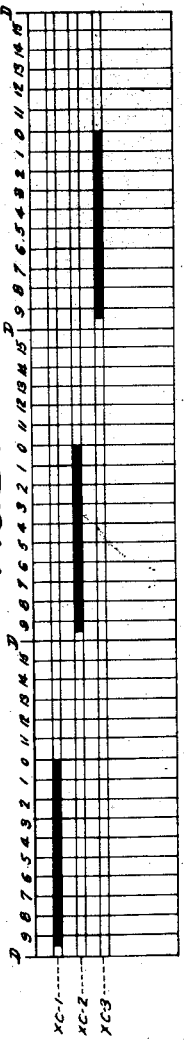
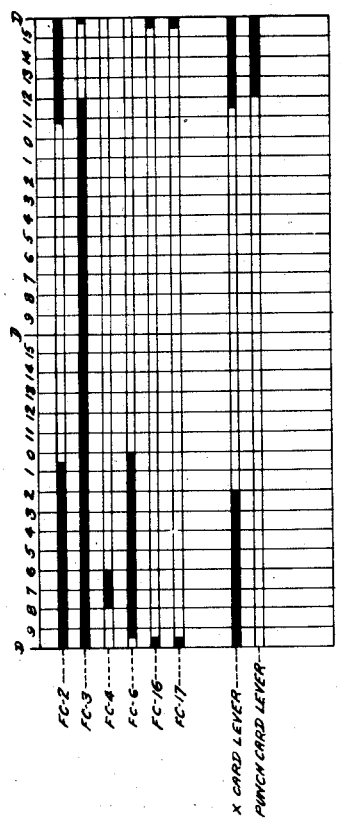
INVENTOR.
James W. Bryce
BY Cooper, Kerr & Dunham
ATTORNEYS April 11, 1944.   J. W. BRYCE   2,346,249
COMPOUND DENOMINATE NUMBER CALCULATING MACHINE
Filed Oct. 5, 1938   37 Sheets-Sheet 28

INVENTOR.
James W. Bryce
BY Cooper, Kerr & Dunham
ATTORNEYS

April 11, 1944. J. W. BRYCE 2,346,249
COMPOUND DENOMINATE NUMBER CALCULATING MACHINE
Filed Oct. 5, 1938 37 Sheets-Sheet 29
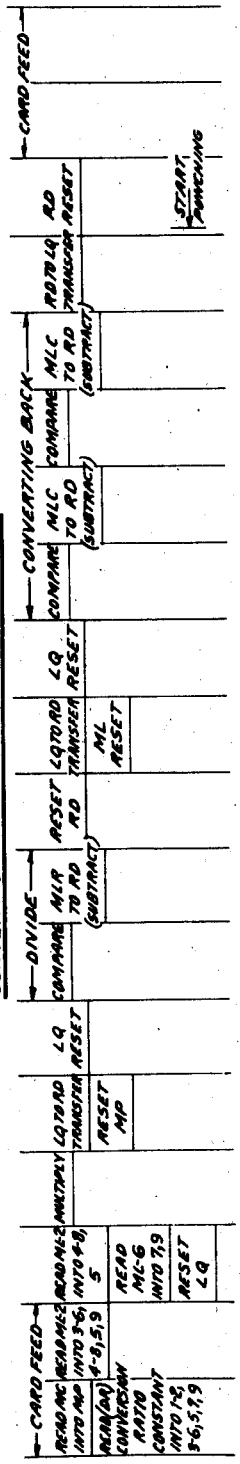
FIG. 31.
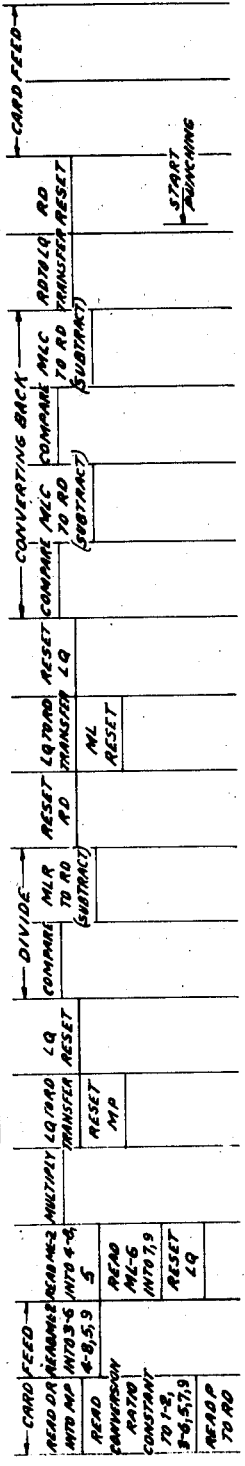
FIG. 32.
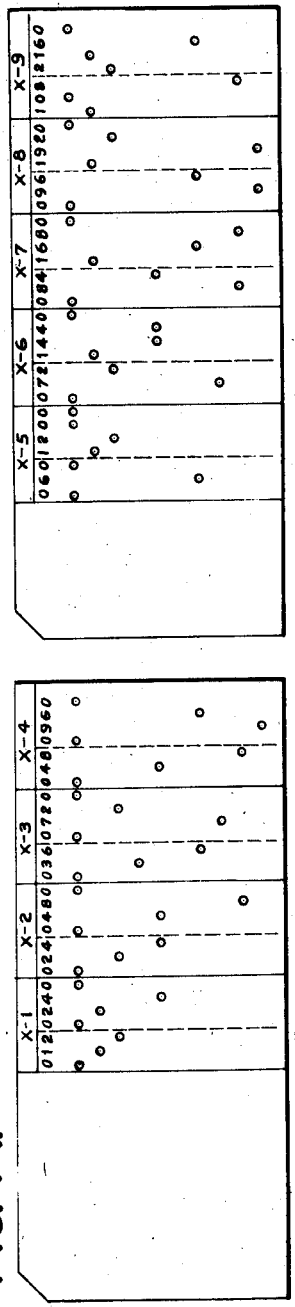
FIG. 45.
FIG. 44.
INVENTOR.
James W. Bryce
BY
Cooper, Kerr & Dunham
ATTORNEYS April 11, 1944.   J. W. BRYCE   2,346,249
COMPOUND DENOMINATE NUMBER CALCULATING MACHINE
Filed Oct. 5, 1938   37 Sheets-Sheet 30

INVENTOR.
James W. Bryce
BY Cooper, Kerr & Dunham
ATTORNEYS

April 11, 1944. J. W. BRYCE 2,346,249
COMPOUND DENOMINATE NUMBER CALCULATING MACHINE
Filed Oct. 5, 1938 37 Sheets-Sheet 31

April 11, 1944. J. W. BRYCE 2,346,249
COMPOUND DENOMINATE NUMBER CALCULATING MACHINE
Filed Oct. 5, 1938 37 Sheets-Sheet 32

April 11, 1944.   J. W. BRYCE   2,346,249
COMPOUND DENOMINATE NUMBER CALCULATING MACHINE
Filed Oct. 5, 1938   37 Sheets-Sheet 33

April 11, 1944.   J. W. BRYCE   2,346,249
COMPOUND DENOMINATE NUMBER CALCULATING MACHINE
Filed Oct. 5, 1938    37 Sheets-Sheet 35

INVENTOR
James W. Bryce
BY Cooper, Kerr & Dunham
ATTORNEYS

April 11, 1944.   J. W. BRYCE   2,346,249
COMPOUND DENOMINATE NUMBER CALCULATING MACHINE
Filed Oct. 5, 1938   37 Sheets-Sheet 36

INVENTOR
James W. Bryce
BY
Cooper Kerr & Dunham
ATTORNEYS

April 11, 1944. J. W. BRYCE 2,346,249
COMPOUND DENOMINATE NUMBER CALCULATING MACHINE
Filed Oct. 5, 1938 37 Sheets-Sheet 37
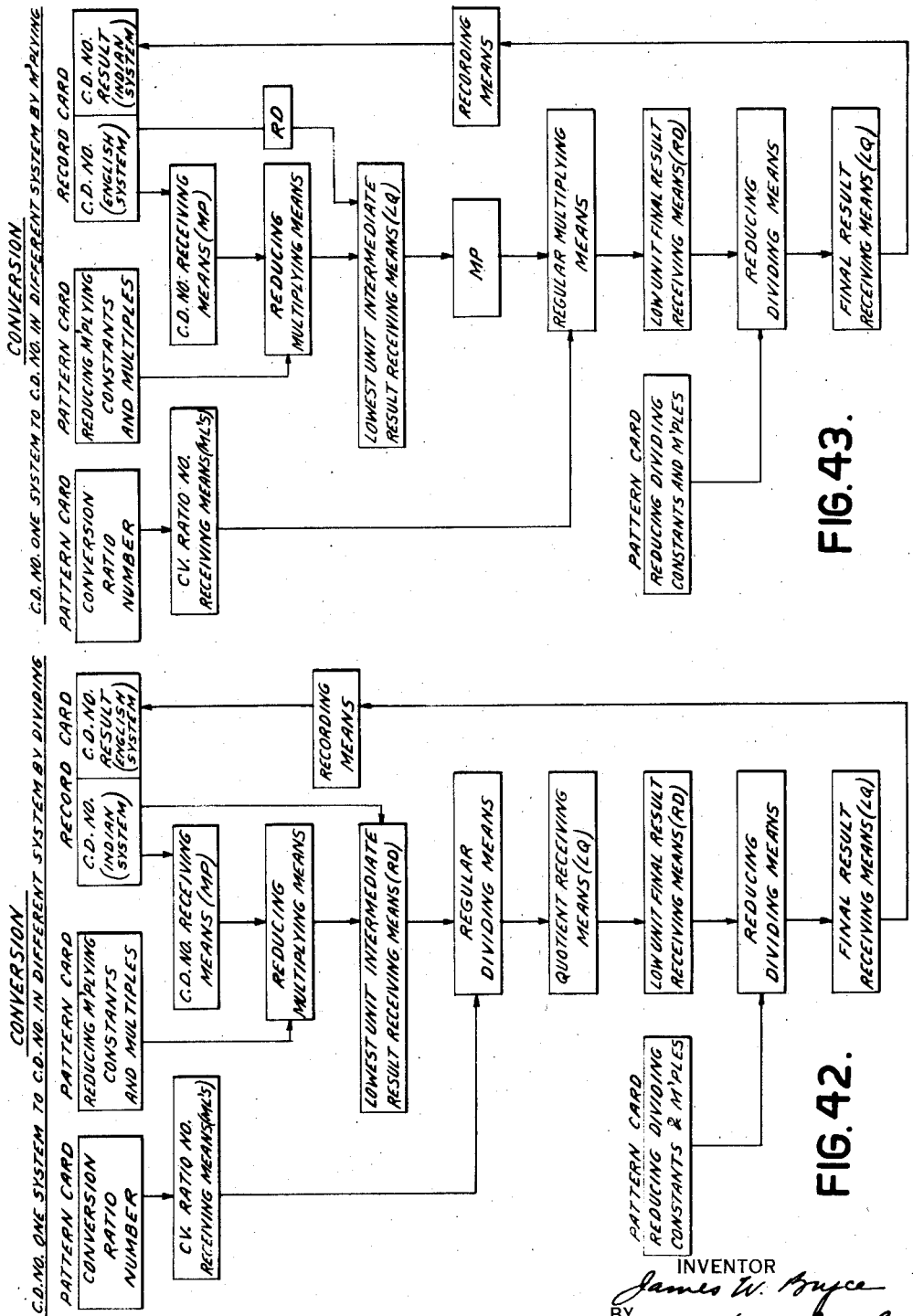

Patented Apr. 11, 1944

2,346,249

UNITED STATES PATENT OFFICE 2,346,249

COMPOUND DENOMINATE NUMBER CALCULATING MACHINE

James W. Bryce, Glen Ridge, N. J., assignor to International Business Machines Corporation, New York, N. Y., a corporation of New York Application October 5, 1938, Serial No. 233,402

20 Claims. (Cl. 235—61.7)

Heretofore calculating operations such as multiplying or dividing have been difficult to effect by machines, when the different terms were expressed in a non-uniform notation and in a uniform notation. By the term "uniform notation" is meant a notation such as the decimal notation having a single base common to all the denominations of an amount and by the term "non-uniform notation" is meant a notation having more than one base each of which is related to a particular denomination or denominations. A number expressed in a uniform notation may be termed a "regular number" which may comprise a whole number or integer such as 258, a mixed number such as 25.8 or a decimal fraction such as .258 and the term "regular number" refers broadly to any of the types of numbers. A number expressed in a non-uniform notation is usually known as a "compound denominate number." Amounts expressed in pounds, shillings and pence; or in yards, feet and inches, gross, dozen and units, or bushels, pecks and quarts are typical illustrations of different compound denominate numbers.

Mechanical calculating operations which involve both a compound denominate number and a regular number are particularly difficult when a decimal point is involved in the regular number which decimal point may occur in variable relations for different computations.

The present invention has for its general object the provision of a machine for effecting diverse computations which involve a compound denominate number as one of the terms of the calculation which, for example, may be one of multiplication or division.

As illustrative of one object of the present invention the machine is adapted to multiply and/or divide one term expressed, for example, in a non-uniform notation such as in the duodecimal notation of which British currency is an example, by another term expressed in a different and uniform notation such as, for example, the Arabic notation.

A further object of the present invention resides in the provision of a machine adapted to perform the type of calculation just explained, wherein all operations are effected automatically by the machine without manual intervention during the successive steps of the calculating operation required to secure the final result or results.

A further object of the present invention resides in the provision of a machine of the record controlled type, with or without recording means for recording results of calculation, in which calculations may be effected involving a plurality of different terms based on different notations including uniform and non-uniform notations as, for example, British currency amounts for the non-uniform notation term in the calculation and a regular number expressed in the Arabic notation for the other uniform notation term of the calculation.

A further object of the present invention resides in the provision of a machine with provisions for receiving two terms of the calculation, for example, the multiplier and multiplicand for multiplying calculations and/or the divisor and dividend upon dividing calculations, wherein one term is received in one non-uniform notation and wherein the other term is expressed and received in a different and uniform notation, with provisions for automatically effecting a reduction of the units in one of the terms expressed in one non-uniform notation to a correspondingly related amount expressed in the value of the lowest unit expressed in a uniform notation and for then effecting a multiplying or dividing calculation of such reduced term value by or with the other term, with further means for reducing the final result received in the reduced term value back to an amount expressed in the units of the different non-uniform notation and also including means to effect all of the foregoing operations, including the final reduction all automatically by the operation of the machine without intervening manual operations or intervening manual control.

A further object of the present invention resides in the provision of a machine adapted for mixed computations (which include the use of terms in different notations including a uniform notation and a non-uniform notation) wherein provision is made for readily changing the machine so that it may be used to operate with different non-uniform notations.

A further object of the present invention resides in the provision of a calculating machine wherein a compound denominate number may be divided by a regular number in an expeditious and rapid manner and without requiring intervening manual action and control.

A further object of the present invention resides in the provision of a calculating machine wherein a compound denominate number may be multiplied by a regular number in an expeditious and rapid manner and without requiring intervening manual action and control.

A further object of the present invention resides in the provision of a calculating machine for performing calculations with a compound denominate number as a term thereof wherein all calculating operations are performed automatically by the machine without manual intervention during the successive steps of the calculating process required to receive the final result or results.

A further object of the present invention resides in the provision of a compound denominate number calculating machine adapted for record card control.

A further object of the present invention resides in the provision of a calculating machine for performing calculations involving a plurality of terms, one expressed in a non-uniform notation (such as a compound denominate number) and the other expressed in a uniform notation (such as a regular number) and wherein provision is made for automatically reducing the term expressed in a non-uniform notation to its lowest denominate unit value and for thereafter performing the calculation which involves the other uniform notation term and for thereafter automatically reducing the result back into a term expressed in the non-uniform notation.

A further object of the present invention resides in the provision of a calculating machine having the objects set forth in the foregoing paragraph which machine is adapted for multiplication or division.

A further object of the present invention resides in the provision of an improved decimal point control device for an accounting machine in which pre-pluggable control means are provided for setting the machine according to a possibly variable point position.

A further object of the present invention resides in the provision of an improved rounding off means for a calculating machine wherein an amount may be compared with one-half of another amount to determine rounding off operations.

A further object of the present invention resides in the provision of novel controls for a compound denominate number calculating machine whereby the machine can be set for handling two unit calculations or a single unit calculation and the like.

A further object of the present invention resides in the provision of a calculating machine adapted for the expeditious conversion of a term expressed in one non-uniform notation to a term expressed in a different non-uniform notation, for example, pounds, shillings and pence can be converted to rupees, annas and pice or the reverse conversion may be made.

A further object of the present invention resides in the provision of a machine adapted for the conversion of a term expressed in a non-uniform notation to an equivalent term expressed in a uniform notation.

A further object of the present invention resides in the provision of a calculating machine adapted for the conversion of a term expressed in a uniform notation to an equivalent term expressed in a non-uniform notation.

A further object of the present invention resides in the provision of a calculating machine adapted for performing calculations wherein one of the two terms involved in the calculation is in a non-uniform notation such as for example, pounds, shillings and pence; or gross, dozens and units; or bushels, pecks and quarts, etc., and wherein the operator may readily change the machine and provide proper reducing constants according to the desired non-uniform notation term, without difficulty or delay and without reconstructing mechanical parts of the machine.

Further and other objects of the present invention will be hereinafter set forth in the accompanying specification and claims and shown in the drawings which show by way of illustration a preferred embodiment and the principle thereof and what I consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a, taken together with Fig. 1a to the right of Fig. 1, show a somewhat diagrammatic view of the various units of the machine and the drive therefor;

Fig. 7 is another fragmentary sectional view of the accumulator unit of Fig. 2, the view being taken substantially along line 7—7 of Fig. 2 and looking in the direction of the arrows. This view shows the readout structure in cross-section;

Fig. 8 is an elevational outside rear view of the accumulator unit of Fig. 2, the view being taken from the left of Fig. 2 and looking to the right;

Fig. 11 is a somewhat diagrammatic view of the card handling and sensing section of the machine. Such section is shown diagrammatically in Fig. 1a;

Fig. 14 is another detail sectional view of certain parts of one of the comparing units, the section being taken substantially on line 14—14 of Fig. 12 and looking in the direction of the arrows;

Fig. 16 is a top plan view of one of the electromechanical multi-contact relay units which is used in the machine for cycle control purposes;

Fig. 17 is a detail sectional view of such unit, the section being taken substantially on line 17—17 of Fig. 16;

Figs. 18 and 18a are detail circuit views showing the circuit relations in the pin box mechanism;

Figs. 21c, 21d, 21e and 21f; Figs. 22b, 22c, 22d, 22e and 22f; and Figs. 23a, 23b, 23c, 23d, 23e and 23f; taken together and arranged in the relation shown in Fig. 24, show the complete circuit diagram of the machine;

Fig. 24 is a diagram view showing the manner in which the various sheets of the circuit diagram should be joined together to make up the composite complete diagram;

Figs. 25, 26 and 27 show cam contact timing diagrams; Fig. 25 showing the timing of the CC contacts; Fig. 26, showing the timing of the FC cam contacts; and Fig. 27 showing the timing of the XC cam contacts;

Figs. 28 to 32 inclusive, show sequence of operation diagrams for different typical calculations;

Figs. 33 to 37 inclusive, show various typical calculations and the various numerical calculation steps which are effected for each different problem;

Figs. 38 to 43 are diagrammatic views which generally show for different typical problems, the correlation of the units with one another and the correlation of the units with the record cards and pattern cards. The views also indicate the sequence of the operation of the units for the different typical calculations and also show the control relations of the units to another at different stages and phases of a calculation;

Figs. 44 and 45 show typical reducing constant pattern cards which are pre-perforated to represent two sets of reducing constants and to represent the various digital multiples from one to nine of each constant.

Machine drive

Figure 1:
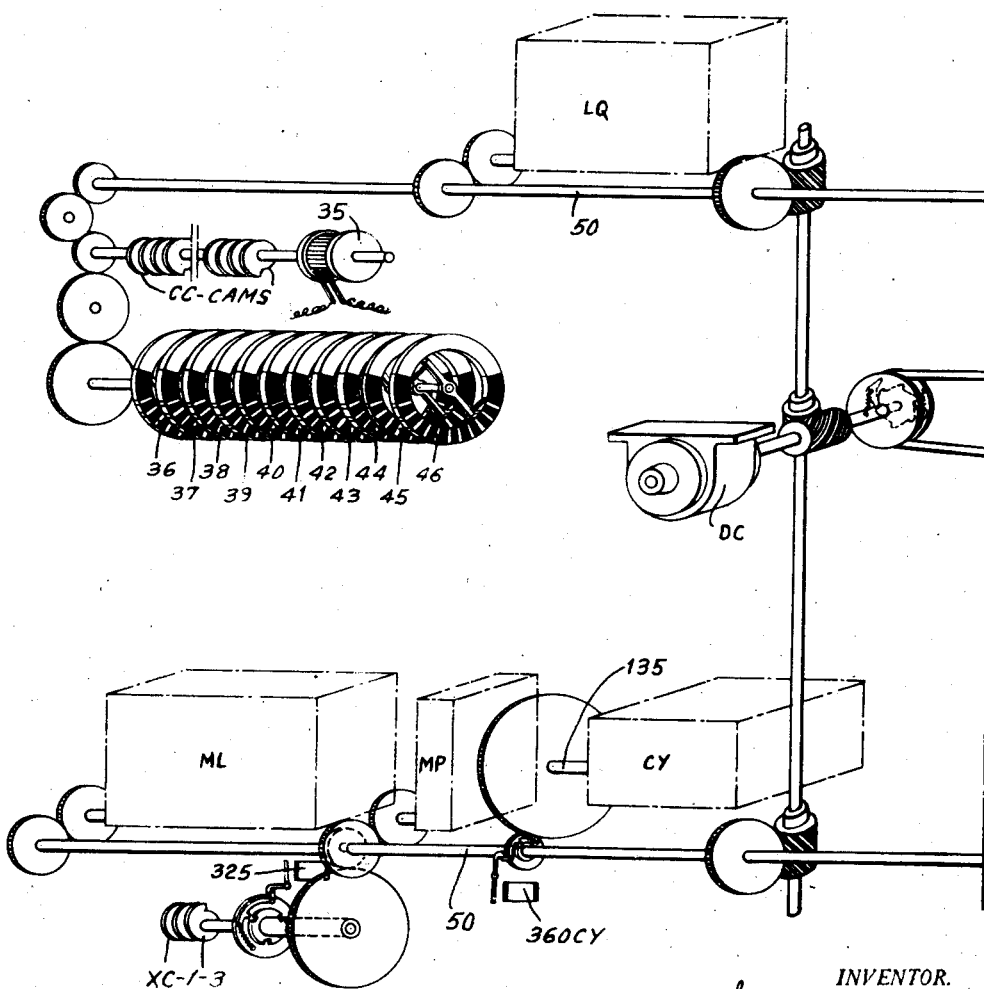
Figure 2:
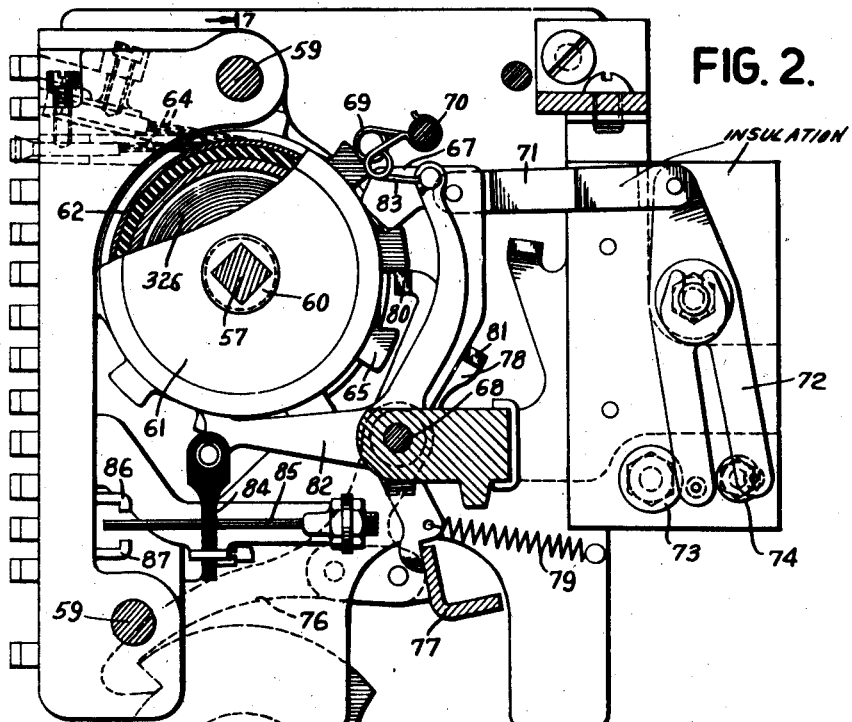
Fig. 2 is a detail sectional view of one of the accumulator units. The second is taken along the dividing line between two adjacent denominational orders of such accumulator or entry receiving device.
Figure 11:
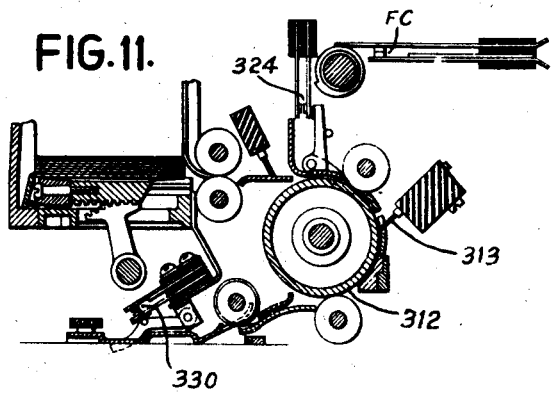
Figure 12:
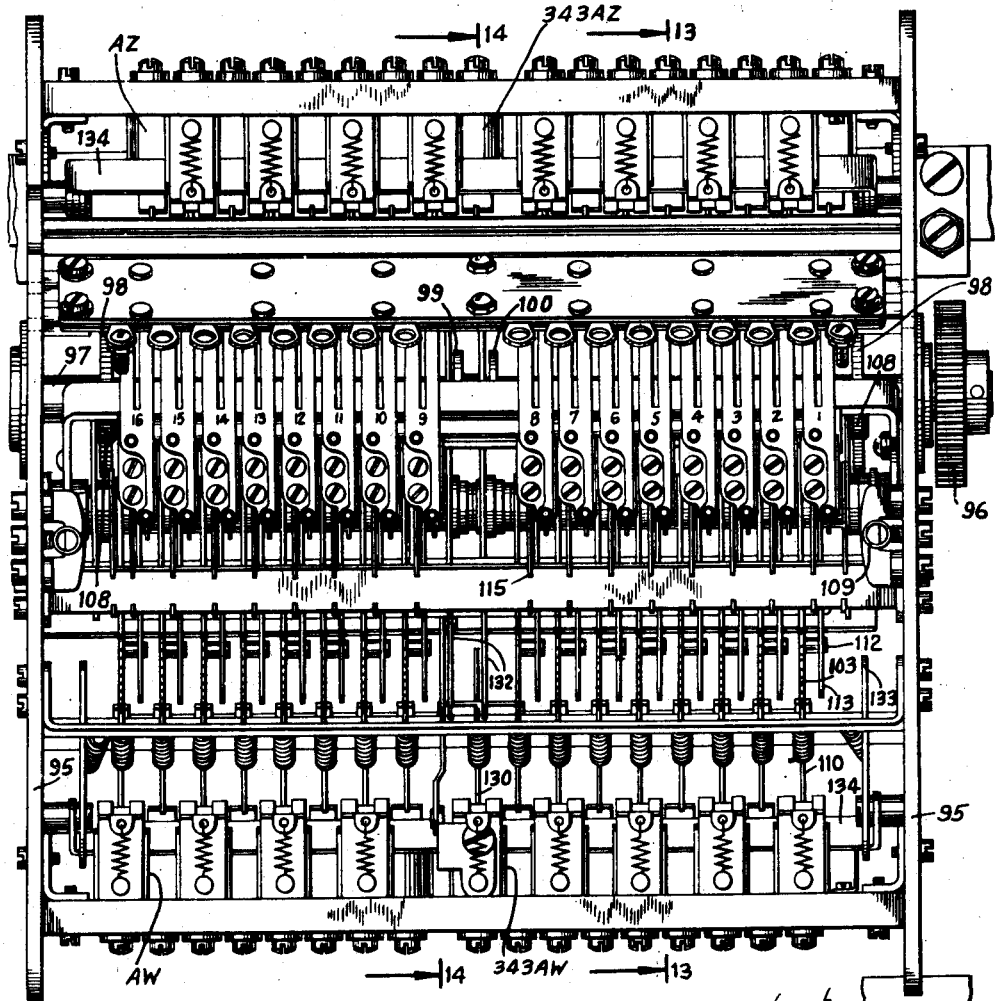
Fig. 12 is a rear elevational view of one of the so-called comparing units of the machine.

Referring first to Figs. 1 and 1a, in general the machine comprises four accumulator units which are respectively designated LQ, RD, ML and MP. It may be explained that the unit ML contains accumulators and readouts from which all digital multiples of one term or factor of the calculation can be read out. Such unit is utilized both on multiplication and division. The MP receiving device receives the other term of the calculation on both division and multiplying calculations. The accumulating units LQ and RD receive components of the product upon multiplication with the final product received in LQ or RD. Upon division, LQ receives the quotient amount and RD receives the dividend. The various accumulating units are driven by the gearing shown in Figs. 1 and 1a from the driving motor M. There is also provided a direct current generator D. C. The card handling and feeding section of the machine shown in Fig. 1a at the top and in Fig. 11 is of the usual form and is generally like that shown in United States patent to Daly, No. 2,045,437, and is driven in the usual manner. The FC cam contacts are driven in the customary manner in synchronism with the drive of the card handling section of the machine. Certain of such contacts are diagrammatically indicated in Fig. 1a. The unit designated CY is an electro-mechanical relay setup unit of the general construction shown in Figs. 16 and 17. Such unit is adapted for reset from the constantly running drive shaft by the customary one revolution clutch device. The reset magnet for the CY unit is designated 360CY. Three comparing units designated CU are provided. These comparing units are of the form shown in Figs. 12 to 15 inclusive, and such units are constantly driven from the drive shaft of the machine. Also driven from the main drive shaft are the usual CC cams. Forty of these cams are provided in the present machine and given distinct reference numerals as shown in the circuit diagram.

There are also an impulse distributor designated 35 (Fig. 1) and there are also provided eleven impulse emitters designated 36 to 46. The impulse distributor and emitters are driven in the customary manner.

There are also provided, cam contacts XC—1—3. Such cam contacts are driven from the machine drive shaft through a one revolution clutch which is controlled by magnet 325. The driven side of the one revolution clutch receives its drive from the main drive shaft through the gearing shown, which drives the set of XC cams one revolution for each three revolutions of the main drive shaft.

For clarity and subsequent description the upper and lower main drive shaft will be given a like reference numeral 50.

Accumulators and entry receiving devices

As stated before, the LQ, RD, ML and MP units are accumulators of electromechanical type. These accumulators are identical in construction except for the readout sections. Some accumulators have four readout sections, others have two and others, one readout section. The type of accumulator herein shown is of the form illustrated and described in copending United States application to Lake and Pfaff, Serial No. 182,402, filed December 30, 1937, now Patent No. 2,232,006, dated February 18, 1941. This accumulator will now be briefly described.

In lieu of driving the accumulator by the customary jaw clutch, the present accumulator (Figs. 2 to 10 inclusive) is of a form in which a magnetic clutch is used for driving an accumulator element upon an entry thereinto. Suitable circuit making and breaking devices are provided to enable the differential clutch action to take place at a differential time in the cycle depending upon the time of sensing an amount by the brushes or upon the time that the differential timed impulse is transmitted to the accumulator. These making and breaking devices cause the magnetic clutch to remain in action until a definite point in the accumulator cycle whereby definite amounts of rotation of the accumulating wheel or element are obtained in accordance with the time of transmission of the initiating differential impulse.

Figure 10:
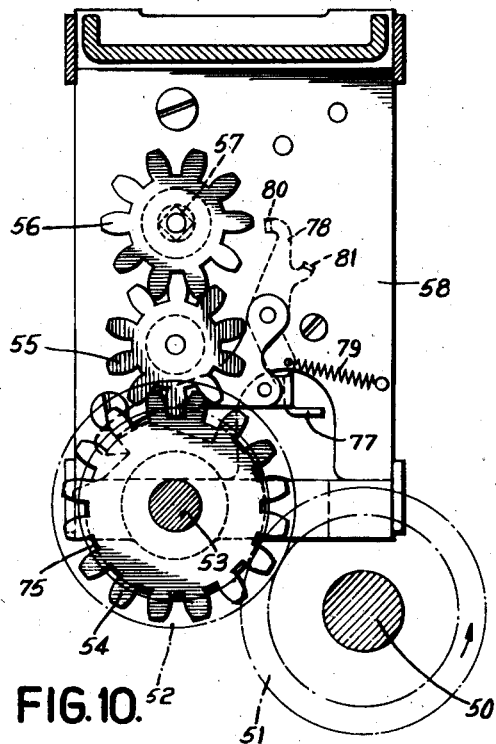
Fig. 10 is an outside view of the accumulator, viz. the view is taken from the right of Fig. 8, looking to the left and such view shows the gear drive for an accumulator unit.
Figure 9:
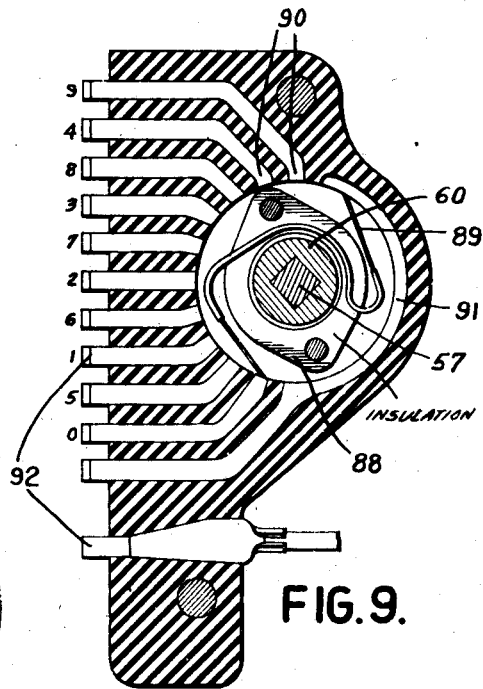
Fig. 9 is a detail view of one of the readout commutators showing the wiring to the plug prongs. This section is taken substantially along line 9—9 of Fig. 8 and looking in the direction of the arrows.

Referring to Fig. 10, 50 is the drive shaft which is in constant rotation. This drive shaft through suitable gears such as 51 and 52 drives an accumulator drive shaft 53. Shaft 53 carries a gear 54 which through an idler 55 drives a gear 56 carried by a square shaft 57 which is thus also in constant rotation. The shaft 57 is suitably supported in bearings carried in the side plates 58 of the accumulating unit. Between the side plates are suitable spacing cross bars 59 (see Figs. 2 and 7), holding the plates in spaced relationship and aiding in the support of the accumulator mechanism. The accumulator units may be made in any desired number of orders. On the square driving shaft is a fitted bushing 60 (see Figs. 7 and 9). Around this bushing 60 there is rigidly secured a magnet yoke 61.

Figure 3:
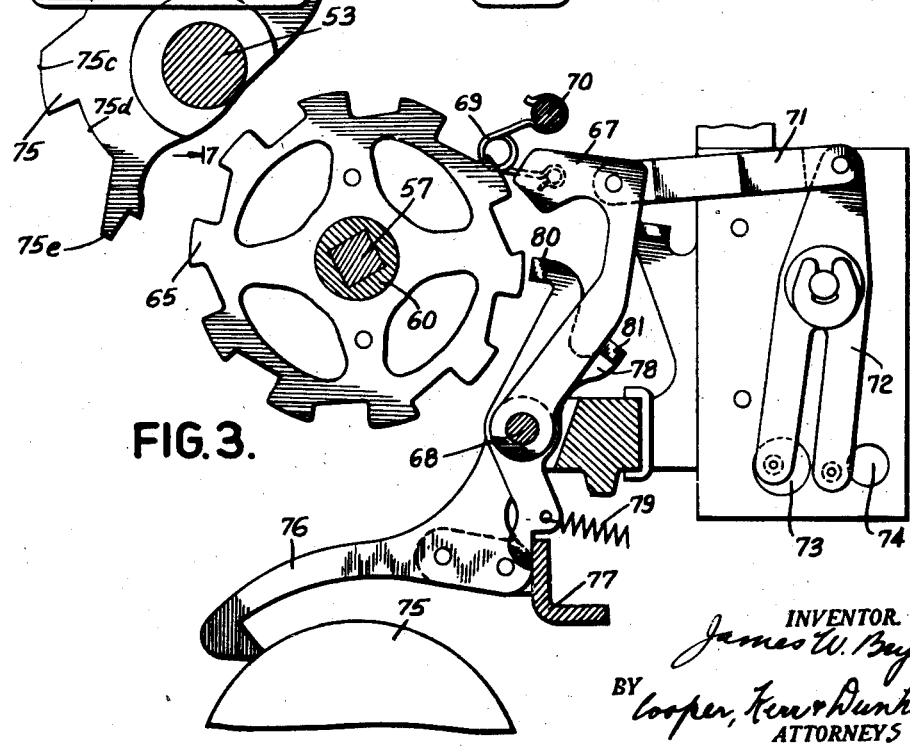
Fig. 3 shows certain parts of the accumulator of Fig. 2 in a different position.
Figure 4:
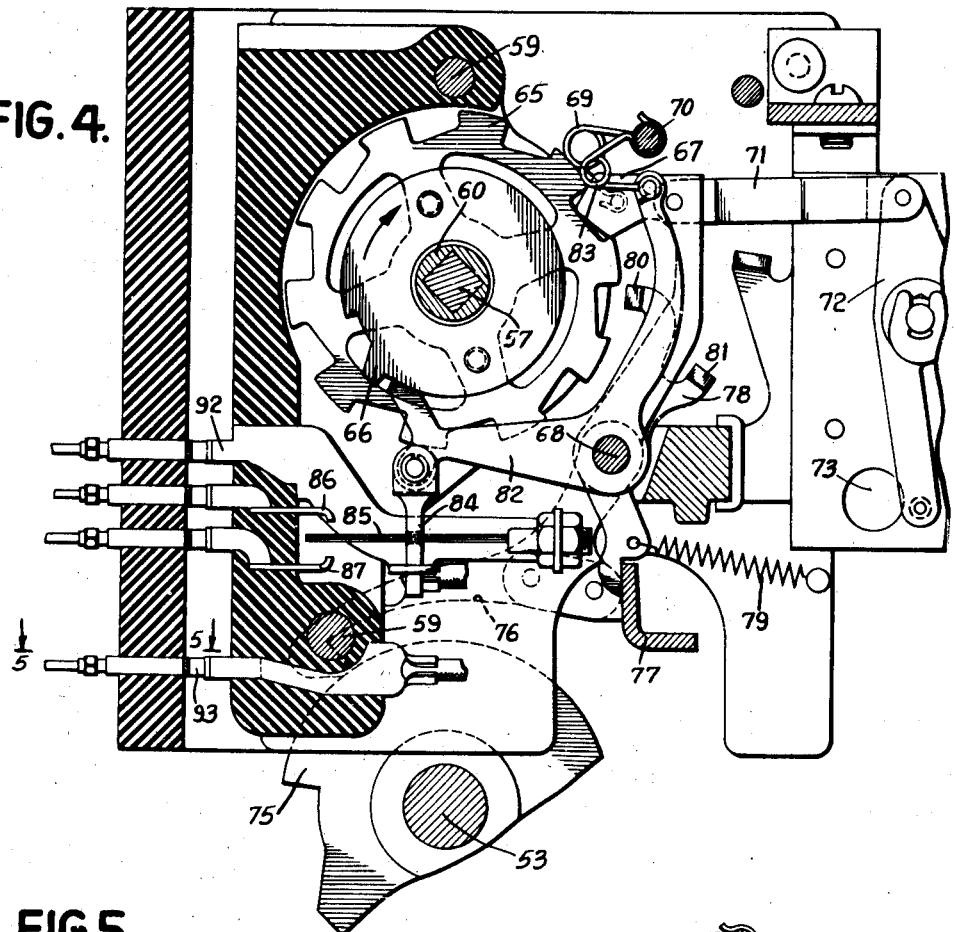
Fig. 4 is another sectional view of one of the accumulator units, the view being generally similar to Fig. 2, but taken on a somewhat different vertical plane.
Figure 5:
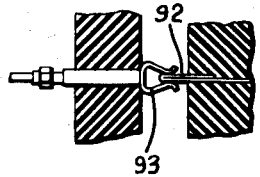
Fig. 5 is a detail view taken substantially along line 5—5 of Fig. 4.
Figure 6:
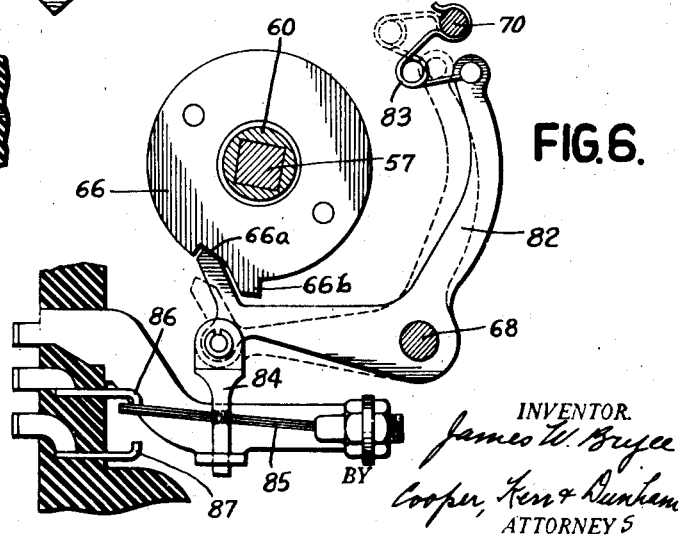
Fig. 6 is a detail view of the tens transfer or carry cam and related parts.

Carried about the periphery of yoke 61 and insulated therefrom and from each other there are a pair of channel shaped collector rings 62 to each of which is connected one end of a magnet winding 326 secured and positioned within the yoke. Trailing against each ring 62 there is a brush 64 which is carried in a suitable brush holder. The yoke with its winding rings constitute the driving element of the accumulator clutch whose driven elements include the toothed wheel 65 and tens carry cam 66 (Fig. 4). The wheel and cam are riveted together as indicated in Fig. 7 and the rivet fastenings also afford driving means for the readout brush holders. Such parts are mounted for free rotation on the bushing 60. As shown there is a slight air gap between the end of the yoke 61 and the carry cam 66. Wheel 65 is provided with ten teeth (see Figs. 3 and 4), between two of which when the wheel is at rest there extends the nose of a lever 67. Such lever is freely pivoted on a rod 68. Such lever is held in the position shown in Figs. 2 and 4 by a looped wire spring 69 connected at one end to a rod 70 and its other end to a pin in the nose of lever 67. The spring 69 and the lever 67 form a toggle with the pin urging the nose in contact with the wheel 65. When the clutch magnet winding is energized, the wheel 65 and the cam member 66 are magnetically clutched to the yoke 61 and commence to rotate therewith.

Energization of the clutch magnet is afforded by the usual differentially timed impulse which may be received from the sensing section of the machine or from other controls affording an initiating timed impulse. As the wheel 65 commences to turn the edge of one of its teeth bears against the upper inclined edge of the nose on lever 67 and cams the lever clockwise as viewed in Fig. 2 about its pivot 68 carrying the lower end of the spring 69 to the right of a line between centers 68 and 70. This position of the parts is shown in Fig. 3. The parts will remain in such position until wheel 65 is again disengaged from the driver. Lever 67 when rocked by a tooth shifts an insulated link 71 shifting a contact member 72 to a reverse position from that shown (see Fig. 3). When in this position a circuit is completed through the forked member and a contact spot 73. This establishes a holding circuit to maintain the clutch magnet energized.

It may be mentioned that before shifting, an arm of member 72 was establishing contact with a contact point 74. The arrangement is such that a make before break action occurs as the lever shifted. It will be understood that the clutch magnet is energized at a differential time and that the amount of times that the wheel 65 is rotated is dependent upon the differential time of receiving an impulse. De-clutching action at a fixed time in the cycle is brought about as follows: On shaft 53 there is a cam 75 with which a follower 76 cooperates. The follower is integral with a bail 77 which extends across a plurality of units of different denominational orders. For each order there is a lever 78 pivoted on rod 68 and having a lower tail portion bearing against the bail 77 (see Figs. 2, 3 and 4). Each lever is provided with a spring 79 which urges the follower 76 against its cam 75. Each lever 78 has lateral extensions 80 and 81, the former lying in the plane of the wheel 65 and the latter extending behind the lever 67.

The operation is such that during the entering period of the cycle the follower 76 rides on the intermediate concentric portion of cam 75 holding bail 77 and through it the lever 78 in the position shown in Figs. 3 and 4. At the zero index point in the cycle the follower 76 drops off the cam and the bail 77 allows the lever 78 to rock rapidly in a counterclockwise direction bringing projection 80 into the space between two of the teeth of the wheel 65. At the same time projection 81 engages the lever 67 swinging it back from the position of Fig. 3 to that of Fig. 2 thus causing the holding circuit of the clutch magnet to be broken. It may be mentioned that the clutch magnet circuit is established by the member 73 and is broken when 72 moves off this contact.

When the clutch magnet circuit is interrupted projection 80 will engage the leading edge of a tooth on the wheel 65 and positively interrupt further rotation of the now released accumulating wheel. At the same time the trailing edge of the engaged tooth is overlapped by the nose of the lever 67 to prevent retrograde movement of the parts. Continued rotation of the cam 75 will, through portion 75c thereof, again release wheel 65 for a possible tens carry operation and portion 75d will again interrupt the wheel after a single step of movement. Finally the highest portion 75e of cam 75 will cause lever 76 to rock an additional amount in a clockwise direction to restore the tens carry lever 82, if the same had previously been rocked counterclockwise by the carry devices now to be described.

*Carry mechanism*

Carry cam 66 (Fig. 6) is provided with a notch 66a and a rise 66b. The carry lever 82 pivoted at 68 has its nose held against the carry cam by means of a looped spring 83, which urges the carry lever 82 clockwise. The lever 82 carries an insulating depending member 84 through which the brush 85 extends to make contact with either of contacts 86 or 87. Normally the parts occupy the relation of Fig. 4 with the brush lying intermediate the contacts. When the wheel 65 has been advanced to a "9" position, cam 66 is in the position shown in Fig. 6, wherein the nose of the lever 82 is in the notch 66a, thereby affording contact between brush 85 and contact 86. When the wheel 65 passes through "0" rise 66b on cam 66 will rock the lever 82 to its dotted line position in which position spring 83 will now hold it since the point connection between the spring 83 and the lever 82 is now to the left of the line between centers 70 and 68. As a result the brush 85 is shifted to engage contact 87 and will remain in such position until after the carry portion of the cycle when the high portion 75e of cam 75 will cause lever 76 to rock lever 82 back to the position of Fig. 4.

Readout structure

Attached to each accumulator wheel is the readout mechanism. It will be understood that any desired number of brush sections can be provided driven by a single accumulating wheel 65 (see Fig. 7). According to the present invention in some instances four brush structures are driven by a single accumulator wheel and in other instances two brush structures are driven by a single wheel and in still other instances, one brush structure is driven by a single wheel. Fig. 7 shows the four brush structure arrangement. Such structure comprises a holder 88 of insulating material having a wire brush 89 fitted within a groove in the holder. The groove it will be understood conforms with the general shape of the center part of the brush. In the plane of each brush 88 there are commutator segments 90 and a common arcuate segment 91 (see Fig. 9). Each brush 89 serves to make electrical connection between the related common segment 91 and each of the segments 90 according to the position of the brush upon advance of the accumulating wheel 65. Since the wheel 65 has ten teeth, it moves a tenth of a revolution for each unit entered. Segments 90 are spaced one-twentieth of 360 degrees apart so that the brush 89 stops at the segments in the order in which they are numbered in Fig. 9. In the position shown zero segment 90 is connected with the common segment 91.

The segments 90 and 91 as well as the circuit to the carry brush 85 terminates in beveled contacts 92 (see also Fig. 5) so that ready connection can be made to the unit by means of the bifurcated blades 93.

The accumulators and entry receiving devices are adapted to be reset to zero electrically in a manner known in the art by directing nines complementary impulses under control of the readout structure to the entry receiving magnets of the accumulator. An extra impulse is also directed to the lowest order whereupon the electrical carry devices bring all the accumulator elements to zero. Electrical reset of a typical accumulator will be subsequently described.

Comparing units

The comparing units of the present machine are of the form fully described in the copending United States application of Ralph E. Page, Serial No. 117,493, filed December 24, 1936.

As shown in Fig. 1a, three comparing units are illustrated, each designated CU. These comparing units all receive their drive from the lower drive shaft 50.

The comparing units will now be more specifically described. Each comparing unit comprises side plates 95 (Fig. 12) which are secured together by suitable cross members which also afford support for various parts such as magnets, bails and springs. Each comparing unit is provided with a drive gear 96 (see Figs. 12 and 1a. Gears 96 are driven from the lower main drive shaft by the driving train illustrated in Fig. 1a. Each gear 96 is fast to the comparing unit drive shaft 97 (see also Figs. 13 and 14). Each shaft 97 has secured to it a pair of bail operating cams 98 and a pair of restoring cams 99 and 100. Suitably secured in the side plates is a cross shaft 101 on which are pivotally mounted in interspersed relation two series of sectors, one of which is designated 102 and the other of which is designated 103 in Fig. 13. It will be understood that there are a pair of such sectors for each denominational order in which comparison is to be effected. The sectors are adapted for pivotal rocking movement on the supporting shaft 101 and timed rocking movement is imparted to the sectors by bails 104 and 105.

Figure 13:
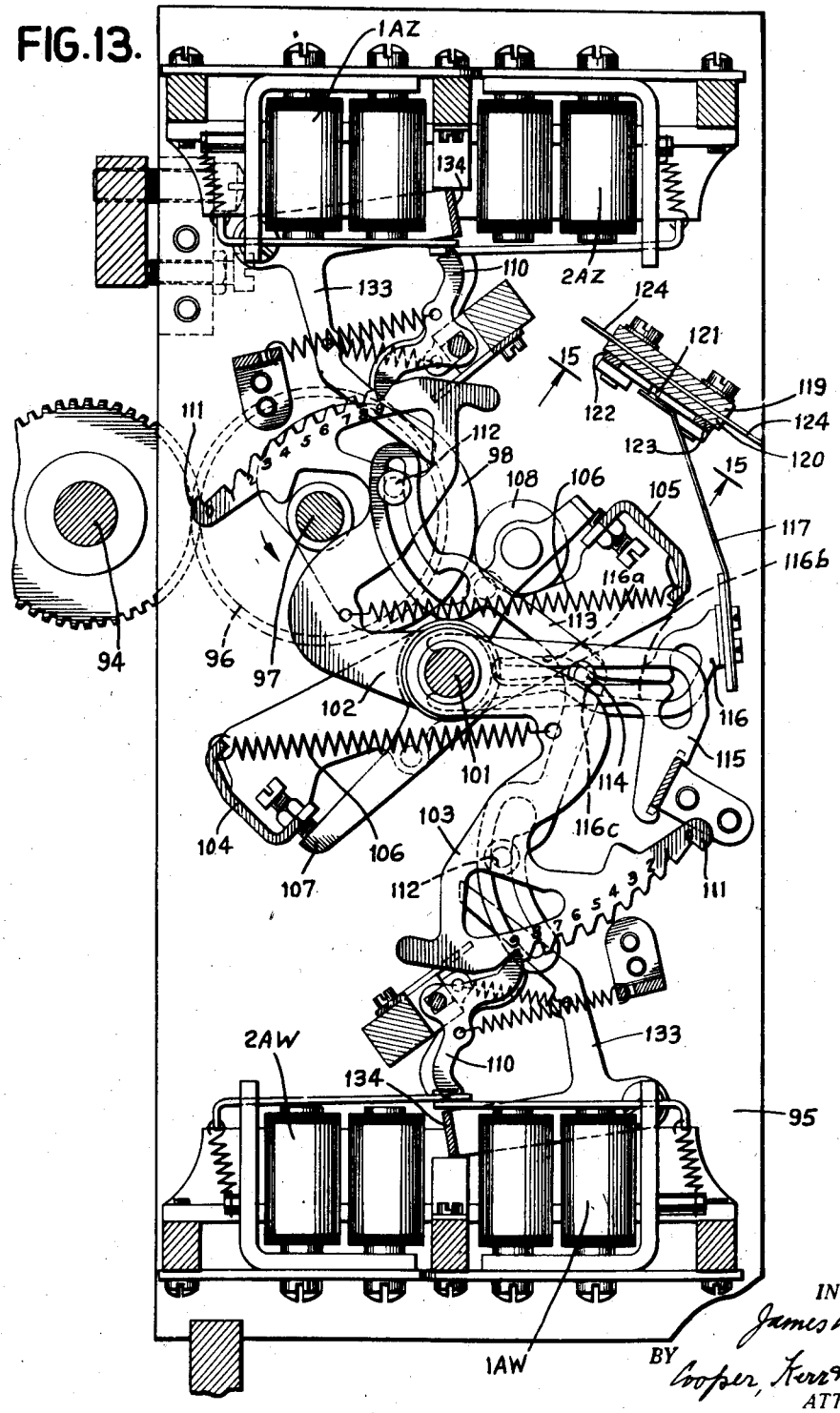
Fig. 13 is a detail sectional view of the parts of one order of the comparing units, the section being taken along line 13—13 of Fig. 12 and looking in the direction of the arrows.

Rocking movement is imparted to the bails by bail actuating levers 107 (one of which only is shown in Fig. 13). Each of such levers carries a cam follower roller 108 which cooperates with a cam 98. The cam follower rollers 108 are maintained in cooperation with cams 98 by means of springs 109 which are attached to the bail arms and to a fixed support as shown in Fig. 14. Differential movement of the sectors is determined by magnetically tripped stop pawls 110 (see Fig. 13). Such stop pawls are normally latched by their related magnet armatures out of the path of the ratchet teeth on the sectors. The comparing magnets are generally designated AW and AZ. It will be understood that the AZ magnets control the related upper sets of sectors 102 and the lower comparing magnets AW control the movement of the lower sectors 103. For compactness of construction the magnets are disposed in a somewhat staggered relation, which will be apparent by inspection of Fig. 12. In Fig. 13, the two lower comparing magnets 2—AW and 1—AW are adapted to control two adjacent sectors one of which is behind the other.

Upon energization of a comparing magnet such as 1—AW at a differential time its armature will release the stop pawl 110 which will swing under the influence of its spring to engage the sector ratchet and differentially stop it in a position corresponding to the differential time at which an impulse is received to energize the comparing magnet. In Fig. 13 the sector 103 is shown as stopped at the "9" index point position and likewise the sector 102 is also shown stopped at the "9" index point position. In the event that there is no energization of a comparing magnet the stop pawl 110 will stop its related sector at the "0" index point position due to the high shoulder 111 beyond the zero position.

Each sector 102 and 103 carries a pin 112 (Fig. 13) and each of these pins extends through slots in a differentially floating link 113. Each differential link has a pin 114 carried thereby and extending therethrough. Each such pin 114 is slidably guided for in and out movement with respect to the shaft 101 by means of a slotted member 115. Also cooperating with each pin 114 is a member 116. Member 116 has a cam slot portion 116a comprising a straight portion, another straight portion 116b and a connecting sloping portion 116c. The relation of parts is such that if sector 103 has the same setting as sector 102 for example at the "9" index point position as shown in Fig. 13, the pin 114 will remain at the center in the sloping cam portion 116c. Under this condition there will be no movement of the arm 116. On the other hand when pin 114 is caused to move to the right as is the case when sector 102 moves to a greater extent than sector 103, then member 116 will be rocked upwardly or counterclockwise about 101 as a pivot. This counterclockwise movement of 116 occurs when the amount set in sector 102 is less than the amount set in sector 103. On the other hand when the amount set in sector 102 is greater than the amount set in sector 103, the pin 114 will move to the left or into the 116a cam slot portion of 116. This will cause clockwise swinging of 116 about 101 as a center.

By the above mechanism for any order of the comparing unit it is possible to compare two numbers in a given order and to get three selective settings of 116. One setting is made when the numbers are equal in which case there is no movement imparted to 116 and it remains in the center position. The other conditions are an upward or downward displacement of 116.

Figure 15:
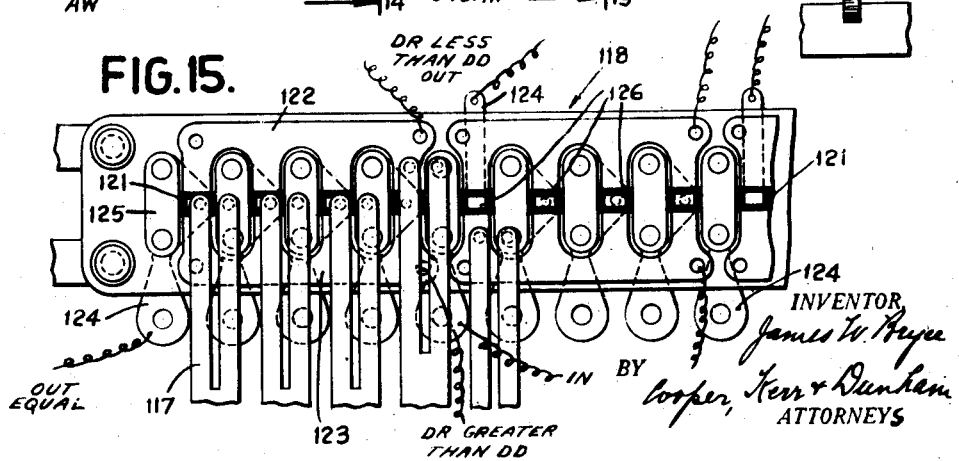
Fig. 15 is a fragmentary detail view of the comparing commutator and brush devices of one of the comparing units, the view being taken substantially on line 15—15 of Fig. 13 and looking in the direction of the arrows.

It will be understood that in order to provide for comparison of multi-denominational numbers that there are a pair of sectors 102 and 103 for each order and further that there is a member 116 for each order. Each member 116 has secured to it a brush contact bifurcated wiping member 117 (see Fig. 15). In Fig. 15 there are shown, for purposes of illustration, only five wiping members 117. The three to the extreme left are in non-shifted or middle position. The second from the right is in upper position indicating that its sector 103 has moved to a less extent than its related sector 102 and the extreme right hand wiping member is in down position, indicating the reverse sector condition.

Suitably mounted upon the side plates in co-operation with the brush members 117 is a comparing commutator generally designated 118. This comparing commutator comprises a base plate 119 and a face strip 120 of insulating material. Supported by other strips of insulating material 121, suitable fastening rivets secure the parts together and secured to the face of 120 are common contact strips 122 and 123. Located between the strips 119 and 120 are a series of terminal plates 124 (see also Fig. 13) having portions which extend beyond the edges of the commutator for circuit connections. Parts of terminal plates 124, to a certain extent, resemble triangles with their points extended to the right, note the dotted line extension in Fig. 15. Carried on the face of the strip 120 are a number of contact plates 125, each of which is connected to a related terminal plate 124. The contact strips 122 and 123 are serrated and arranged so that the serrations pass each other and extend into the spaces between the contact plates 125. The ends of the serrations of 122 and 123 and between 125 are blocks of insulating material 121 having contact rivets 126 which connect with the respective terminal blocks 124.

It may be explained that the comparing commutator illustrated in Fig. 15 is shown sectionalized for making comparisons of four orders with four orders. The commutator, it will be understood, may be for any desired number of orders. In the present machine one of the comparing commutators is provided for a five order comparison. With the setting shown in Fig. 15 for the four brushes to the extreme left, the circuit will come in at the wire marked "in" to block 124. It will extend through 125 through the brush 117, thence to plate 122 and out on the circuit labelled "DR less DD." However, assume that the fourth brush 117 from the extreme left is in middle position. In this event the circuit would extend from the "in" wire to contact block 125 through brush 117, through the segment 126 of the next order to the left, thence through segment contact block 125, through the brush 117 of this order, again through 126 and 125 pertaining to the next order, through the brush 117, again through 126 and 125, through the brush 117 of this order, through the block 126 and 125 and out on the "out equal" wire. On the other hand, assume that the fourth from the left brush 117 of the four order unit is in down position. The circuit comes in on the "in" wire through the contact block 125, through the brush 117 and is then completed through the lower serrated member 123 to an out line labelled "DR greater than DD."

With reference to the comparing commutator it may be explained that the first brush from the right of any group which has moved off from the center or equal position effects the control. For example, assume that the fourth brush 117 from the left in Fig. 15 is in middle position and the third brush from the left is in upper position. Then in that event the circuit would be completed from the "in" line, through the terminal block 124, through block 125, through the brush 117, in say the thousandths order, through spot 126, through block 125, through brush 117 to contact plate 122 and out. In short, it may be stated that it is the highest order shifted brush which is controlling for purposes of comparison.

In the use of the comparing units of the instant machine, it is desirable to set up the sides of the comparing units and then restore them following a comparison so that they may be set up again for all following comparing cycles. In order to provide for such operations certain bail movement controlling mechanisms are provided which will now be described.

Referring to Fig. 14, it will be noted that the bail 105 is provided with a spring pawl 127 and that bail 104 is provided with a spring pawl 128. Arranged to cooperate with 127 and 128 are pawls 129 and 130 which pawls may be considered as normally having the latched position as shown. Upon clockwise swinging of bails 105 and 106 the pawls 127 and 128 first yield and ride upon the face of pawls 129 and 130. When the end of the bail movement is reached, the pawls 127 and 128 snap into the position shown, thereafter both bails 104 and 105 will be latched against return movement.

With the construction and mode of operation of the comparing units as herein employed, it is desirable that both the lower sector 103 and the upper sector 102 be reset on each comparing cycle. Accordingly, magnets 343AW and 343AZ are energized. Upon the attraction of the armatures of these magnets a pawl such as pawl 130 will swing under the influence of its spring in an anticlockwise direction out of intercepting relation with pawl 128. Accordingly, bail 104 can have an anticlockwise restoring movement to restore the sector or sectors 103 cooperating therewith. Similarly, energization of 343AZ will attract its armature whereupon pawl 129 will swing under the influence of its spring in an anti-clockwise direction out of intercepting relation with pawl 127. Accordingly, bail 105 can have an anti-clockwise restoring movement to restore the sector or sectors 102 cooperating therewith.

Arms 132 (Fig. 14) are oscillated by cams 99 and 100 once each machine cycle and such arms are provided for the purpose of knocking off the armatures of magnets 343AZ and 343AW whenever any armature has been tripped and such frame is also adapted to restore the pawls 130 and 129 to their latched position. When the bails 104 and 105 are swung counterclockwise to restore the sectors, the pawls 110 (Fig. 13) ride up on the smooth high parts of the sectors beyond the nine ratchet tooth position and thus displace the pawls out of the line of the ratchet teeth. At about this time the leading edge of a bail such as 104 engages a pivoted armature restoring member 133 and rocks it clockwise to displace the bail 134 and therefore knock off the armatures and re-latch the stop pawls 110.

Electromechanical relay unit

Referring to Fig. 1 there is provided an electromechanical relay unit generally designated CY. Such unit has a drive shaft 135 which is adapted to make one-quarter of a revolution for each revolution of the main drive shaft 50 when the related one revolution clutch, i. e., that controlled by magnet 360CY (Fig. 1) is operated.

Referring to Figs. 16 and 17, the shaft 135 is suitably journalled as shown and intermediate the journals the shaft is provided with a crosssection as shown in Fig. 17. In general the contact operation of this unit is as follows: The unit comprises the required contacts which may include normally closed contacts, transfer or shift contacts and normally opened contacts. Each set of contacts has a tripping magnet associated therewith. Such tripping magnets are designated ADu, ADt, ADh and ADth. "u," "t," "h" signifies units, tens and hundreds orders, etc. Upon energization of either of these magnets their contacts will be tripped so that they shift from reverse position from that shown. The contacts are designated with suffix numerals 1 to 3. Such contacts thereafter remain in such shifted position until the shaft 135 makes one-quarter of a revolution wherein the contacts are mechanically restored to their initial position. Such contacts are then again latched in such position. The rotation of the shaft 135 also mechanically knocks off the armatures as well as mechanically restoring the contacts to their initial position. The electromagnetic relay unit is of the form shown in copending application of James M. Cunningham, Serial No. 135,503, filed April 7, 1937.

Referring to Fig. 17, ADt is one of the tripping mechanisms. Cooperating therewith is a spring retracted armature 136 which has its upper portion in contact with a latch piece riveted to an insulating strip 137 to which the lowermost contact blades are riveted. Suitable springs such as 138 bias the lowermost contacts and strip 137 downwardly. The insulating strip 137 extends along and overlies the square shaft 135. It will be self-evident that upon energization of a magnet such as ADt the related contacts will shift to reverse position and remain in such position. Thereafter upon one-quarter of a revolution of shaft 135 one square corner of the shaft will first abut the insulating strip 135 and lift it to upper position restoring the contacts and slightly later another corner of the square shaft 135 intercepts a camming element 139 integral with the armature 136 and positively shifts the armature away from the magnet into latching position. The construction is substantially duplicated for the right hand section of the unit. It will be understood that the upper contacts of a set are shifted by insulating members 140.

Cam timing diagrams

The cam timing diagrams, Figs. 25 to 27, are self-explanatory. It should be noted that the CC cam contacts make one revolution per machine cycle. The FC cam contacts of Fig. 26 on the other hand make on revolution per card feed cycle which comprise two machine cycles. The XC cam contacts of Fig. 27 make one revolution for three machine cycles.

Control pin box units

The present machine utilizes certain card control pin box units for setting up certain selected connections. In the present machine three of such units are utilized.

The construction of the units is generally similar to the construction shown and described in copending application to G. Lowkrantz, Serial No. 7,319, filed February 20, 1935.

Figure 19:
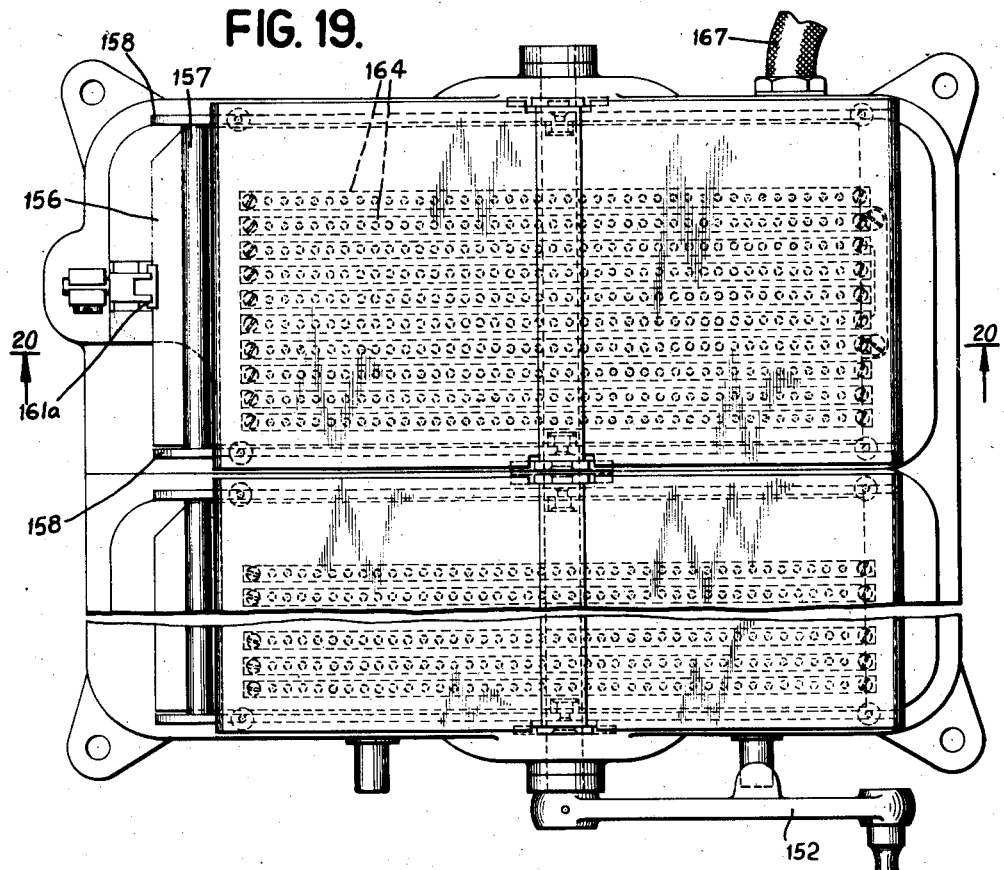
Fig. 19 is a top plan view of one of the pin box sensing units utilized in the machine.
Figure 20:
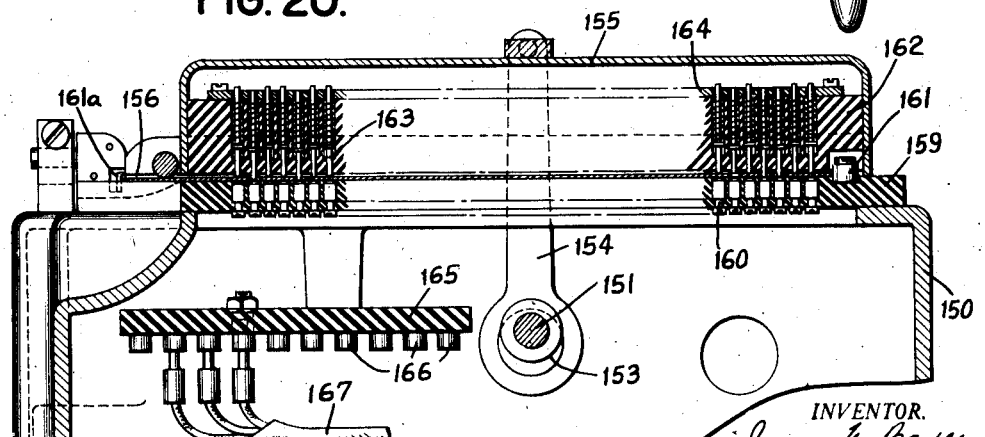
Fig. 20 is a cross-sectional detail view, the section being taken substantially on line 20—20 of Fig. 19 and looking in the direction of the arrows.

Referring to Fig. 19, there is here shown a pin box card unit adapted for receiving two cards. The upper part shows one complete card in position in the unit and the lower portion is broken away to conserve space. The machine utilizes three of such pin box units, viz., two two-card units and also a single card unit. In lieu of using the single card unit, another two card unit may be employed and one card be left out and not utilized. Each pin box card unit comprises a base generally designated 150. Rotatably fixed in the base 150 is a cross-shaft 151 carrying an operating handle 152 fixed on its end. Crossshaft 151 is provided with a pair of eccentrics 153 which cooperate with pitmans 154. These pitmans at their upper ends connect to a head member 155.

It will be understood that by rotating the crank 152, 180 degrees to the left from the position shown in Fig. 19, that the head 155 will be elevated from the position shown. With the head in such elevated position a tabulating card having the required perforations therein, such as card 156 (Fig. 19) will be inserted under the guiding roller 157 and between the side guide frames 158 and introduced under the head 155. The inserted tabulator card slides over an insulating plate 159 which is fixedly carried by base 150. This insulating plate carries a number of fixed contacts generally designated 160 in index point relation. To limit the insertion of a card and bring it into proper relation with the contacts, fixed card stops 161 and 161a are provided. The upper movable head 155 carries a cross block of insulating material 162 which is bored out to receive a series of spring actuated contact elements 163. The lower ends of these contact elements are in the form of pins which are adapted in the head in lower position to project through the perforations in the cards and establish contact with the contact blocks 160. The upper ends of the contact elements 163 in each row establishes connection with contact strips such as 164. It will be understood that there is one contact strip 164 for each transverse row of index point positions on the card which is sensed. In Fig. 19 there are shown ten of such transverse contact strips. Within the base of each unit there is provided an insulating terminal block 165 carrying a plurality of plug sockets 166 each with a terminal connected thereto. The common bars 164 are each individually connected to one of the terminals and plug sockets 166 and the contact blocks 160 in a common row (i. e., a vertical row or column in Fig. 19) are also connected individually to the terminals and plug sockets 166. The plug connections established to 166 are finally brought out to wiring which is let out from the base of the pin box unit in a cable 167.

It will be understood that by properly punching a tabulating card and inserting it in the pin box unit and then closing down the head of the unit that selective circuit relations can be established from the bars 164 to the contact blocks 160, according to the perforations which are in the card which is within the pin box.

Typical reducing constant pattern cards adapted for use in the pin box units are shown in Figs. 44 and 45. The card of Fig. 44 is shown divided in four main zones or fields, one field for each of the digital multiples from X1 to X4. The card of Fig. 45 is shown as sub-divided into five fields, one for each digital multiple from X5 to X9. Each field is further sub-divided into a left hand field and a right hand field. The left hand field pertains to one reducing constant and the right hand field to another reducing constant. With the typical cards of Figs. 44 and 45, the reducing constants are those required in reducing the units of a British currency amount to the value of the lowest unit. Thus the set of left hand fields are pre-perforated to represent 12, 24, 36, 48, 60, 72, 84, 96 and 108. 12 is the reducing constant to reduce shillings to pence and the other amounts are the two to nine multiples of 12. The set of right hand fields are pre-perforated to represent 240, 480, 720, 960, 1200, 1440, 1680, 1920 and 2160. 240 is the reducing constant to reduce a pound to pence and the other numbers are the two to nine multiples of 240.

In addition to the pattern cards of the form shown in Figs. 44 and 45 a so-called conversion card is utilized which card is perforated in a single field with a conversion ratio number. It will be understood or subsequently explained that different pattern cards perforated with different conversion constants or conversion ratio constants may be employed and in some instances a plurality of sets of pattern cards are used.

Fig. 18 shows diagrammatically the wiring of the pin box unit for the times one multiple. 163 represents the pins and 160 represents the blocks. The pins 163 connect to the cross bars 164 (see also Fig. 19), which are connected to an emitter so that the pattern card will allow selected impulses to flow through the blocks 160 which are wired vertically for each column as shown. With the pattern card of Fig. 44 the impulses which would flow out from the pins would represent 12 and 240.

Fig. 18a represents the pin box unit wiring for any of the other multiples from two to nine. Here again 163 are the pins which are wired by the cross bars 164 to an emitter and 160 are the contact blocks which are wired in vertical columns to outgoing lines. With the pattern card of Fig. 45 in the pin box unit, considering the five multiple section, the outgoing impulses would be 60 and 1200.

On the wiring diagram the pin box units are shown as boxes labelled with the related multiple such as X1, X2, etc. The pin box unit of Fig. 18 is shown on the circuit diagram with a double line enclosing box whereas the other units from two to nine corresponding to Fig. 18a, are provided with a single line enclosing box.

In the subsequent description, certain terminology will be used and definitions of this terminology will be here given.

A compound denominate number will be referred to as having various units. For example, with a compound denominate amount of five pounds, ten shillings and seven pence the pence will be one unit, the shillings another unit and the pounds another unit. Reducing constants will also be referred to. Such reducing constants are thus required to convert larger units of the compound denominate number to the value of the smallest unit. The constant required for reducing the larger unit to the smallest unit will be referred to as the first reducing constant and the constant required to reduce the intermediate unit to the smallest unit will be referred to as the second reducing constant. For example, with British currency computations, 240 is the first reducing constant and 12 is the second reducing constant. If a British currency computation was involved, wherein reducing was only required to shillings and not to pence, the pounds to shillings reducing constant would still be referred to as the first reducing constant.

Conversion ratio constants or numbers will also be referred to. These are numbers to convert a unit in one system to a unit in another. For example, a number to convert pence to cents.

Reducing multiplying operations or a reducing multiplying phase will also be referred to. Reducing multiplying operations refer to operations wherein a compound denominate number is reduced to its lowest unit value by multiplying the larger units of the compound denominate number and their proper reducing constants together and combining the results with the smallest unit of the compound denominate number.

Regular multiplying operations will be referred to. These operations are those wherein an amount is multiplied by a regular number, which regular number may be a whole number, a decimal number or a mixed number.

Reducing dividing operations pertain to such operations wherein a number is divided by one or more reducing constants to reduce by division an amount expressed in a smaller unit to a compound denominate number involving a plurality of larger units.

Regular dividing operations will also be referred to. Regular dividing operations are those wherein a number is divided by another number with the quotient result expressed in the same unit value as that of the dividend. To illustrate, an amount expressed in pence can be divided by a regular number amount such as 2.58 to obtain a pence quotient result.

Before explaining the machine in detail, its general principles of operation may be briefly explained and some typical problems which the machine is capable of calculating can be briefly alluded to.

Multiplication in general

Assume it be desired to multiply a compound denominate number by a regular number (which regular number may comprise a whole number, a decimal number or a mixed number).

A machine after receiving both terms from a record proceeds to automatically reduce the various units of the compound denominate number to the lowest unit value, that is to say, if the compound denominate number involves pounds, shillings and pence, the shillings and pounds will both be reduced to pence and will be added to the pence amounts. This phase of the operation may be termed the "reducing multiplying phase." Thereafter the pence result thus obtained is multiplied by the regular number. This operation may be termed the "regular multiplying phase" and it will be appreciated that the result thus secured will be in the value of the smallest unit in the compound denominate number, for example, in pence. After this phase of the calculation the machine proceeds to reduce by dividing the smallest unit result successively by different reducing constants, first carrying out a dividing operation to get say a pound result and then carrying out a further different dividing operation to get a shillings result with a pence remainder. Such phase of the calculation may be termed the "reducing dividing phase." The machine then automatically records the result which is expressed in compound denominate number form.

Assume that it is desired to perform a computation wherein 5 £, 16 s. and 7 p. is to be multiplied by a regular number amount such as 25.8. The machine first takes in or receives both terms or factors in the diverse differing notations. Before the calculation is started the machine is set up to provide the reducing constants to reduce any shilling digital amount to pence and for reducing any digital pound amount to pence. The reducing constant for reducing one shilling to pence is 12 and the complete set of constants for reducing any shilling amount from 1 to 9 to pence comprises the amounts 12, 24, 36, 48, 60, 72, 84, 96 and 108. Such set of reducing constants are pre-available in the machine before calculating operations are started. The reducing constant for reducing one pound to pence is 240, i. e., 1 £ equals 20 s., which with 12 pence to a shilling equals 240 pence. The complete set of reducing constants for reducing all of the digital pound amounts from 1 to 9 to pence comprise the set of numbers 240, 480, 720, 960, 1200, 1440, 1680, 1920 and 2160. Such set of reducing constants for reducing all digital pound amounts to pence are pre-available in the machine before the calculation starts.

Upon and following the receipt of the compound denominate number amount of 5 £, 16 s. and 7 p. the machine selects the pre-available 6 multiple of the shilling to pence constant, i. e., 72 and adds this amount to 7 pence, obtaining a result of 79. There is also a selection of the one multiple and such one multiple, i. e., 12 is entered in a shifted over columnar relation to in effect add 120 to the previous sum of 79. The machine thereafter selects the 5 multiple of the pounds to the pence constant, i. e., 1200 and this amount is added to the other amounts to give a final pence result of 1399 pence. 1399 pence is the pence equivalent of the compound denominate number amount of 5 £, 16 s. and 7 p. Having obtained this value expressed in pence, the machine proceeds to multiply 1399 by 25.8, handling this computation just as if a simple computation were being performed in the Arabic notation. The pence product result of 36094.2 is ultimately obtained in the machine, thereupon the machine proceeds to reduce the result back into pounds, shillings and pence. First there is a division by the pounds to pence constant to obtain the pound amount, i. e., 36094.2 is divided by 240, giving a result of 150 pounds with the remainder of 94.2 pence. The 94.2 pence remainder is then divided by 12, the shillings to pence constant, to obtain the number of shillings in the result; i. e., 94.2 divided by 12 equals 7 shillings with the remainder of 10.2 pence. Accordingly, the final result of multiplying 5 £, 16 s. and 7 p. by 25.8 is 150 £, 7 s. and 10 p. In the present machine fractional parts of pence, i. e., farthings, are disregarded and the machine calculates only to the nearest pence amount.

Dividing in general

In the event that the calculation is one of division instead of multiplication wherein a compound denominate number is to be divided by a regular number, the initial calculating procedure is the same as before, i. e., after the terms are received the compound denominate number term is reduced to the related value of the lowest unit. This phase may again be termed the "reducing multiplying phase." The following phase which may be termed the "regular dividing phase" is one in which the lowest unit result is divided by the regular number to obtain an intermediate result expressed in the term of the lowest unit value of the compound denominate number term. Thereupon follows a reducing dividing phase in which the result is successively divided by the required number of reducing constants related to the compound denominate number to obtain a final result expressed as a compound denominate number. Such result is thereupon recorded.

When division calculations are to be performed, the mode of operation is generally similar to the steps explained before except that the calculating step is that of division instead of multiplication. Assume for example that the dividend amount is 99 £, 19 s. and 6 p. and that the divisor amount is 2.2. The compound denominate number amount is first reduced to pence as in multiplication. The pence equivalent is 23994. This pence amount is then divided by 2.2 giving a pence quotient result of 10906 pence. Such pence result is first divided by 240, the pounds to pence constant, giving a pounds result of 45 pounds with a pence remainder of 106. The 106 pence remainder amount is then divided by 12, giving a shilling amount of 8 with a pence remainder of 10. Accordingly, the final result of the dividing calculation is 45 £, 8 s. and 10 p.

Conversion of compound denominate number to regular number

The machine may also be used to convert an amount expressed as a compound denominate number to a regular number. For example, a pound, shilling and pence amount can be converted to a dollars and cents amount. To effect such calculation the machine first proceeds through a multiplying reducing phase to reduce all units of the compound denominate number to the value of the lowest unit of such number. In handling this problem, the compound denominate number is derived from a regular record card and in addition a conversion ratio number is provided on the supplemental pattern card. After the reducing multiplying phase the machine goes through a regular multiplying operation or regular multiplying phase to convert the units of one system to the units of another. For example, the pence amount would be multiplied by a conversion ratio number such as 206 to obtain a result expressed in dollars and cents, taking into account a certain rate of exchange. In such regular multiplying phase the conversion ratio number is derived from the supplemental pattern card. The final result is then recorded, no intervening reducing dividing phase being required with this particular problem.

Conversion of regular number to compound denominate number

Alternatively an amount expressed in the decimal system as a regular number can be converted to a compound denominate number. In this case an amount expressed in dollars and cents for example and derived from a regular record card is first carried through dummy calculation operations which involve a multiplication by one. This operation occurs in what may be termed an idle reducing multiplying phase. Following this phase there is a regular dividing phase to convert the regular number amount to an amount expressed in terms of the lowest unit of the compound denominate system. This is done by dividing the regular number expressed in cents by a suitable conversion ratio number such as 206, which conversion ratio takes into account a current rate of exchange. Following this operation there is a further reducing dividing phase in which the amount previously obtained expressed in terms of the lowest unit of the compound denominate number is successively divided by different reducing constants to reduce the number to a compound denominate number expression. With this type of calculation there are two sets of reducing constants employed, derived from different sources such as pattern cards. One set is used for the dummy first reduction and the other set is used for reducing dividing reduction. There is a further pattern card provided for the conversion ratio number.

Conversion of duo-decimal amounts in one system to duo-decimal amounts in another system Another type of calculation may also be performed by the machine, i. e., a compound denominate number expression in one system of units may be converted to a compound denominate number expressed in a different system of units. For example, an amount expressed in rupees, annas and pice, the Indian currency system can be converted to an amount expressed in pounds, shillings and pence (the British currency system).

In handling this type of calculation there is first a reducing multiplying phase wherein the rupees, annas and pice are all reduced to pice. A regular dividing phase then follows in which the number expressed in pice is divided by a conversion ratio number to obtain an amount expressed in pence. The conversion ratio number takes into account a current rate of exchange. There then follows a further reducing dividing phase wherein the pence amount is reduced to pounds, shillings and pence. With this type of problem there are two sets of pattern cards for the two sets of reducing constants and there is also a pattern card for the conversion ratio number. After the final result is obtained the result is recorded.

The machine is also capable of handling the above problem in a different way. In place of performing a regular dividing phase there is a regular multiplying phase. This involves the use of a different conversion ratio number, viz., the reciprocal of the conversion ratio number previously utilized in converting pice to pence. It will be appreciated that a pound, shillings and pence amount expressed in the British currency can also be converted to rupees, annas and pice amounts in the Indian currency system. In such case there is a first reducing multiplying phase wherein the pounds, shillings and pence are reduced to pence. A regular multiplying phase then follows in which the number expressed in pence is multiplied by a conversion ratio number to obtain an amount expressed in pice. The conversion ratio number takes into account a certain rate of exchange. Following this there follows a reducing dividing phase wherein the pice amount is reduced to rupees, annas and pice. This same problem could be calculated by utilizing a regular multiplying phase and utilizing the reciprocal of the conversion ratio number previously utilized.

While the foregoing explanation has explained typical calculations involving a compound denominate number expressed in British currency, the machine is not limited to British currency calculations, but with the machine it is possible to calculate computations wherein one term is in the Arabic notation and wherein the other term is any compound denominate number. For example, it is possible to compute calculations wherein the compound denominate number involves yards, feet, inches, or other calculations involving gallons, quarts and pints or bushels, pecks, quarts and the like. Where different compound denominate amounts are involved for one term it is only necessary to utilize the reducing constants for the particular compound denominate number which is involved in the calculation. The computation can be effected with any compound denominate number by properly setting up the reducing constants for such number.

As a simple way for changing the reducing constants for one term use is made of pattern cards. One or more of these pattern cards may be employed and such pattern cards can be pre perforated with the proper pre-computed reducing constants according to the compound denominate number which is used in the calculation. Different sets of such pattern cards or constant cards may be pre-available for different kinds of compound denominate numbers. When it is desired to compute according to any particular compound denominate number calculation the operator of the machine selects the pre-available pattern card or cards and inserts these into a pin box in the machine. The pattern cards in effect afford setups of the compound denominate number reducing constants. After these pattern cards are in place, the machine is automatically ready to compute by first reducing various terms of the compound denominate number to a value base expressed in the lowest term.

Multiple build up and storing

The present machine includes a plurality of multiple storage means. In certain cases amounts are initially received in these storage means from the record card and in other cases amounts are initially received from the pattern cards previously referred to. The original amount is entered into five accumulating type receiving devices. Amounts are entered into these receiving means from the record or pattern cards and there is a subsequent building up of multiples of the entered amounts.

Before explaining the manner in which these multiples are built up, it may be stated that certain of the entry receiving devices which receive amounts, are provided with so-called doubling readouts, these doubling readouts are fully described in British Patent No. 456,367. In the machine cycle following the entry cycle, twice the amount entered in one receiving device is read out from the doubling readout illustrated with the ML—2 accumulator and such doubled amount is entered into ML3—6, ML4—8, ML—5 and ML—9. On the following machine cycle, twice the amount is again read out from the doubling readout of ML—1—2 and entered into ML4—8 and ML—5. Concurrently, and during this same cycle six times the amount is read out from the doubling readout associated with ML3—6 and such doubling readout is entered into ML—1 and ML—9. This completes the building up operation.

The foregoing multiple storage means are utilized both on multiplying and dividing calculations. On multiplying calculations two result accumulators are provided. This enables multiplication by two orders of the multiplier to be effected concurrently and during the same machine cycle. A cycle controller is provided to control the sequence of machine cycles and to eliminate operations pertaining to zeros. During computing cycles upon multiplication, the machine selects under the control of the multiplier entry receiving device which multiples are to be entered into the result receiving device. Assume for example the multiplier amount is 27. In this case the times seven would be read out from MLR—7 and entered into RD, and concurrently with such entry the times 2 multiple would be read out from MLR—2 and entered into LQ. Further computing operations would subsequently ensue for further calculations of the multiplier and after the various entries are effected there is a gathering together cycle in which the amount in one of the result accumulators is transferred to the other.

It may be stated that in the present machine in some instances, there is a transfer of the amount from LQ to RD and in other instances, there is a transfer in reverse relation, that is from RD to LQ. Final result recording is effected under the control of the LQ accumulator device in all cases.

In general in the present machine the operations of regular multiplying and regular dividing utilize the same general means and procedure as employed in the machine shown and described in the copending application of James W. Bryce and Arthur H. Dickinson, Serial No. 213,044, filed June 10, 1938, now Patent No. 2,328,610, dated September 7, 1943. Reducing multiplying and reducing dividing operations are effected in a somewhat modified manner with a modified control of the operations.

Machine capacity

Before describing machine operations it may be stated that the machine herein delineated has been shown with a limited columnar capacity. For simplicity of illustration the capacity of the machine as shown by the circuit diagram for multiplication is shown with three orders for the decimal amount and for the compound denominate amount the capacity is six orders, two orders being provided for each unit, i. e., the capacity in pounds, shillings and pence would be 99 £, 19 s. and 11 p.

It will be appreciated that in actual practice the machine would have a greater columnar capacity. Greater columnar capacities involve merely duplication of circuits, relays, entry receiving devices, etc.

Upon division calculations, wherein a compound denominate amount is divided by a decimal amount the capacity is as follows: The divisor capacity is three digits and the dividend is the same as before for the compound denominate amount, that is six orders with two columns for each unit of the compound denominate number, i. e., the pound, shillings and pence capacity for the dividend would be 99 £, 19 s. and 11 p. and the divisor capacity would be 999.

Multiplication of a compound denominate number by a regular number

The general operation for multiplying a duodecimal amount by a decimal amount will be first generally explained without detailed tracing of circuits.

Assume a record card contains as one term a British currency amount of 5 £, 16 s. and 7 p. and that the other factor of 25.8 is also on the same record. The proper conversion constant pattern cards are placed in the pin box. When the machine operation starts the pence amount is read direct from the record and entered directly into RD. The 25.8 amount or factor is read from the record and entered into ML—1—2, ML3—6, ML—5, ML—7 and ML—9. Following this entry operation the build up cycles ensue to build up the complete set of multiples of 25.8 in the various multiple storage devices.

On the card reading cycle the pound and shilling amounts derived from the record are entered into the MP receiving device. In the machine cycle following the two machine cycles used for card feed (see Fig. 28), the LQ accumulator is reset to zero. Following this cycle a series of machine cycles ensue wherein the pounds and shilling amounts derived from the record and now standing in MP are reduced to the smaller unit. The MP receiving device controls multiple selection of reducing constant amounts derived from the pattern cards. The sixth multiple of the second constant, i. e., 72, is derived from the pattern card affording such constant and entered into RD. During the same cycle the one multiple of the second constant is derived from the pattern card and entered into LQ in proper columnar relation. On the following machine cycle the 5 multiple of the first constant is entered into RD in proper columnar relation. On the following machine cycle there is a transfer of the amount in RD to LQ. During this same machine cycle MP is reset. On the following machine cycle RD is reset and the amount standing in LQ is transferred to the MP receiving device. On the next following machine cycle the LQ accumulator is reset.

It may be now explained that the compound denominate amount as expressed in pence now stands in MP and this may be considered the multiplier factor of the subsequent computation. Regular multiplying cycles now ensue and there is the derivation of the 9 multiple of 25.8 from MLR—9 with the entry of such 9 multiple into RD. Concurrently with this entry there is a derivation of another 9 multiple of 25.8 from MLR—9 and an entry of such multiple amount into LQ in proper columnar relation. On the following machine cycle there are corresponding entries of the 3 and 1 multiple of 25.8 with the entry of such multiples respectively into RD and LQ. Regular multiplying entry cycles are now complete and upon the following machine cycle there is a transfer of the amount in LQ to RD. The various multiplying receiving devices and the MP receiving device are reset in this cycle. Following such machine cycles LQ becomes reset. At the stage of the computation the product result expressed in pence stands in RD. The ensuing operations are those of division (reducing dividing) in which the pence product amount is converted back to pounds, shillings and pence. Briefly, the machine compares a comparison portion of the pence products (which amount is now the dividend) with all of the pre-available first reducing constants. The pattern cards for the first reducing constant control the setup of one side of the comparing units and the comparison portion of the dividend controls the setup of the other side of the comparison units. The comparison units select which is the highest going multiple contained in the comparison portion of the dividend and there then follows a deduction of such highest going multiple with a corresponding entry of the related quotient pound amount into LQ. Several comparing cycles ensue and ultimately the complete pounds result becomes set up in LQ. After such several cycles there is a pence remainder remaining in RD. The machine now proceeds to make a new set of comparisons utilizing the second reducing constant. Successive comparison and entries of quotient amounts of shillings ensue. Shilling entries are made into LQ. Ultimately there is a final pence remainder which stands in RD. In a final machine cycle there is a transfer of the pence remainder amount from RD to LQ. The machine is now ready to punch the final result in pounds, shillings and pence back on the record and a new machine cycle is started up pertaining to a following record.

The foregoing briefly traced the operations involved in multiplying a compound denominational amount by a regular number amount expressed in the Arabic notation.

It will be assumed that a set of record cards have been properly perforated with both factors, one factor being a compound denominate number such as pounds, shillings and pence and the other being a regular number. These record cards are placed in the supply magazine of the machine. The operator must then prepare the machine for the computation which is to be performed. First the operator selects the pattern cards with the proper reducing constants. With the British currency calculation the operator would select two cards. One card would be perforated with multiples of from one to four of the first reducing constant and multiples of one to four of the second reducing constant. The other card would have perforated thereon multiples from five to nine of the first and second reducing constants. While all reducing constants from one to nine might be placed on one card, the columnar limitations of card size dictate the use of two cards in place of one large card. Such cards are placed in the pin box and the pin box closed. With such cards placed in the pin box emitter circuits are established through the cards so that any of the multiples appearing thereon can be derived from such cards.

*Plugging for maximum decimal place position*

With the present machine as herein disclosed, the columnar capacity is somewhat limited for simplicity of disclosure. Since decimal amounts may be involved in the regular number, provision is made for plugging the machine in advance of a computation according to the maximum number of places to the right of the decimal point which may be encountered in any cards of a run. If the maximum number of possible decimal places to the right is one place, there would be one place plugging and with such plugging the machine would also handle calculations wherein no decimal amount appeared to the right of the decimal point such as 25.0. With two place plugging the machine would handle calculations involving up to two places of decimals and with three place plugging the machine would handle three places of decimals or less. Computing to an increased number of decimal places limits the number of whole numbers in the regular number but by extending the capacity of the machine a greater number of whole number orders can be computed. Usually the decimal relation is maintained on all cards in a run, but when amounts to be computed have only relatively higher denominational values the decimal point relation can be changed from that established for cards which contain only amounts in lower denominational relations, thereby utilizing the maximum of machine capacity.

Figure 23B:
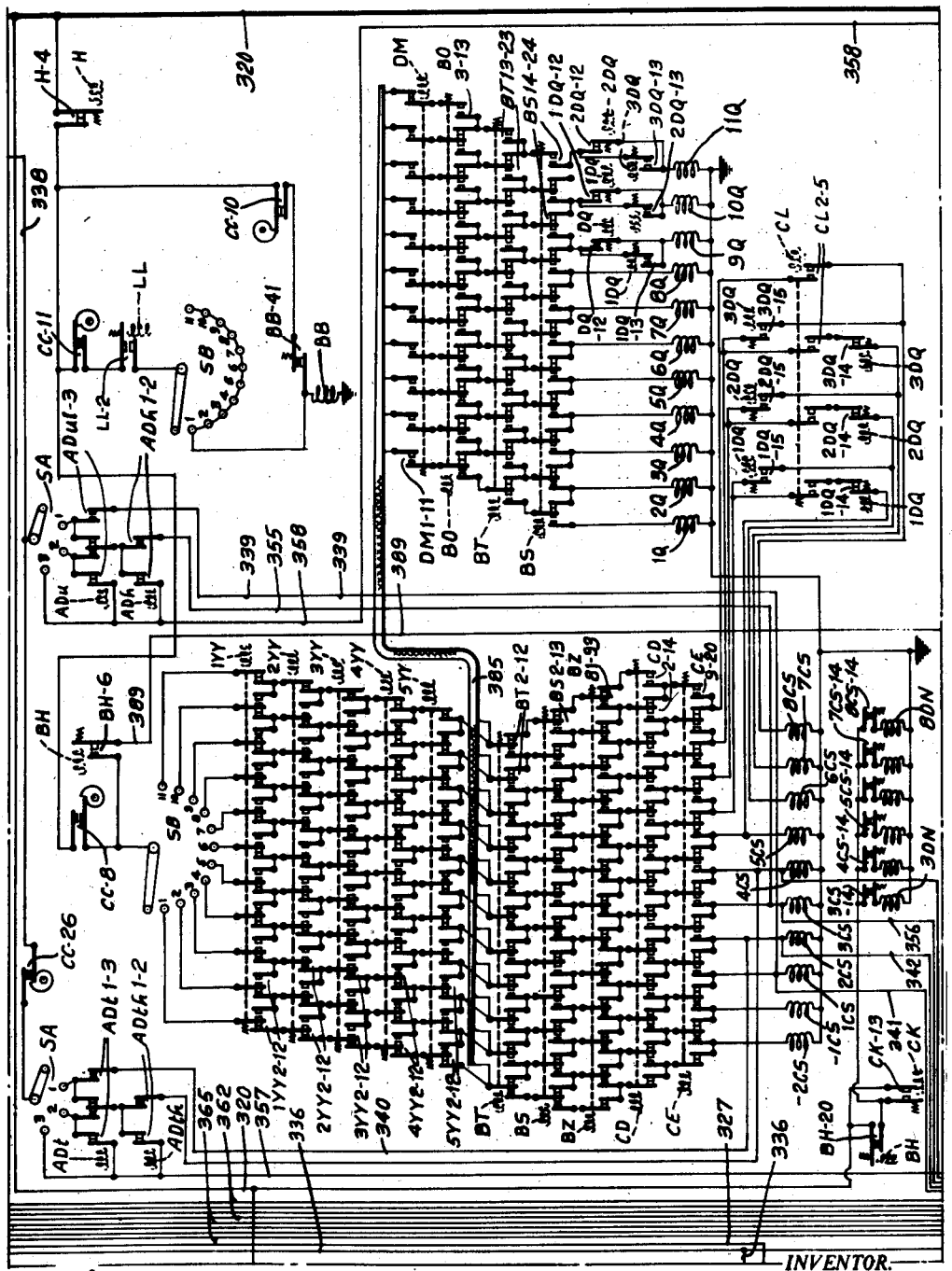
Figure 23C:
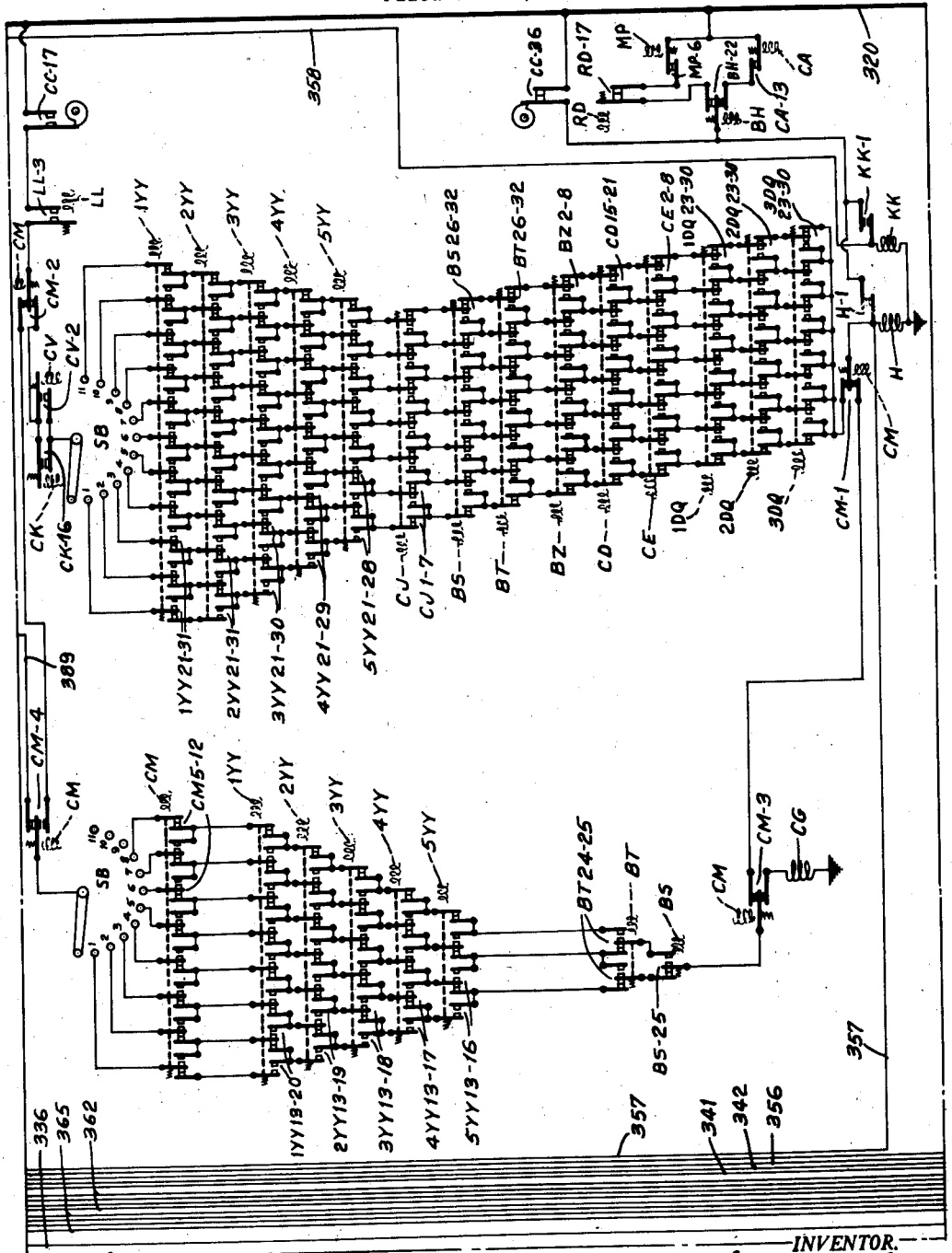
Figure 23E:
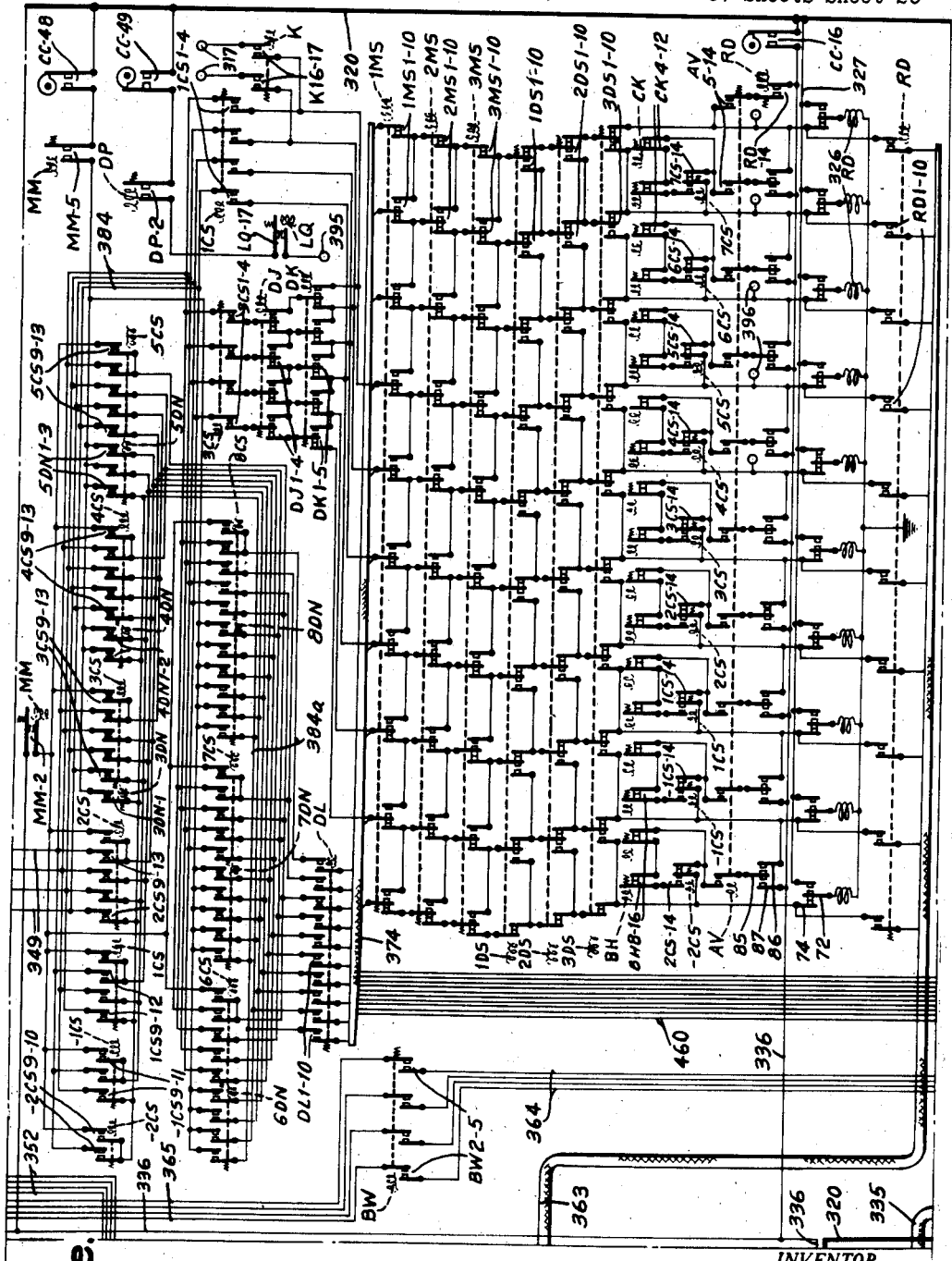
Figure 23F:
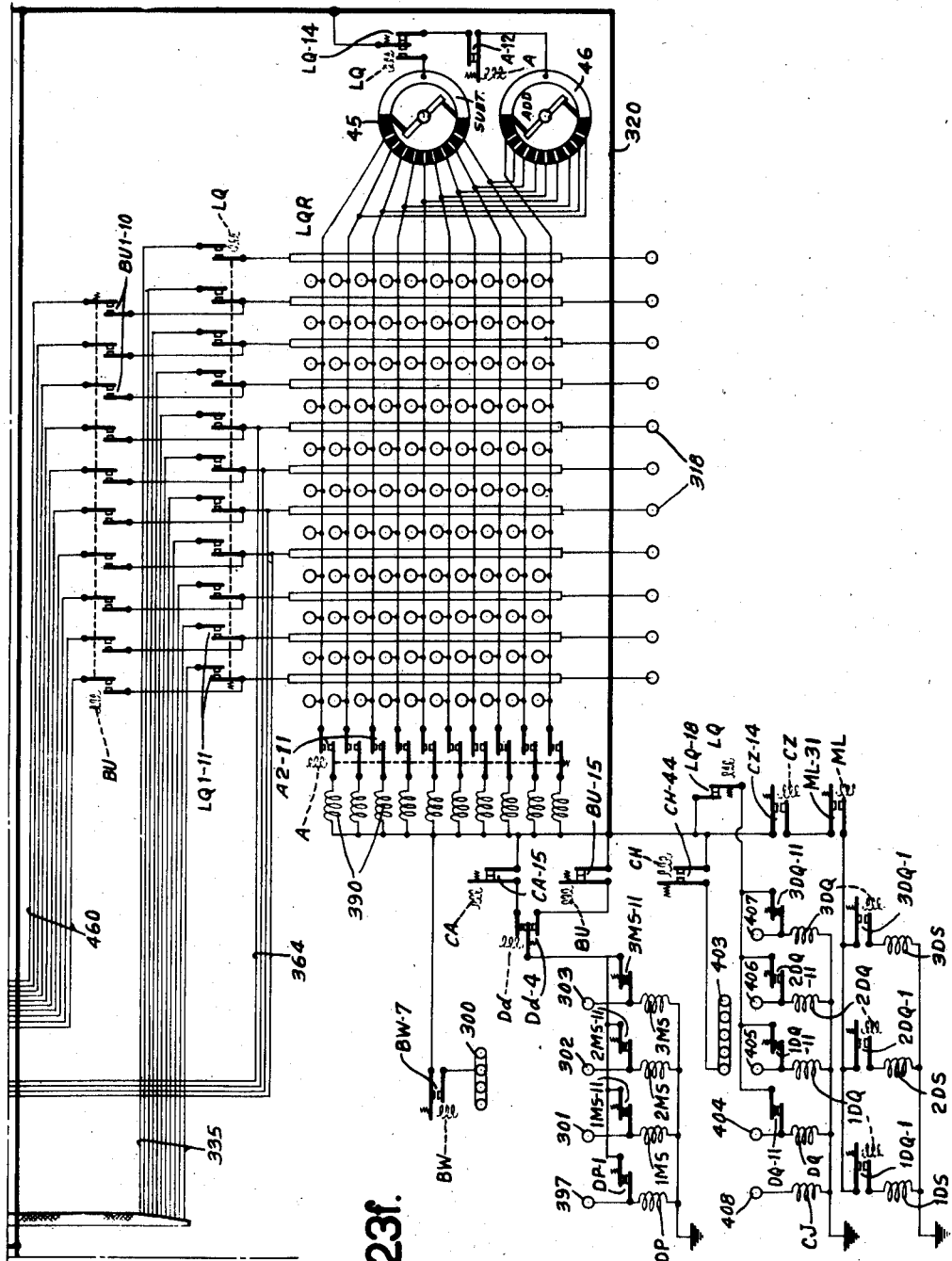

Referring to Fig. 23f a set of multiple plug sockets 300 are provided. Companion sockets 301, 302 and 303 are provided. In the event that the maximum number of decimal places in the regular number is one, a plug connection would be effected between 300 and 301. If, on the other hand, the maximum number of decimal places was two, the connection would be between 300 and 302, with a further connection between 300 and 301 and if the maximum number of decimal places in the regular number was three places there would be three plug connections, viz., between 300 and 301 and between 300 and 302 and between 300 and 303.

With the typical problem, viz. 5 £, 16 s., 7 p. times 25.8 there would be only a single plug connection between 300 and 301.

*Pre-plugging for places in compound denominate number*

Figure 22B:
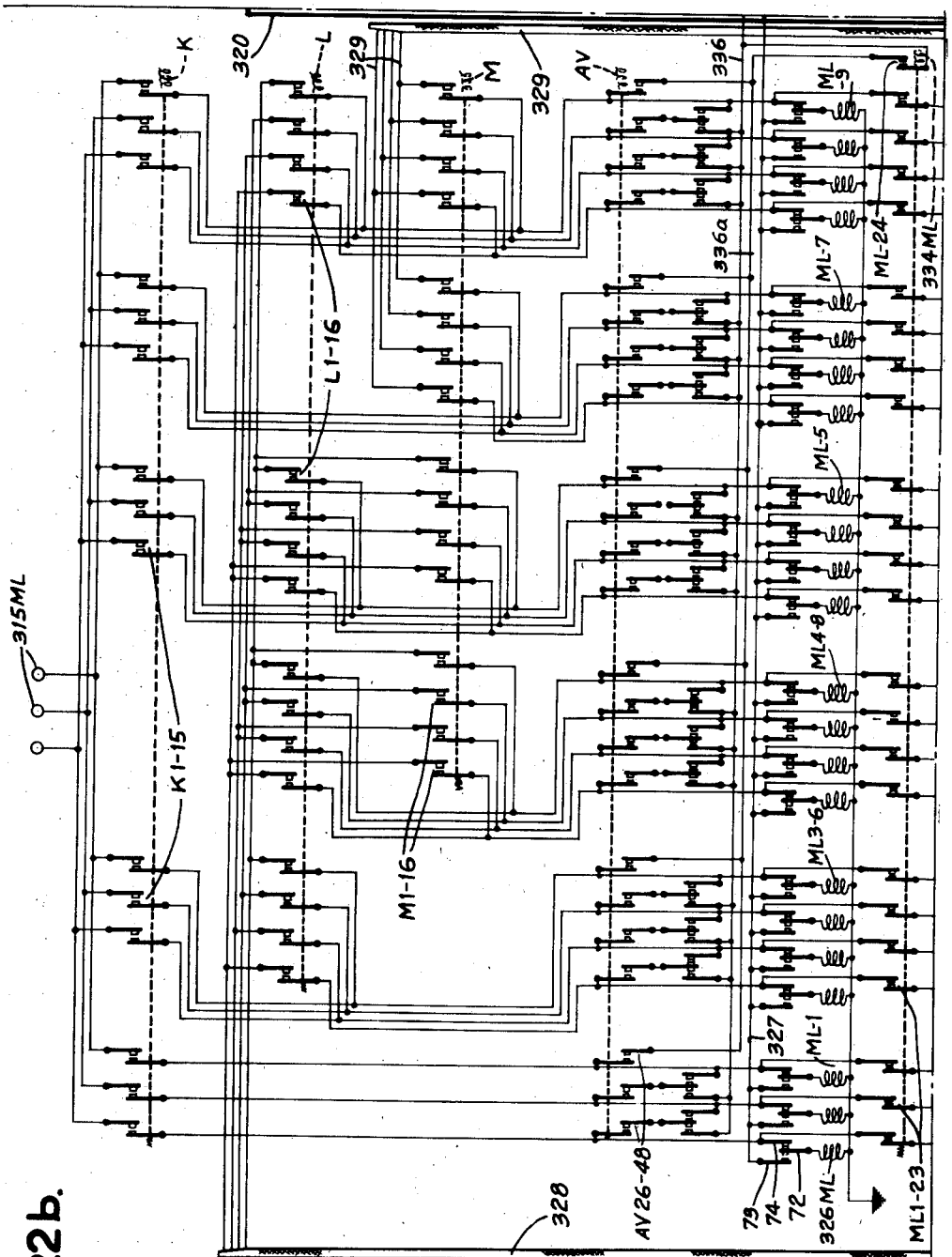
Figure 22C:
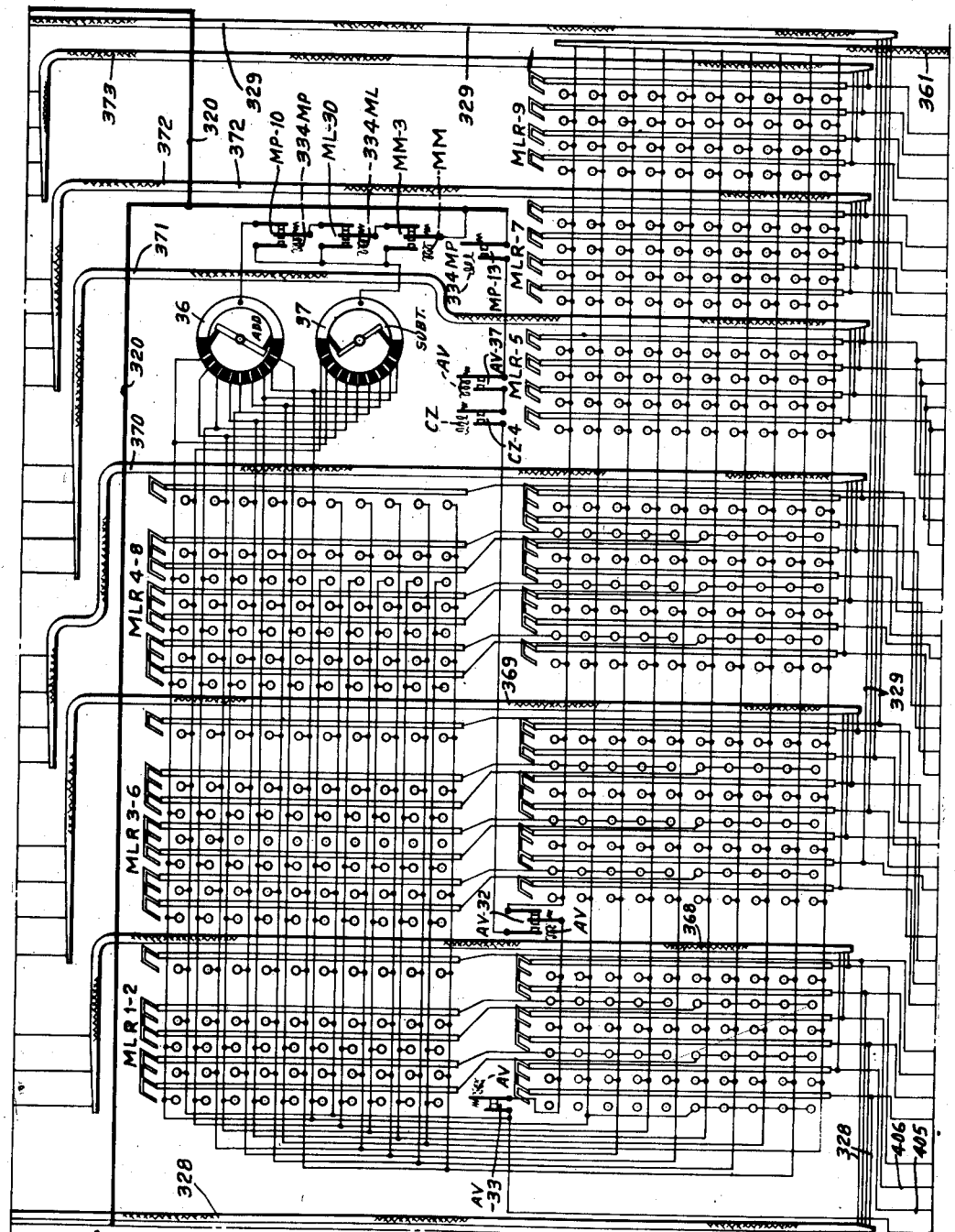
Figure 22D:
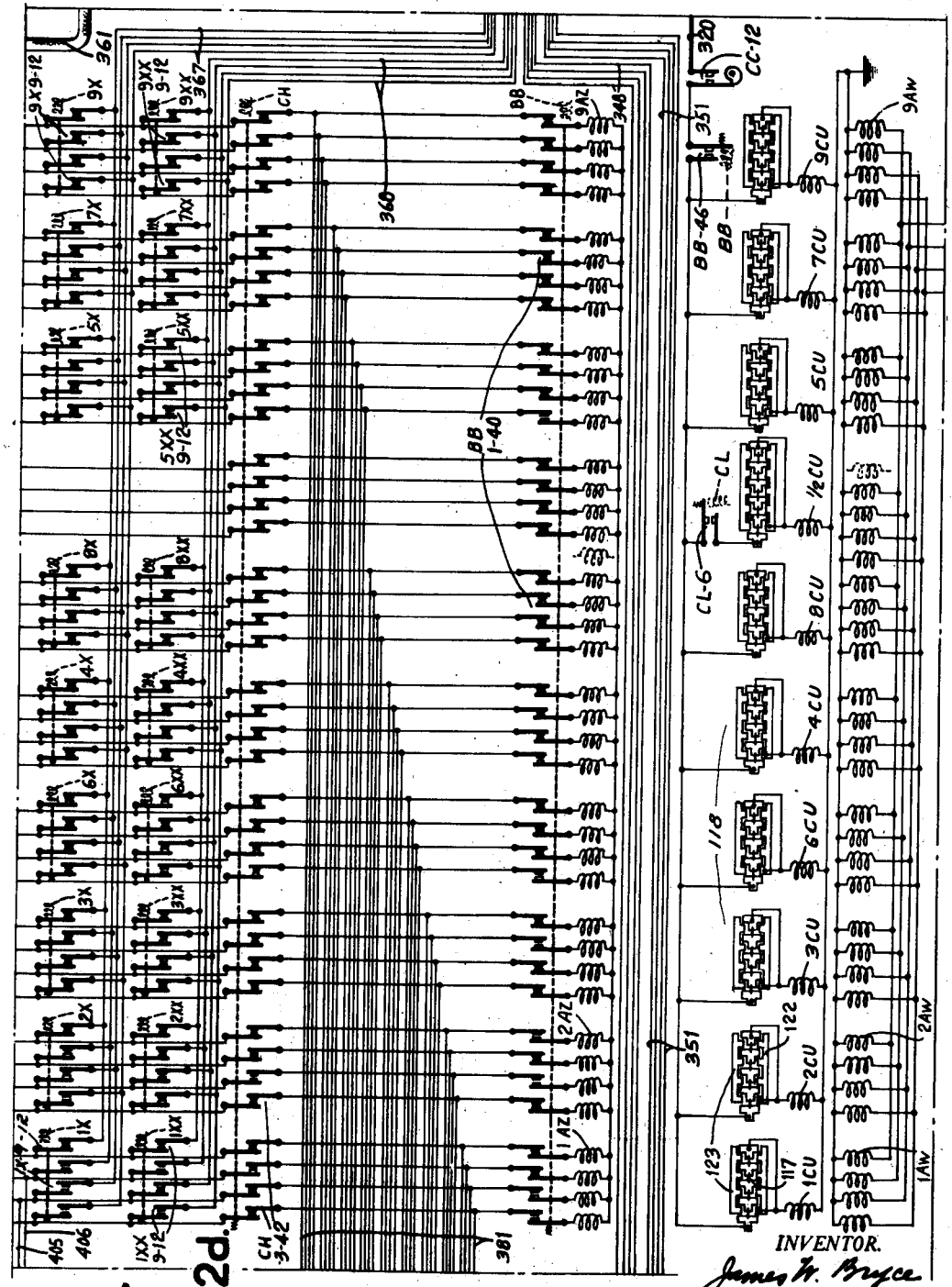
Figure 22F:
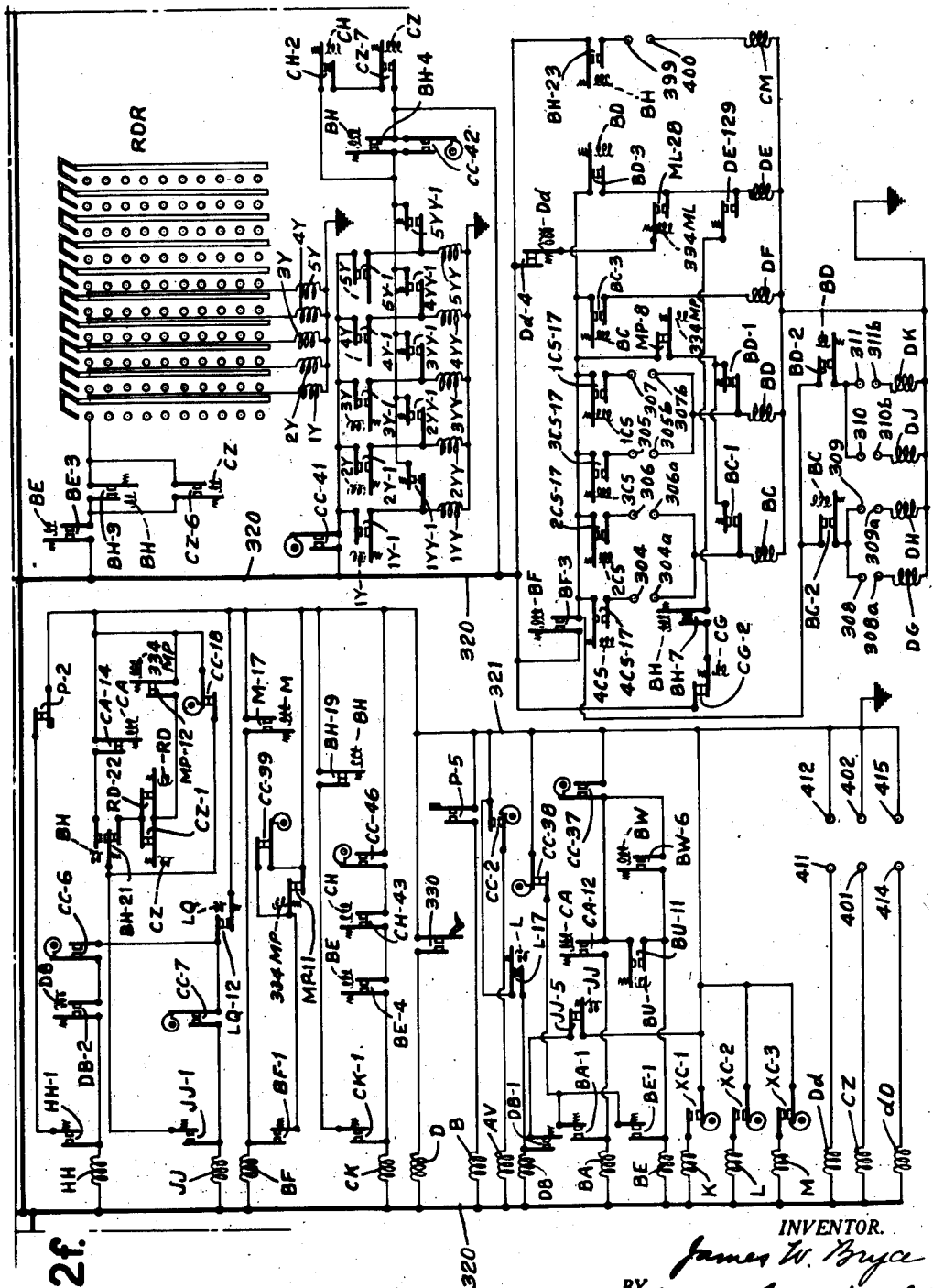

Further pre-plugging is provided depending upon the number of places in one of the terms of the compound denominate number. For a compound denominate number having an intermediate term which is of a maximum of two places, the machine must be pre-plugged for such maximum of two places in order to properly control machine operations. If the number of places in the intermediate term was less than two places, the machine would be correspondingly plugged. Assuming that the intermediate term is a two place term, the plugging would be as follows:

Referring to Fig. 22f, plug sockets 304, 304a, 305, 305b, 306, 306a, 307, 307a are provided. Also further sockets 308, 308a, 309, 309a, 310, 310b, 311, 311b are provided. For two places in the intermediate amount or term of the compound denominate number the place plugging would be as follows: From 304 to 304a, from 305 to 305b, from 308 to 308a and from 309 to 309a and from 310 to 310b, and from 311 to 311b. If the intermediate term was limited to a single place, the plugging would be as follows: From 304 to 304a, from 306 to 306a, from 305 to 305b and from 308 to 308a and 310 to 310b. If there was no intermediate term in the compound denominate number the place plugging would be as follows: From 304 to 304a, 306 to 306a, 305 to 305b, 307 to 307b.

*Entry circuit plugging*

Referring to Fig. 23a, 312 designates the common contact roll. 313 are the sensing brushes which read the factor amounts on the record. The sensing brushes are connected to a set of plug sockets generally designated 314. From the 314 sockets individual plug sockets are provided as follows: From the 314 sockets which receive the regular number from the card plug connections are made to sockets 315ML (Fig. 22b). These route the entry of the regular number into the ML devices. Another set of connections is made from the proper sockets 314 to the set of sockets 316 (Fig. 23a) to route the pounds and shillings entries into MP. A further set of plug connections are made from the 314 sockets (Fig. 23a) to the 317 sockets (Fig. 23e) to route the entry of the pence amount into RD.

The punching or final result recording unit is also plugged up in the following manner. Referring to Fig. 23f there are a set of plug sockets 318 from the LQR readout. Plug connections are made from these 318 sockets to the punch board sockets 319 (Fig. 21f).

Start controls

With the set of record cards in the supply magazine and with the machine prepared for the computation and pre-plugged in the manner just described, the operator closes main line switch 299 (Fig. 21f) supplying current to driving motor M. With the main driving motor M in operation, the DC generator marked "D. C." is set in operation supplying current to line 320 and grounded line 321. The operator now depresses start key 322 (Fig. 21f left) and a circuit is completed from grounded line 321, through the FC—3 contacts, through relay contacts F—1, through the start key contacts 322 and back through relay coil E to line 320. Relay coil E, upon being energized, is maintained energized by a stick circuit through relay contacts E—1 and cam contacts FC—2. The energization of relay coil E also closes relay contacts E—2 and a circuit is completed from grounded line 321, through cam contacts CC—29, through punch control contacts P—1 now closed, through relay contacts E—2 now closed, through the stop key contacts 322S now closed, through the card feed clutch magnet 323, back to the D—1 contacts in the position shown to line 320. A card is now fed by the card feeding and handling section of the machine and is advanced toward the reading brushes in the usual way. In starting up the machine on a run of cards, the start key must be maintained depressed for two card feed cycles or it may be depressed and released and re-depressed.

Late in the second machine cycle of the card feed cycle the card lever contacts 324 close (Fig. 21f), bringing about an energization of relay coil G. Energization of relay coil G causes closure of relay contacts G—1 (Fig. 23a) and affords current supply from line 320, through the G—1 contacts to the FC—6 cam contacts. Such FC contacts upon closure permit current to be supplied to the impulse distributor 35 from which current impulses flow to the card transfer and contact roll 312. With relay coil G energized, contacts G—2 (Fig. 21f) are also closed and current supply is provided to a supplemental clutch magnet 325. This supplemental clutch magnet when energized releases for rotation the group of XC cams which, upon being clutched up, function for three machine cycles.

Entry of compound denominate number to MP and RD

During the card reading portion of the card feed cycle the higher units of the compound denominate number are entered into MP. The entry circuits are from the brushes 313, and plug sockets 314 via plug connections to sockets 316 (Fig. 23a), through the MP1—4 contacts now in the position shown, through contacts 14, 12 of the MP receiving device in the position shown, through the 326MP accumulator magnets and back to ground. The amount of the two highest units of the compound denominate number is thus entered into MP.

In connection with the description of the entries into the 326 accumulator magnets, it will be unnecessary to describe the operations of the 14, 13 and 12 contacts because such contacts are in the accumulator and their operation has been described in the mechanical description of the accumulator unit. The holding circuit back to line from these various contacts is via wire 327 (Fig. 23a).

During the entry cycle, controls are set up to cut off the start key control circuit and to also maintain the operation of the machine under record card control. Referring now to Fig. 21f, early in the entry cycle cam contacts FC—4 close, energizing relay F. F being energized, it is maintained energized by a stick circuit which is completed through contacts F—1 and cam contacts FC—3. The shift of the F—1 contacts cuts off the circuit to the start key contacts 322. Energization of F closes contacts F—2 to maintain a stick circuit for relay coils F and G either through the FC—3 contacts or the card lever contacts 324.

The pence entry flows through the plugging previously mentioned, viz., from sockets 314 (Fig. 23a) to sockets 317 (Fig. 23e).

During the entry portion of the card feed cycle cam contacts XC—1 close to energize relay coil K (Fig. 22f). With relay coil K energized, the K—16 and K—17 contacts (Fig. 23e) are closed affording a pence entry circuit from the 317 sockets which are plugged to the proper 314 socket (Fig. 23a). The pence entry flows through the K16—17 contacts now closed, via a set of lines which extend to the 1MS6—7 contacts, thence through the 2MS6—7 contacts, through the 3MS6—7 contacts, through the 1DS, 2DS, 3DS6—7 contacts, all of which are in a position shown, thence through the accumulator contacts 14, 12 to the 326RD accumulator magnets and back to ground. This provides for the pence entry into the RD accumulator.

Entry of regular number into the ML devices and multiple build up

The entry circuits for the regular number amount 25.8 flow from the sockets 314 (Fig. 23a) to sockets 315ML (Fig. 22b). The entries flow through the now shifted K—1 to 15 contacts and concurrent entries are effected into the ML—1—2 accumulator, ML3—6, ML—5, ML—7 and ML—9. The accumulator magnets are correspondingly designated 326ML, etc.

It will be understood that the regular number, i. e., 25.8 is entered upon the entry cycle into ML1—2, ML3—6, ML—5, ML—7 and ML—9. The ML—1—2, ML—3—6, ML—4—8 receiving devices are provided with doubling readouts in addition to the usual straight readouts. The other multiple receiving devices are provided with straight readouts only. After the regular number amount is entered into the above five ML receiving devices concurrently upon the card reading cycle, the machine is ready to build up multiples upon the following machine cycle. Before describing such building up operation, the manner in which the cycle controller is set up will be explained.

The impulse distributor 35 is provided with conducting segments for the 1 to 9 index points only. No segment is provided for the zero index point. It will be noted that there are branch circuits extending from the 316 plug sockets to the AD cycle controller magnets. Such cycle controller magnets will only be energized in the event that there is a significant digit in the amount in the compound denominate number field of the record. With an entry of 5 £, 16 s., the AD$u$, AD$t$ and AD$h$ magnets will be energized and the AD$th$ magnet will be de-energized. With such cycle controller magnets energized under record control, contacts AD$u$—1 to 3 (Fig.

23b), AD*t*—1 to 3, AD*h*—1 to 2, will shift and contacts AD*th* will remain in the position shown. The cycle controller once set up is retained set until the MP device is again reset.

On the machine cycle following the entry cycle, there occurs the first step of the building up of further multiples. As stated before the ML1—2 device is provided with a doubling readout designated MLR1—2 on Fig. 22c. In this machine cycle, cam contacts XC—2 (Fig. 22f) close, energizing relay coil L. With relay coil L energized, relay contacts L—1 to 16 (Fig. 22b) close and current supply is afforded for the adding emitter 36 as follows: From line 320 (Fig. 22c), through contacts MM—3, through ML—30 and MP—10 in the position shown, thence to emitter 36. From emitter 36 impulses flow over to the transverse buses of the doubling readout section of MLR1—2, down through the piloting section of the readout and out via a group of lines in cable 328 (Figs. 22c and 22b). From these lines the impulses flow down to the L—1—16 contacts which are now closed and ultimately reach the ML3—6, ML4—8, ML—5 and ML—9 accumulators or multiple receiving devices. This operation will have completed the building up of the three multiple in ML—3—6. On the following machine cycle the cam contacts XC—3 (Fig. 22f) close, energizing relay coil M and causing closure of contacts M1—16 (Fig. 22b). With emitter 36 in operation the times two multiple is read out from ML1—2 and flows via lines in cable 328, through the M—1—8 contacts, to the ML4—8 and ML—5 accumulators. This will have completed the setting of the four and five multiples on these receiving devices. During the same cycle in which these entries are being made, the 6 multiple is read out from the doubling readout section of ML3—6 and such 6 multiple flows via lines and cable 329 (Figs. 22c and 22b), through the M—9—16 contacts and finally reaches the ML—7 and ML—9 receiving devices. This operation will have completed the setting up of the 9 multiple on ML—9 and the setting up of the 7 multiple on ML—7. The multiple building up operations are now complete.

Upon energization of relay coil M, contacts M—17 (Fig. 22f) also close, providing an energizing circuit for relay coil BF. Relay coil BF once energized, is maintained energized through a stick contact BF—1, MP—11 and CC—39 in shunt therewith and back to line 321. Upon energization of relay coil BF, contacts BF—6 (Fig. 21f) close to energize relay coil BG. The purpose of relays BF and BG will be described later.

During the second card feed cycle, the record card from which the factors were read is advanced to the punch tray in the usual way. Upon reaching this tray, the contacts 330 close (Fig. 22f) to energize relay coil D. The energization of relay coil D shifts relay contacts D—1 (Fig. 21f) to a reverse position from that shown cutting off current supply from the card feed clutch magnet 323 and providing current supply for the punch rack trip magnet 331 upon closure of cam contacts CC—1, with punch control contacts P—3 and relay contacts B—1 closed. The relay contacts B—1 become closed upon energization of relay coil B (Fig. 22f) which energization of B occurs in the usual way upon the closure of the customary last column punch control contacts P—5 (Fig. 22f). With the punch rack trip magnet 331 energized, contacts 332 become closed (Fig. 21f) and remain latched closed in the customary manner by a latch 333. Current supply is then provided for the punch driving motor PM and endwise card feed occurs in the usual way to feed a card in the punch to the first result punching position.

LQ reset

With relay coils B and D energized in the manner previously explained, relay contacts B—2 and D—2 (Fig. 23a) become closed. Upon closure of cam contacts CC—27, current will flow from the 320 line, through these contacts, through the B—2 contacts now closed, the HH—2 contacts now closed, the D—2 contacts now closed, to and through the 334LQ reset relay coil to ground. Reset will then be effected of the LQ accumulator.

The present machine employs electric reset and provision is made to maintain the 334LQ coil energized during the reset cycle. This is provided for by stick contacts LQ—16, such contacts being in a stick circuit including cam contacts CC—5. Upon energization of the LQ reset relay contacts LQ—1—11 close and LQ—12—18 shift to a reverse position from that shown. With LQ—14 (Fig. 23f) in reverse position current supply is afforded to subtract emitter 45 which is wired in a nines complementary manner to the LQR readout. Complementary impulses representative of the nines complement of the amount standing in LQ flow through the now shifted LQ—1 to 11 contacts, through the set of lines generally designated 335 (Figs. 23f, 23e and 22e) to the 326LQ accumulator magnets and back to ground. By thus introducing the nines complement of the amount standing in LQ, the accumulator elements are restored to a 9 position. To bring the accumulator from the all 9 position to zero, an elusive 1 is entered in the units order at the carry time in the cycle. This entry is provided for through the contacts LQ—13 which are closed in the manner previously explained. The elusive 1 impulse is supplied in the following manner: From line 320, through cam contacts CC—16, via line 336 (Figs. 23e and 22e), through contacts LQ—13, through the carry relay contacts AV—25 controlled by relay coil AV (Fig. 22f), down to the units order of the 326LQ accumulator magnets. The units order is thus advanced one step and the electric transfer devices of the accumulator cause advance of all the other higher orders one step.

It may be explained that as long as the machine is operating, cam contacts CC—2 close once each machine cycle at the carry time in the operation of the accumulators. The closure of such contacts energizes relay coil AV. The energization of relay coil AV closes contacts AV—1—4 (Fig. 23a) associated with the MP accumulator, contacts AV—5—14 (Fig. 23e) associated with the RD accumulator, contacts AV—15, through 25 associated with the LQ accumulator (Fig. 22e) and contacts AV—26—48 associated with the ML accumulators. Since coil AV becomes energized one each machine cycle, the aforementioned relay contacts thus close at the carry time. The closure of these contacts permits the electric carry devices to be effective for performing carry operations whenever they are required in their related accumulators.

During LQ reset, provision is made to prevent repetition of such reset. This repeat reset preventing means is provided for as follows: Previously at the time relay coil L was energized, relay contacts L—17 closed to energize relay coil DB. Such relay coil is maintained energized by normally closed relay contacts JJ—5, and relay contacts DB—1. During LQ reset, the LQ—12 contacts (Fig. 22f) are closed. Accordingly, when cam contacts CC—6 close a circuit is established from grounded line 321, through the LQ—12 contacts now closed, through CC—6 and DB—2 to and through relay coil HH and back to line 320. A stick circuit is provided for relay coil HH, through stick contacts HH—1 and the punch control contacts P—2 now closed. With relay coil HH energized, relay contacts HH—2 (Fig. 23a) open to interrupt the reset initiating circuit to 334LQ. The machine has now reached a step in its operation in which it is ready to reduce pounds and shillings to pence. Initiation of such operations is brought about under control of LQ reset. Upon LQ reset a circuit is established through the LQ—12 contacts (Fig. 22f) through cam contacts CC—7 to and through relay coil JJ, JJ being energized is maintained energized by a stick contact JJ—1. The stick circuit extending back to line through contacts BH—21, through either the CZ—1 contacts or the RD—22 contacts, through the MP—12 contacts to grounded line 321. (Opening of contacts JJ—5 de-energize relay coil DB.) Relay coil JJ may be termed the initiating relay for initiating calculating operations.

*Reducing multiplying phase*

Figure 33:
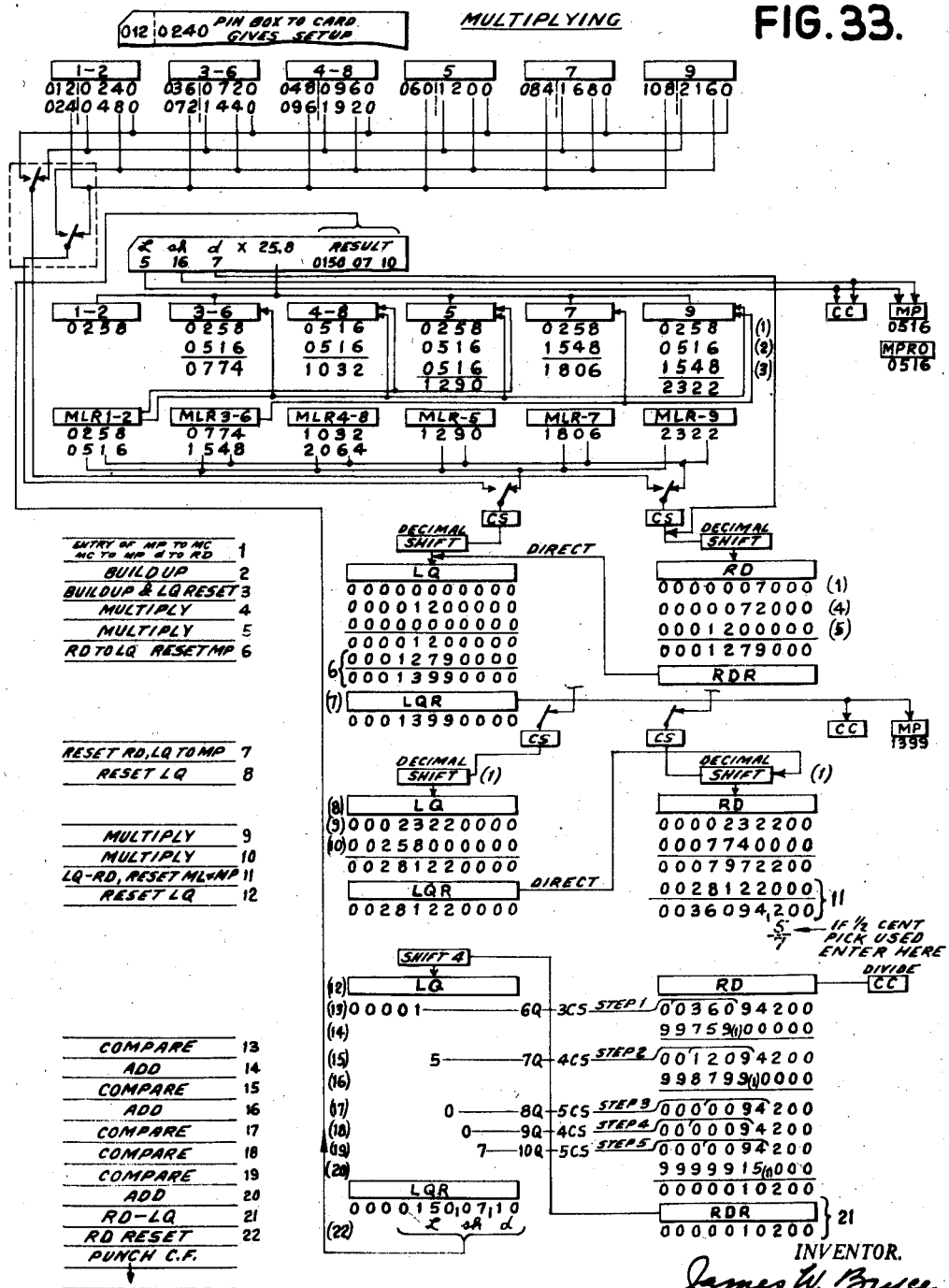

Referring now to Fig. 33, at this stage of the operation, the machine will have stored up all multiples of the regular number amount in the various ML devices and it will also have entered the 7 pence of the compound denominate pence amount into RD and it will have entered the 5 pounds and 16 shillings into MP. The machine is now ready to reduce the 5 pounds and 16 shillings to pence and sum up the pence amounts obtained on the reduction. In general the mode of operation is as follows:

The seven pence is already standing in RD. The machine selects the reducing constant multiples related to the shilling amount in MP, and sums up these pence amounts. First there is a selection of the 6 multiple of the shillings to pence reducing constant, i. e., 72, under the control of the unit order of the MPR readout and following selection the amount of 72 pence is derived from the pattern card and entered into RD. Concurrently with this entry there is a selection under the control of the tens order of MPRO of the amount of 12 from a pattern card and there is an entry of 12 in a shifted over columnar relation in LQ. This entry into LQ is effected concurrently in the same machine cycle in which 72 pence is entered into RD. After the shillings to pence reducing constant amounts have been entered, the machine detects that there is to be a change in the units of the reducing constants, that is, the machine ascertains that the following conversion is to be from pounds to pence. Thereupon, upon the following machine cycle there is a selection of the 5 multiple of the pounds to pence reducing constant from the pattern card under the control of the thousands order of MPR with an entry of 1200 pence into RD. With this machine cycle there is no entry effected into LQ. Upon the following machine cycle the amount standing in RD, i. e., 1279 is transferred over into LQ. The complete pence quantity now stands in LQ.

Upon energization of relay coil JJ (brought about as previously explained) relay contacts JJ—4 (Fig. 23d) close. A circuit is completed from line 320, through relay contacts CK—2 and BH—5 in the position shown, through cam contacts CC—28, relay contacts MP—7, in the position shown, through relay contacts JJ—4 now closed, through magnet 337SA and back to ground. Magnet 337SA is the magnet of a stepping switch SA (see Fig. 23b). Such stepping switch may be of the general type shown in United States patent to Bohlman No. 1,569,450. Upon energization of 337SA, the stepping switch arms of the stepping switch of which there are two, are advanced from the normal off contact position to the first contact position marked "1" on Fig. 23b. In such first contact position a circuit is established through ADu—3 which is now closed, and through ADt—3 which is now closed. Energization of relay coil JJ will have also closed relay contacts JJ—3 (Fig. 23a) and upon closure of cam contacts CC—3 a circuit is established from the line 320, through CC—3, JJ—3, through relay contacts CZ—8 or BF—5 now closed, via line 338 to the right arm of the stepping switch SA (and through CC—26 to the left arm of switch SA), thence through the arms of the stepping switch, through the ADu—3 contacts, via line 339, to the 1CS column shift relay coil, thence back to ground. Through the other arm of the stepping switch a circuit is established through the ADt—3 contact, via a line 340 to and through the 2CS column shift relay coil and to ground. Branch circuits are also established via lines 341 and 342 (Figs. 23c and 23d) to provide current supply to the common collector strips of the units and tens order of the MPR readout.

The units order brush in MPR is standing on 6. Accordingly, a circuit is completed through one of the lines 344 to the 6X magnet, the circuit being completed to ground through relay contacts BH—17 and CK—14 now closed. 6X upon being energized is maintained energized by a stick circuit through stick contacts 6X—1, the stick circuit being closed back to line through cam contacts CC—15. In the tens order of MPR, the brushes are on the one segment spot and accordingly a circuit is also established to energize relay magnet 1XX. Relay 1XX being once energized is maintained energized by a circuit through stick contacts 1XX—1 which connect back to line through cam contacts CC—15.

Referring now to Fig. 18a, one of the pattern cards in the pin box unit will be perforated in the 6th multiple zone with perforations representative of 72. Such perforations in the zone of the pattern card will establish corresponding contact between the proper pins 163 and the proper contacts 160. Pins 163 connect to the common strip or buses 164 and connect to emitter 38 (see Fig. 21c).

Figure 21C:
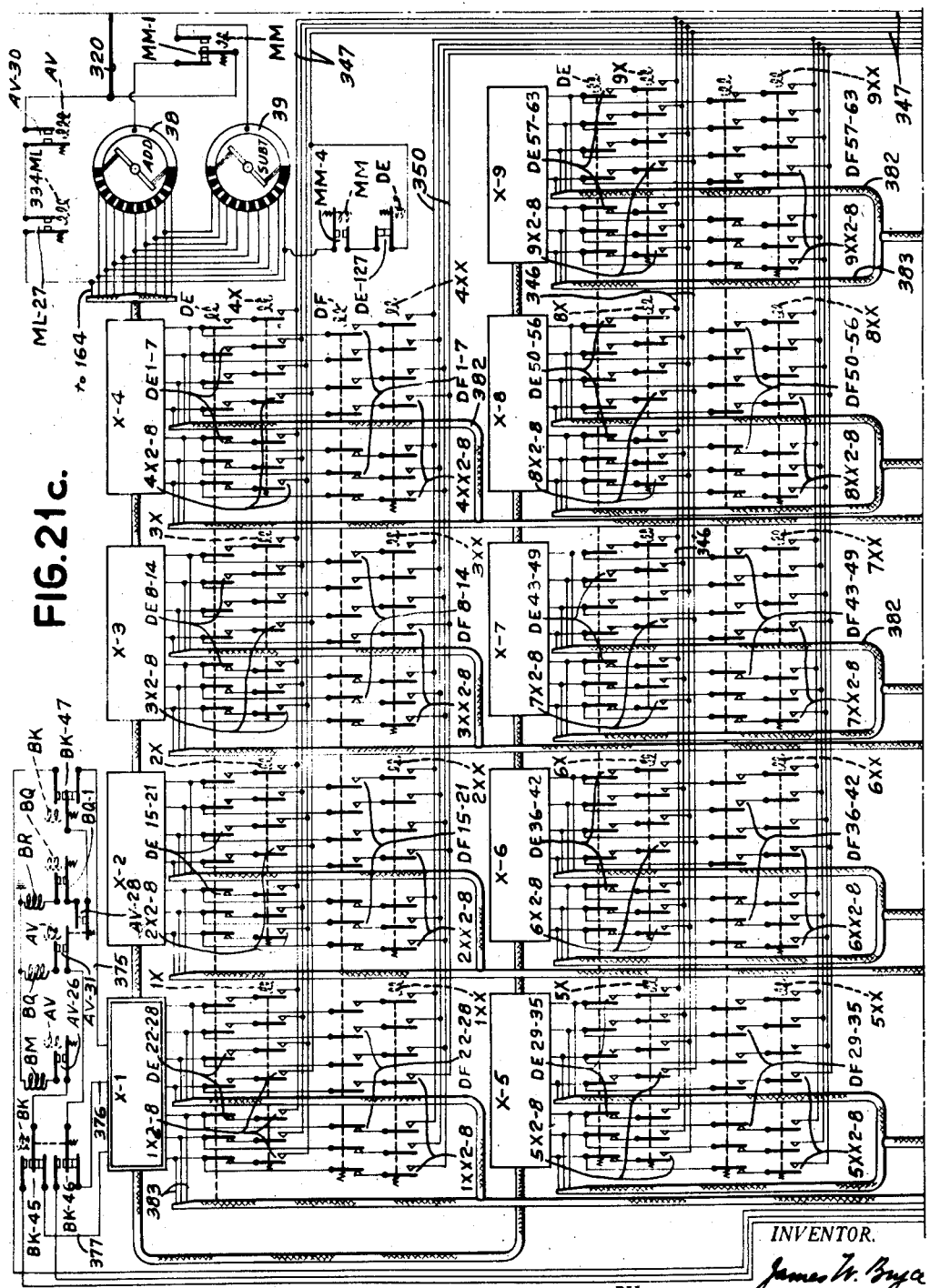
Figure 21F:
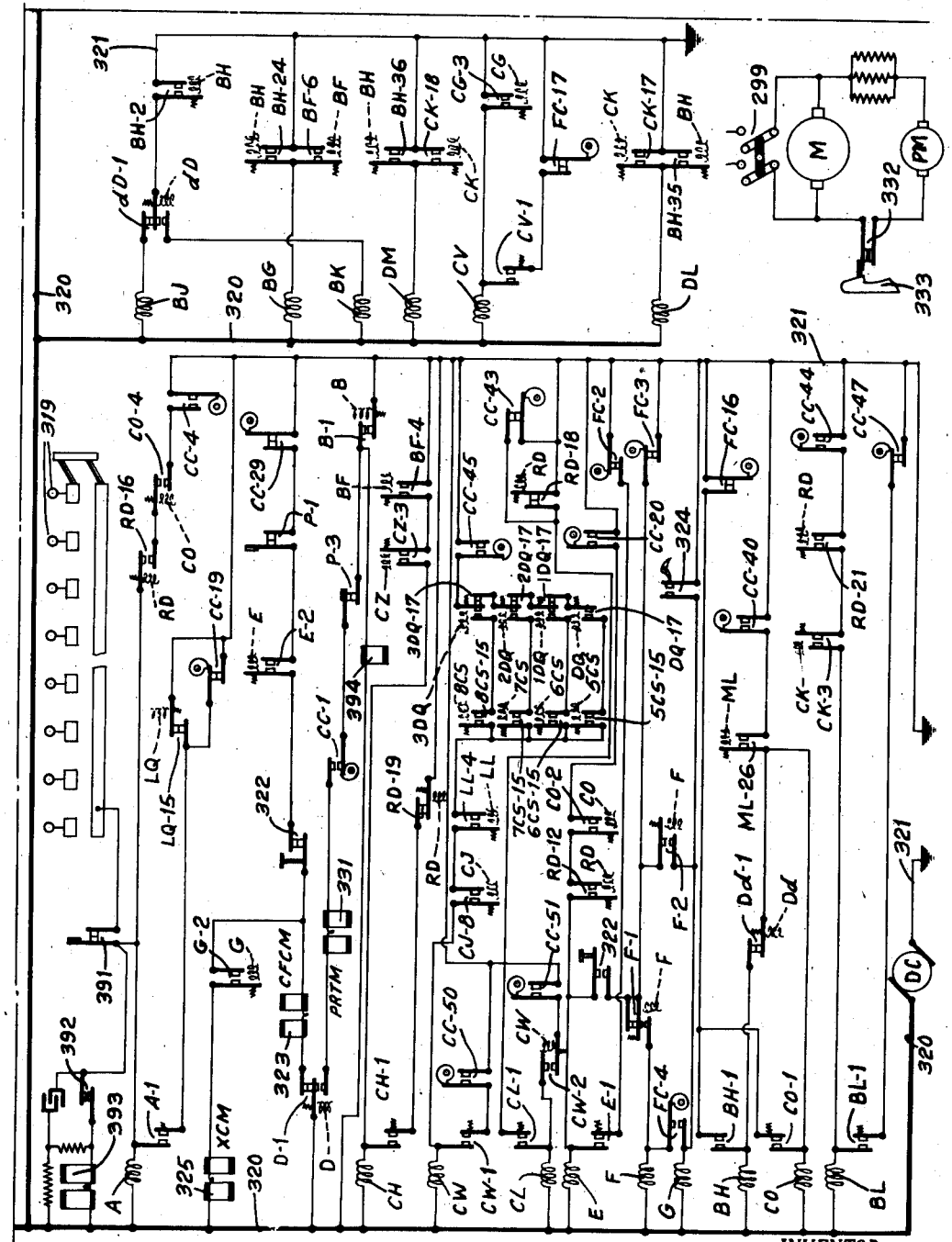

Referring to Fig. 21c, current supply to emitter 38 is afforded from supply line 320, through relay contacts MM—1 now in the position shown. The emitter 38 emits impulses through the pattern card in the pin box and impulses representative of 72 flow through the non-shifted DE36—38 contacts, through the 6X2—4 contacts to the group of lines 346, through lines 347, (see also Fig. 21d), through the contacts BK37—40 now in the position shown, through the lines 348 (Figs. 22d and 23d), through the contacts BG5—8 in shifted position, through lines 349 (see also Fig. 23e), through the 1—CS column shift relay contacts 1—4 now closed, through the 1MS, 2MS, and 3MS4—1 contacts in the position shown, through 1DS, 2DS, 3DS4—7 contacts in the position shown, through the 74—72 contacts of the accumulator, into the proper orders of the RD accumulators and back to ground. This will have entered 72 in the RD accumulator, whereupon the sum of 7 and 72 or 79 will now stand in such accumulator.

The IXX relay magnet was also energized and the circuits are established through the twelve perforations of the card in the pin box from emitter 38. Current supply is afforded to emitter 38 as before and impulses representative of 12 flow through the card in the pin box through the DF—22—24 contacts in the position shown (Fig. 21c), through the IXX2—4 contacts now closed, through the group of lines 350 (see also Fig. 21d), through the BK—41—44 contacts in the position shown, through the 351 lines (see also Figs. 22d and 23d), to the BGI—4 contacts now in shifted position, through lines 352 (see also Figs. 23e and 22e), through the 2CSI—4 column shift contacts now closed in the manner previously described, through the DGI—4 contacts in the position shown, through the IMSI4—17 contacts, the 2MSI4—17, 3MSI4—17 contacts in the position shown, through the customary 72—74 contacts of the LQ accumulator and the 326LQ accumulator magnets and back to ground. This will afford an entry of 12 (120 on account of column shift) in the LQ accumulator.

The foregoing described operations will have entered 120 into LQ and 72 into RD. At the end of the machine cycle in which 120 and 72 are entered, cam contacts CC—28 (Fig. 23d) close, and a circuit is established from line 320, through the CK—2 contacts and the BH—5 contacts in the position shown, through the CC—28 cam contacts, through the MP—7 contacts in the position shown, through the JJ—4 contacts now closed, in the manner previously described to and through the 337SA stepping switch magnet and back to ground. Energization of 337SA will advance both arms of the stepping switch SA (see Fig. 23b) from the "1" position in which they previously stood to the "2" position.

Referring now to Fig. 23a on closure of cam contacts CC—3, a circuit is established from line 320, through CC—3, through JJ—3 now closed, through the BF—5 contacts now closed, and the CZ—8 contacts which are in shunt, through line 338 (see Fig. 23b) to the multiple arms of the stepping switch as previously described. From the right hand stepping switch arm a circuit is completed through the ADu—2 contacts now shifted to the ADh—2 contacts now shifted, to line 355, to and through the 3CS column shift relay coil and back to ground. Concurrently with the establishment of this circuit a branch circuit is established through line 356 (Figs. 23b, 23c, and 23d) which line extends to the hundreds order segment MPR, affording current supply to the 5X relay magnet. The return circuit to ground from 5X is via the BH—17 contacts and the CK—14 contacts now in the position shown. 5X being once energized, is maintained energized by the circuit through its stick contacts 5X—1. The 5X relay magnet will be energized inasmuch as 5 stands in the hundreds order of MP.

Referring again to Fig. 23b, the left hand stepping switch arm now standing on the "2" position will establish a circuit through the ADt—2 contacts in shifted position, through the ADth—1 contacts in non-shifted position, to a line 357 (see also Fig. 23c) which extends and energizes a relay coil H. Relay coil H upon being energized is held energized through a stick circuit through stick contacts H—1 and cam contacts CC—36. The CC—36 contacts are in shunt with contacts BH—22 in the position shown, RD—17, in the position shown and MP—6 in the position shown.

At this stage in the operation the machine must detect that the reducing constant is changed from the previous shilling to pence constant to the pounds to pence constant. Detection of such change in status is provided for as follows: The energization of the 3CS relay as previously described will have closed supplemental contacts 3CS—17 (Fig. 22f) and closure of these contacts will complete a circuit from line 320, which extends through the BF—3 contacts now closed, through the 3CS—17 contacts now closed, via the plug connection from socket 305 to 305b to energize relay coil BD. Relay contacts BD—1 afford a stick circuit for relay coil BD, through contacts MP—8 which are now closed. With relay coil BD now energized, relay contacts BD—2 and BD—3 become closed. Closure of the BD—3 contacts affords energization of DE. Closure of the BD—2 contacts completes a circuit from line 320, through the BF—3 contacts now closed, through the BD—2 contacts, via the plug connection, through 311 to 311b to energize relay coil DK. Another circuit is established through the plug connection through 310 to 310b to energize relay coil DJ. Referring to Fig. 23e, energization of relay coil DJ and DK will have caused shift of contacts DJ1—4 and DK1—5. Such contacts upon shifting will alter the column shift circuits to the RD accumulator. Such column shift circuits were primarily established through the column shift contacts 3CS1—4 upon energization of 3CS, but with the present operating condition the lines to the 326RD accumulator magnets will be altered from the 3CS1—4 contacts so that the amount of 1200 pence is entered into RD in the columnar relation indicated in Fig. 33.

It may be explained that if there was not the foregoing altering of the entering relation into RD, 1200 would have been entered two further columns to the left in the RD accumulator. It will be understood that the machine was preplugged for this particular change in shift relation. In the present problem there were two columns in the shilling position and accordingly the change in shift relation took place after these columns had been handled. The manner in which 1200 pence becomes entered into RD will now be explained. The pattern card in the pin box will be properly perforated with perforations representative of 1200. The pins of the pin box will establish circuits through perforations in such pattern card and establish circuits to the 38 emitter. The impulses flow out through the pattern card through the DE32—35 contacts now closed, through the 5X5—8 contacts (Fig. 21c) now closed, through lines 346, to lines 347 (see also Fig. 21d), thence through the non-shifted BK—37—40 contacts, through the lines 348 (see also Figs. 22d and 23d), through contacts BG5—8 now in shifted position, through the group of lines 349 (see also Fig. 23e), through the 3CS1—4 contacts, through the DJ1—4 contacts and the DK2—5 contacts now in shifted position, through the proper ones of the IMS1—10, 2MS1—10, 3MS1—10 contacts and the IDS1—10, 2DS1—10 and 3DS1—10 contacts now in the position shown, to the proper orders of the 326RD accumulator magnets. This will have entered 1200 in the RD accumulator in the columnar relation shown in Fig. 33. Towards the end of this entry cycle the stepping switch magnet is again energized through the circuit previously described.

While the left hand arm of the stepping switch

SA will complete a circuit which again maintains energization of relay coil H (Fig. 23c), there is also another circuit completed by the right hand stepping switch arm (Fig. 23b) which energizes relay coil KK (Fig. 23c). This circuit will be traced as follows: From the "3" point of the right hand stepping switch arm, via wire 358 (see also Fig. 23c), to relay coil KK and back to ground. Relay coil KK being energized it is maintained energized through stick contacts KK—1. The stick circuit being the same to line as that for relay coil H as previously traced.

Reset of MP

The machine is now ready to bring about an RD to LQ transfer, to reset the MF receiving device, and to restore the cycle controller set up unit to normal position.

Referring to Fig. 23a, with relay coil H and relay coil KK concurrently energized, relay contacts H—3 and KK—2 are both closed and a circuit is established from line 320, through cam contacts CC—27, through H—3 and KK—2 now closed, to the 334MP reset relay coil and to the 360CY cycle controller clutch magnet. The energization of the 334MP reset relay will shift its relay contacts MP1—13.

Referring to Fig. 22c, the shift of the MP—10 relay contacts affords current supply to complementary emitter 37 from line 320. Complemental impulses flow from the complemental emitter 37 ultimately to cable 361 (Figs. 22c, 22d and 23d) to the MPR readout, thence through the brushes of this readout via the group of lines 362 (Figs. 23c, 23b and 23a), through the MP1—4 contacts now in shifted position, to the 326MP accumulator magnets. In this way the 9's complement of the amount standing in MP is introduced into this MP accumulator and the accumulator elements are brought to an all 9 position. Closure of the MP—5 relay contacts (Fig. 23a) provides for the entry of a 1 into the units order of the MP accumulator. The units impulse is received via line 336 which extends from cam contacts CC—16 (Fig. 23e) over Figs. 23d, 23c, 23b and 23a. This units impulse will bring the MP accumulator to zero by the customary electric carry operation which need not be here repeated. During MP reset, contacts MP—8 (Fig. 22f) which are controlled by the 334MP reset relay, open to de-energize relay coil BD. The de-energization of BD (Fig. 22f) opens the relay contacts BD—3 causing de-energization of relay coil DE. The opening of the BD—2 contacts upon the deenergization of BD causes de-energization of the DJ relay. The opening of relay contacts MP—6 (Fig. 23c) in conjunction with the opening of the CC—36 cam contacts, de-energizes relay coils H and KK by breaking their stick circuits. Opening of relay contacts MP—11 (Fig. 22f) in conjunction with the opening of contacts CC—39, de-energizes relay coil BF. The de-energization of relay BF (Fig. 22f) opens relay contacts BF—6 (Fig. 21f) to de-energize relay coil BG. The opening of relay contacts MP—12 (Fig. 22f) in conjunction with the opening of cam contacts CC—18 de-energizes relay coil JJ. The shift of the MP—7 contacts, upon MP reset (Fig. 23d) upon the following closure of cam contacts CC—28 effects energization of the stepping switch release magnet 366SA. Energization of this release magnet allows the switch arm of the stepping switch to be restored to normal position in the usual way.

The manner of energization of the 360CY cycle controller clutch magnet (Fig. 23a) has been described. Upon energization of this magnet, shaft 135 (see Fig. 1) of the CY unit is clutched up and the cycle controller electromechanical relay unit is restored to normal position. This restores the various ADu—1—3, ADt—1—3 contacts, etc., to normal position as shown in Fig. 23b of the wiring diagram.

RD to LQ transfer

Referring to Fig. 23a, upon closure of cam contacts CC—27, a circuit is completed through the now closed H—3 and KK—2 contacts, through the Dd—2 relay contacts in the position shown, through the BF—2 contacts in the shifted position, through the CZ—2 contacts in the position shown, to and through relay coil CA and back to ground. Relay CA is held energized through stick contacts CA—11, the circuit extending to line through cam contacts CC—5. Energization of relay coil CA closes relay contacts CA1—10 (Fig. 22e), establishing impulse circuits from emitter 40, through RDR, via the lines 362, through the now closed CA1—10 contacts to the 326LQ accumulator magnets. Upon operation of the emitter the amount standing in RD is transferred over and entered into LQ in proper columnar relation as indicated in Fig. 33.

RD reset

The machine is now ready to reset the RD accumulator and to transfer over the amounts standing on the LQ accumulator into the MP accumulator. It will be recalled that the MP accumulator has previously been reset. To prepare the machine for this series of operations an initiating relay BA is energized in the following manner.

Referring to Fig. 22f, upon closure of cam contacts CC—37 and with relay contacts CA—12 closed, a circuit is completed to energize relay BA. This relay remains energized through the stick circuit through stick contacts BA—1 and CC—38. With relay BA energized, contacts BA—2 (Fig. 23a) close providing a circuit from line, through CC—27, through BA—2, through CL—7 now in the position shown, to energize 334RD reset relay. Concurrently with the energization of the 334RD relay, another circuit is established from the BA—2 closed contacts, through contacts CO—3 now closed, through relay contacts CZ—5 now closed to energize relay coil BW. Energization of RD shifts contacts RD—15 (Fig. 22e) providing current supply for emitter 41 which permits complemental impulses from RDR to lines 362, thence to lines 363 (see also Fig. 23e), through the reset relay contacts RD1—10 and to the 326RD accumulator magnets. This enters the 9s complement of the amount standing in RD into the RD accumulator. A one entry in the units order is provided by an impulse circuit afforded through the CC—16 cam contacts, relay contacts RD—14 now closed, to the units order RD accumulator magnet. The usual electric carry thereupon brings the RD accumulator to a zero condition.

LQ to MP transfer

Referring to Fig. 23f, current supply to the add emitter 46 is provided from line 320 to the LQ—14 and A—12 contacts in the position shown. The 46 emitter emits impulses through LQR which impulses flow via the group of lines 364 (see also Fig. 23e), through the BW—2—5 contacts now closed, through a group of lines 365

(see also Figs. 23d, 23c, 23b and 23a), to the 326MP accumulator magnets. This will transfer the pence amount which previously stood in LQ, into the MP accumulator.

Upon the entry of the amount transferred over from LQ into MP, the cycle controller unit is set up with the proper selected energization of the AD relay coils.

*Regular multiplying phase*

The machine is about ready to begin the regular multiplying phase in which the pence amount standing in MP is to be multiplied by the regular number which, in this instant, is a mixed number involving a decimal quantity of eight-tenths. The regular number amount is 25.8. During regular multiplication entries are directed into RD and LQ. If the regular number was a whole number the entries would be directed into these accumulators and in pre-determined columnar relation. If, however, the regular number was a mixed number involving say a single decimal place as in the problem under consideration there would be a change in the columnar relation of the entries as directed into RD and LQ. In place of directing these entries in the normal entry relation, the entries would be directed into the accumulators in a shifted relation one place to the right. The manner in which this decimal shift is provided will now be explained.

The energization of relay coil BW in the manner previously explained will have closed relay contacts BW—7 (Fig. 23f). By virtue of the plug connections between sockets 300 and plug sockets 301 a circuit is completed from line 320, through contacts BW—7, through the plug connection between 300 and 301 to energize relay coil IMS. This relay is maintained energized by the stick circuit through stick contacts IMS—11, the circuit going back to line through relay contacts Dd—4, through relay contacts Bu—15. Energization of relay coil IMS (Figs. 23e and 22e) shifts relay contacts IMS—1—10, and relay contacts IMS—12—18 to reverse position from that shown. The shift of these contacts to reverse position shifts the entry circuits into RD and LQ relatively one order to the right. Before entries are directed into LQ, this accumulator is electrically reset to zero. Initiation of LQ reset is effected in the following manner. With relay contacts BW—6 (Fig. 22f) closed and upon closure of CC—37, the BE relay coil is energized. Such coil is maintained energized by the stick circuit through stick contacts BE—1 and cam contacts CC—38. Energization of relay coil BE (see Fig. 23a) closes relay contacts BE—2 affording a circuit from line through CC—27, BE—2 to and through the 334LQ reset relay coil. The LQ accumulator is then electrically reset in identically the same manner as previously explained.

It will be recalled that LQ reset initiated reducing multiplying operations upon the reducing multiplication phase. Such LQ reset also initiates regular multiplying upon the regular multiplying phase, but certain relays which were previously called into operation for the reducing multiplying phase are now de-energized. Such a relay is BF, which is maintained deenergized on a regular multiplying operation and relay coil BG which is also maintained de-energized on a regular multiplying operation. Other relays depending upon BF also are now ineffective.

On regular multiplying operations selected multiples of the amount standing in the MLR storage devices are entered into the LQ and RD accumulating devices. The selection of multiples for entry is controlled from MPR, the pence amount involved in multiplication standing in the MPR accumulator. Multiplication is effected by summing in the LQ and RD accumulator devices selected multiples derived from the MLR storage devices. To save operating time there is concurrent summing of multiples in LQ and RD (see Fig. 33). As shown in this figure the pence quantity is 1399. The regular number amount is 25.8. A 9 multiple of 25.8 is 232.2. Such amount of 2322 stands upon MLR—9. The 3 and 1 multiples of the regular number amount, disregarding decimals, are 774 and 258. Such multiple amounts respectively stand upon MLR—3 and MLR—1.

Upon LQ reset the calculation initiating relay JJ is energized in the manner previously explained for the reducing multiplying phase. With relay JJ energized, the energizing circuit is established to the 337SA stepping relay magnet as before (Fig. 23d). The arms of the relay switch advance from their off contact position to the one contact position. The cycle controller setup has energized relay coils ADu and ADt. Accordingly, with the switch arms of the stepping switch on the "1" contact position, there is an energization of the ICS and 2CS column shift relay magnets. There is also current supply provided as in the reducing multiplying phase via the lines 341 and 342 to the two right hand orders of MPRO (Fig. 23d). The units and tens order brushes of this readout both stand on 9. Accordingly relay coils 9XX and 9X (Fig. 23d) are energized. With these two relay magnets energized, relay contacts 9XX9—12 and relay contacts 9X9—12 also close. Current supply is afforded to the add emitter 36 (Fig. 22c) through relay contacts MM—3, relay contacts ML—30, relay contacts MP—10 to add emitter 36. The add emitter emits impulses through MLR—9, which impulses flow out through the 9X9—12 contacts (Fig. 22d) over the set of impulse lines 367 (Figs. 22d and 23d), through the BG5—8 contacts now in the position shown via lines 349 (Fig. 23e) and through the ICS1—4 column shift relay contacts, through the IMS4—7 contacts now in shifted position, through the remaining non-shifted 2MS, 3MS5—8 contacts and the 1DS, 2DS, 3DS5—8 relay contacts which are in non-shifted position and to the proper 326RD accumulator magnets. The change of entry relation for decimal shift upon this entry will be afforded by the shifted IMS—4—7 relay contacts which will direct the entry into the RD accumulator one place relatively to the right from the normal entry relation. There is also a concurrent entry into LQ under control of the 9XX relay. The impulses flow from MLR—9 (Fig. 22c) through the 9XX9—12 contacts in closed position, Fig. 22d, via lines 368 (Figs. 22d and 23d), through the non-shifted BG—1—4 contacts, via the lines 352 (see also Figs. 23e and 22e) through the closed 2CS1—4 column shift relay contacts, through the DG1—4 contacts which are in the position shown, through the now shifted IMS—14—17 contacts, down on through the pyramidical set of contacts just below to the entry lines leading to the 326LQ accumulator magnets.

The above operations will have entered 2322 into the LQ and RD accumulators concurrently in one entry cycle (see Fig. 33). Upon the following machine cycle the stepping switch SA advances to the "2" position (Fig. 23b). With the stepping switch in such position, the 3CS and 4CS column shift relay coils (Fig. 23b) become energized in the usual manner, through the cycle controller contacts. There is also an energization of the 3X relay (Fig. 23d) and an energization of the 1XX relay. Such 3X and 1XX relays are energized under the selective control of the hundreds and thousands order brushes of MPR which stand respectively on "3" and "1." A further pair of entries are made from the MLR—3 and MLR—1 into RD and LQ accumulators respectively. The column shift relays provide for a shift of relatively one order to the left with respect to the entries made in the previous machine cycle.

ML reset

The machine is now ready to transfer the product accumulation in the LQ accumulator to the RD accumulator and during the same machine cycle when this operation is being effected the MP receiving device is reset to zero and the various ML receiving devices are reset to zero.

Towards the end of the last multiplying cycle the stepping switch magnet 337SA is re-energized in the manner previously explained, i. e., under control of cam contacts CC—28 (see Fig. 23d). Accordingly, the stepping switch arms SA (Fig. 23b) step to the "3" contact position. With the switch arms in such position the operation terminating relays H and KK (Fig 23c) are re-energized in the manner previously explained. With these relays energized, upon closure of CC—27 (Fig. 23a) the 360CY clutch magnet is energized and the 334MP reset relay is energized. An energizing circuit is also provided for the relay BU which provides for LQ to RD transfer. Such circuit may be traced as follows: From line 320, through cam contacts CC—27, through relay contacts H—3 now closed, through relay contacts KK—2 now closed, through relay contacts Dd—2 in the position shown, through the BF—2 and BL—2 contacts in the position shown to relay BU and back to ground, relay BU being maintained energized by means of the stick contact BU—12, the stick circuit being completed to line through CC—5.

In shunt with relay BU is another relay 334ML which is maintained energized by the stick circuit, through contacts ML—25. With reset relay 334MP energized the MP receiving device is electrically reset in the manner previously explained.

Energization of 360CY brings about restoration of the cycle controller to normal position in the manner previously explained.

Energization of 334ML brings about electrical reset of all of the ML receiving devices. Energization of 334ML shifts the ML—30 contacts (Fig. 22c) to reverse position from that shown in the diagram and a circuit is provided from line 320, through the MM—3 contacts in the position shown, through the shifted ML—30 contacts to the complemental emitter 37. This complemental emitter provides impulses through the MLR readouts, through the straight readout section of MLR—1, MLR—3, MLR—4 and the MLR—5, MLR—7 and MLR—9 readouts. The impulses flow respectively from the foregoing readouts via lines and cables 368, 369, 370, 371, 372 and 373 and via the ML1—23 contacts (Fig. 22b) to the respective accumulator magnets 326ML and back to ground. Contacts ML—24 being closed afford the entry of "1" into the units order of each accumulator. A one timed impulse is supplied to the different accumulators through ML—24, via a circuit which comprises 336a and 326 which ultimately extends to the CC—16 contacts on Fig. 23e. Following the entry of "1" into the units order of each ML accumulator, the usual electric carry brings all of the accumulator elements to zero position.

LQ to RD transfer

With relay coil BU (Fig. 23a) energized in the manner previously explained, relay contacts BU—15 (Fig. 23f) open to de-energize the 1MS relay coil. This renders the decimal shift contacts ineffective on LQ to RD transfer operations.

Referring to Fig. 23f, current supply to emitter 46 is afforded through the LQ—14 and A—12 relay contacts in the position shown. Impulses flow from the 46 emitter through LQR, through the BU1—10 contacts which are now closed, via the lines 460 (see also Fig. 23e), via cable 374 and down to and through the 326RD accumulator magnets, via the intervening contacts. The transfer is effected in the accumulator relation shown in Fig. 33. During such transfer the decimal shift ineffective as previously explained.

Reducing dividing phase

The final product now stands in the RD accumulator. The machine is about ready to perform the reducing division phase of operation. In general the procedure is to first divide the amount standing in RD by the pounds to pence reducing constant, i. e., 240. Thereafter the remainder is divided by the shillings to pence reducing constant of 12. As a result of this division the final product results in pounds, shillings and pence will be available.

The procedure on division is to compare a comparison portion of the dividend amount standing in RD with all of the different digital multiples of the divisor amounts. The divisor amounts are derived from the pattern cards in the pin box. Such divisor amounts are set up on one side of the comparing units and the other side of the comparing units are set up with the comparison portion of the dividend derived from RD. With the problem under consideration the divisor multiples may comprise sometimes three columns and sometimes four columns for the pounds to pence reducing constant and for reducing from the shillings to pence the divisor multiples may comprise in some cases two columns and in other cases three columns.

When handling other compound denominate numbers different numbers of orders may be present in the divisor multiples, for example, they might comprise two and three columns for the first reducing columns and one and two columns for the second reducing columns. Provision is accordingly made to detect the denominational magnitude of the divisor multiples on the pattern cards in the pin box unit. This determines the number of columns to be used in the comparison portion of the dividend. There is also another determination which takes into account whether one or more zeros are present preceding the highest significant digit in the dividend. To illustrate, if the highest significant digit in the dividend was at the extreme left in the RD accumulator, the machine would, in reducing the pence to pounds, utilize the three left hand orders of RD for the first comparison. On the other hand if a single zero was present at the extreme left in RD, there would be a column shift to the right in RD prior to comparison of one order. If two zeros were present, there would be a column shift of two orders to the right. To control such column shift provision is made to detect the number of zeros to the left of the highest significant digit in RD and depending upon the number of zeros detected there is a related column shift. There is a further control of the number of columns to be used in comparison which depends upon the number of orders in the divisor. If the divisor is a three order divisor, three orders are utilized on comparison, but if there is a two order divisor, two orders are utilized on the first comparison.

Referring to Fig. 33, noting particularly cycle II, certain initiating relays are energized in the LQ to RD transfer cycle as will now be explained.

Referring to Fig. 21f, upon closure of cam contacts CC—40, a circuit is closed through the now closed ML—26 contacts, through the Dd—I contacts to energize relay coil BH. Coil BH once energized is maintained energized through the st'ck contacts BH—I and cam contacts FC—16. Relay BH is maintained energized throughout the entire reducing division phase. Another relay is energized through ML—26, viz., relay CO which latter relay is maintained energized by the stick circuit through CO—I and FC—16. Energization of relay coil BH closes relay contacts BH—35 (Fig. 21f) and energizes relay coil DL. Closure of relay contacts BH—2 energizes relay BJ, through contacts dD—I in the position shown. Closure of relay contacts BH—24 causes energization of relay BG. Closure of relay contacts BH—36 causes energization of DM.

During the transfer cycle, relay BU is energized, closing relay contacts BU—II (Fig. 22f) so that upon closure of CC—37 relay BE becomes energized. Such relay is maintained energized by the stick circuit through BE—I and CC—38.

*Testing for zero to the left in the dividend*

Referring to Fig. 22f with relay coil BE energized and relay coil BH energized, the relay contacts BE—3 and BH—3 are closed affording a circuit from line 320 to the highest order zero spot of RDR. The test circuit, if the accumulator element in this order stands at zero, extends via the brush to the collector ring and thence energizes relay coil IY. If in addition the next order stands on zero, there will also be an energization of 2Y and so on.

According to the problem under consideration (see Fig. 33) there are two zeros to the left of the dividend amount so that IY and 2Y will be energized. It will be understood that the relays IY and 2Y, etc., are energized at the end of the LQ to RD transfer cycle after the complete amount is in RD. Also at this time, upon closure of cam contacts CC—41, a circuit is completed through the now closed IY—I and 2Y—I contacts to energize relays IYY and 2YY. Relays IYY and 2YY hold the set up which is detected by the IY and 2Y relays, the setup being held after relays IY and 2Y, etc., are de-energized. The IYY, etc., relays are maintained energized by stick circuits through contacts such as IYY—I, the stick circuit going back to line through the now closed relay contacts BH—4 which are shunted by cam contacts CC—42. Relays IYY, 2YY, etc., may be termed "retaining relays" for retaining a control which takes into account zeros to the left of the dividend.

As explained before, provision is also made to test for the size of the divisor amount and the multiples thereof. This test for the size of the divisor multiples is idle in the problem under consideration, but it will be here explained because it is utilized for other problems where the magnitude of the divisor varies from that of the present problem.

Referring to Fig. 21c, a circuit is established from line 320 through the now closed relay contacts AV—30 (which contacts close in the carry time in the cycle), through the now closed relay contacts ML—27, to the zero bus 184 of all of the pin box units (see Fig. 18). If the pins in the pin box unit three orders from the extreme right find a zero in such order in the card the circuit will be completed to the 376 wire. If there is also a zero in the second order from the left the circuit will be completed to the 375 wire. These circuits pertain to the first reducing constant. On the other hand, if there be zero in the card in the second column from the extreme left pertaining to the second reducing constant in the pattern card a circuit would be completed from the zero bus to wire 377 (Fig. 18). The wires 375, 376 and 377 are shown on Fig. 21c as extending to the box marked X—I, which diagrammatically represents the pin box pertaining to the times one multiple for the first and second reducing constants. In the wiring diagram the different pin box sections for the different first and second reducing constant multiples are shown as X—I, X—2, etc., signifying times one, times 2 and so on. If the 376 wire is alive the zero test circuit for the pattern card for the first reducing constant is completed through the BK—46 contacts in the position shown, through AV—31 contacts now closed, to the BQ relay and back to ground. Accordingly, BQ—I contacts close and if the line 375 is now alive a circuit extends from line 375 through the BK—47 contacts in the position shown, through the AV—28 contacts and through the BQ—I contacts to energize the relay coil BR and back to ground.

If the first reducing constant in the pattern card is in an amount which is one less than maximum capacity, the BQ relay is energized and if this reducing constant is of such magnitude as to be of two less of maximum capacity, i. e., two zeros to the left and one significant digit then BQ and BR are both energized.

To test the second reducing constant for the presence of zeros, if the line 377 is alive, a circuit is completed from 377, through contacts BK—45 in the position shown, through contacts AV—26 now closed, to energize the relay BM and back to ground. Energization of BM will signify that the second constant has one zero to the left of the highest significant digit.

With the problem under consideration wherein 240 is the first reducing constant and 12 is the second reducing constant, there are no zeros to the left in the second or first reducing constants. Accordingly, none of the foregoing relays BQ, BR for the first constant, or BM for the second constant are energized.

Referring to Fig. 23d, if any of the relay coils BM, BQ and BR are energized, there will be a corresponding energization of BO, BS or BT. For example, if relay BM is energized, the BM—2 contacts close and an energizing circuit is afforded from line to BU—14, in closed position, BM—2 closed to energize relay BO. BO being energized is maintained energized through stick contacts BO—I, the stick circuit going back to line to the RD—20 contacts. Similarly energization of BQ will bring about energization of BS and energization of BR will bring about energization of BT.

As stated before with the present problem, neither relay BO, BS or BT will be energized.

LQ reset

Actual initiation of the reducing dividing phase is brought about upon LQ reset. LQ reset is brought about as follows: With relay contacts BE—2 (Fig. 23a) closed a circuit is established from line from CC—27, BE—2, to the 334LQ reset relay. The LQ accumulator is now electrically reset in the manner previously explained. Upon such reset, contacts LQ—12 (Fig. 22f) close to energize the calculating initiating relay JJ in a manner previously explained.

The machine is now ready to start comparing and to bring this about the stepping switch must be brought into action to in turn bring the proper column shift relays into operation to select the proper comparison portion of the dividend.

A comparing cycle is initiated by the energization of relay coil LL (Fig. 23d) which becomes energized in the following manner. As previously explained, the computing initiating relay JJ was energized upon LQ reset. Such energization of JJ closes contacts JJ—2 (Fig. 23d). A circuit is completed from line 320, through the CK—2 contacts in the position shown, through the now shifted BH—5 contacts, through cam contacts CC—9, through all the 9CU—1, 8CU—1, etc., transfer contacts now in the position shown and finally down through the ½CU—1 contacts, through the JJ—2 contacts now closed, through the LL relay coil and back to ground. LL once energized, is maintained energized by the stick circuit extending back to line through stick contacts LL—1 and cam contacts CC—13.

After the foregoing stick circuit is established, cam contacts CC—14 close and establish a circuit through the non-shifted H—2 contacts to energize stepping switch magnet 380SB of the SB stepping switch. With such magnet energized, a pair of switch arms SB of this stepping switch (Fig. 23b top) are stepped forward to first contact position.

Shortly after the switch arms of the stepping switch have advanced to such first contact position, a circuit is completed from line 320 (Fig. 23b), through the H—4 contacts now closed, through cam contacts CC—11, through the LL—2 contacts now closed to the right hand stepping switch arm of stepping switch SB, thence through stepping switch arms, through the BB relay coil and back to ground. Relay coil BB is held energized by its stick contacts BB—41, the stick circuit being completed to line through CC—10 and relay contacts H—4 now closed. Another circuit is established from line 320, through the H—4 contacts now closed, through the CC—8 contacts, to the other arm of the stepping switch SB. Such arm is now on the first contact position. From this first contact a circuit is completed through the 1YY—2 contacts now shifted, through the 2YY—3 contacts also shifted, through the 3YY—4 contacts non-shifted, through the 4YY—4 contacts non-shifted, through the 5YY—4 contacts in non-shifted position, through the BT—4 contacts in the position shown, through BS—5 contacts in the position shown, through the BZ—85 contacts and the CD—6 contacts in the posiion shown, and the CE—13 contacts in the position shown to and through the 3CS column shift relay coil and back to ground.

It may be explained that the column shift relay coil 3CS and relay coil BB cooperate to control the readout of the dividend comparison portion from RDR and various of the contacts controlled by relay coil BB are utilized to control the readout of the various divisor multiples from the pattern cards.

The manner in which a comparison portion of the dividend is set up on the comparison units will now be described.

It will be understood that the comparison portion of the dividend includes a selected number of columns.

Prior to each comparing cycle, provision is made to energize the restoring magnets 343AZ and 343AW (Figs. 23d and 14). This is brought about in the following manner. A circuit is established from line 320 (Fig. 23d), through the CK—2 contacts in the position shown, though the now shifted BH—5 contacts, to the CC—9 contacts, down to and through the 343AZ and 343AW restoring magnets and back to ground. This will allow restoration of all of any sectors of the comparing units which have been previously set.

Referring to Fig. 22e a circuit is completed from line 320, through the RD—15 contacts in the position shown to add emitter 40. With such emitter in circuit impulses are emitted out via lines 362, through 3CS—5—8, BB—42—45 contacts now closed, to the dividend side comparing magnets 1AW, 2AW, etc. (Fig. 22d).

It will be understood that the comparison portion of the dividend is set up in multiple in the comparing units, that is to say, there are nine identical setups of the comparison portion of the dividend in order that there can be comparing between each setup and nine different divisor multiples related to the reducing constant. In the typical problem under consideration (Fig. 33), the comparison portion of the dividend which was so set up is the amount of 0360. The energization of the AW comparing unit magnets sets up the sectors of the comparing units in the manner previously explained in the mechanical description. The setup of the multiples of the divisor on the other side of the comparing unit sections will now be described.

Referring to Fig. 21c, add emitter 38 is in circuit with line 320, through the MM—1 contacts now in the position shown. The add emitter 38 emits impulses through all the pattern cards in the various pin boxes. On the circuit diagram output cables from the pin box are shown with two branches to the pin box pertaining to each pattern card section. One set of branch cables generally designated 382 receives the impulses pertaining to multiples of the first reducing constant. The other set of branch cables 383 receives the impulses pertaining to the second reducing constant. The branch cables 382 join in a common cable and again come out as branches (see Fig. 21d). One group of lines 382 go to the normally closed side of a set of three-blade contacts designated BZ—9 to 44. The other set of cables designated 383 go to the open side of this set of three-blade contacts. When the first set of multiples pertaining to the first reducing constant are being derived from the pattern cards in the pin box unit, the BZ—9 to 44 contacts are in non-shifted position, but when the second reducing constant multiples are being derived the three-blade contacts are in shifted relation. With the contacts in non-shifted relation, which is the condition under consideration, the impulses flow through BJI—36 contacts now closed, via a group of lines generally designated 381 (see also Fig. 22d), thence through certain of the BB—1—40 contacts now closed to the 1AZ, 2AZ, 3AZ divisor multiple comparing magnets. It will be understood that the divisor multiple side of the comparing units will receive settings of the different divisor multiples relating to the first reducing constant. Impulses originate at add emitter 38 and the selection of the impulses according to the various digital multiples is effected by the pattern cards in the pin box unit. The comparing units operate in the manner previously explained to make suitable settings of the brushes upon the comparing commutators.

Having entered both the dividend comparison portion in a multiple manner in the comparing units and having entered the various multiples of the divisor in the other side of such comparing units the brush devices of the comparing units receive their settings in the manner previously explained to indicate a greater than and equal to or less than condition. As shown in Fig. 22d, the comparing unit commutators are in sections, one section being provided for each multiple from 1 to 9 with an extra section mark, which is utilized on certain special computations. This extra section of the comparing commutator need not be now considered.

Referring to Fig. 22d, the comparing unit commutators are sectionalized one for each multiple. For each section there is an associated relay coil such as 9CU for a 9 multiple, an 8CU for an 8 multiple and so on. The brush action of the comparing devices is adapted to prevent energization of all the magnets related to multiples which are higher than the comparison portions of the dividend and to permit energization of magnets related to multiples equal to or less than the comparison portion of the dividend. With the problem of Fig. 33, the only magnet which will be energized is relay magnet 1CU. The circuit energizing this magnet is from line 320 (Fig. 22d) through cam contacts CC—12, relay contacts BB—46 now closed, through the commutator associated with 1CU, through 1CU and back to ground.

At this point it may be explained that if a 4 multiple was the selected multiple, the 4CU coil, the 3CU coil, the 2CU coil and the 1CU coil would be energized and all higher number magnets above 4CU would not be energized.

The comparing cycle takes a single machine cycle and during such machine cycle, the comparison portion of the dividend is concurrently compared with all the different digital multiples of the divisor. Immediately after a set up is made in the various multiple comparison units there is testing and such testing for all multiples is effected concurrently.

Referring now to Fig. 22d, the energization of relay coil 1CU will have shifted relay contacts 1CU—1 (Fig. 23d) to reverse position from that shown and upon closure of cam contacts CC—9, current flows through the contacts 1CU—1, down to and through the 1X multiple selecting relay and through the MM relay to ground. The multiple selecting relay 1X is maintained energized through the stick contacts 1X—1, the stick circuit extending back to line, through CC—15. It may be mentioned that the 1X relay is energized in one machine cycle just after the commutator test is made and such relay is maintained energized through a portion of the next cycle to select the one multiple which is to be read out from the pattern card and which multiple is to be subtracted from the dividend comparison portion of the divisor. The 1X multiple selecting relay when energized also selects a related quotient digit for entry into the quotient receiving device LQ. Relay coil MM previously referred to, is maintained energized as long as the 1X coil is energized, being in circuit therewith.

Shortly later, it will be explained how there is effected a deduction of the multiple amount derived from the pattern card from the comparison portion of the dividend in the RD receiving device. However, before explaining this deduction it may be explained that during electrical resetting of RD which was effected by subtractive entries the elusive one was entered into an accumulator to bring the all nine setting of the wheels to a zero setting after the complementary entry. When the divisor multiple is to be subtracted, however, the elusive one entry is made during the comparing cycle. Such one is only introduced into the RD accumulator in the event that a multiple is to be introduced in such accumulator upon the following cycle. If no such multiple is to be introduced the entry of such one on the comparing cycle is suppressed. For introducing such one at the carry time in the comparing cycle, the carry impulse flows from line 336 (Fig. 23e), through the now closed MM—2 contacts, through the 3CS—13 contacts, through one of the lines 384, through one of the now closed DL1—10 relay contacts, through one of the 1MS1—10 contacts, etc., through the proper 326RD accumulator magnets. If no going multiple is found on the comparing cycle, no "1" entry will be made, such entry being suppressed by the fact that relay MM is de-energized so that the MM—2 contacts in the "1" circuit will remain open.

Provision is made for deducting the selected divisor multiple from the comparison portion of the dividend and such deduction is made in the machine cycle following the comparing cycle. In the operation the 9's complement of the selected divisor multiple is read from the pattern card and such 9's complement is entered into the RD accumulator. This operation will now be described.

Previously upon ML reset, contacts ML—28 (Fig. 22f) close. The circuit is completed from line 320, through relay contacts Dd—4, through the ML—28 contacts to energize relay coil DE. The stick circuit for relay coil DE is through relay contacts DE—129.

With relay coil MM energized (Fig. 23d), relay contacts MM—1 (Fig. 21c) will shift to reverse position and a circuit will be established from line 320, through these contacts to complemental emitter 39. Such emitter will emit 9's complemental impulses through the perforations in the pattern cards and impulses will flow through the proper zone of the pattern card through the DE25—28 contacts, the 1X5—8 contacts, lines 347 (see also Fig. 21d), through the BK37—40 contacts in the position shown, via lines 348 (Figs. 22d and 23d), through the BG5—8 contacts in shifted position, through lines 349 (see also Fig. 23e), through the 3CS—9—12 contacts, via lines 384a, through the proper DL—1—10 contacts now closed, through wires and cable 374, through the proper 1MS, 2MS, etc., control contacts, to the proper orders of the related orders of the 326RD accumulator magnets. This operation will deduct 240 from the amount of 360, the comparison portion of the dividend in the RD accumulator. It will be recalled that a one entry had been made in this accumulator previously and the regular electric carry will provide for transfer to higher orders when required.

Referring to Fig. 33, it will be noted that the entry into RD on the deducting cycle is 9998799. The 9 to the left of the 7 is derived from a zero perforation in the pattern card. However, there is no pattern card source for the extreme left hand 9 and a source must be provided for such extra 9. In some cases one extra 9 will be required from the extra source and in other cases more than one extra source will be required for such extra 9 source for filling up the entry into RD to the left of the complemental entry derived from the pattern card.

Referring to Fig. 23b, upon energization of relay coil 3CS, relay contacts 3CS—14 close, energizing a supplemental relay coil 3DN.

Referring to Fig. 23b, the circuit is from line 320, through relay contacts BH—20, through the 3CS—14 contacts, through relay coil 3DN to ground. Relay coil 3DN upon being energized, closes contacts for introducing a 9, such contacts being designated 3DN—1 (Fig. 23e). The 9 circuit is from line through cam contacts CC48 and relay contacts MM—5.

It may be explained that if in lieu of the 3CS column shift relay being energized, the 4CS column shift relay was energized, a 4DN relay coil would become energized, to close two contacts, viz., 4DN1—2 to thereby introduce two nines instead of one to the extreme left in the RD accumulator. The circuit to the accumulator magnets need not be traced in detail as such circuit extends through the proper 384a lines, through the pyramidical contacts on Fig. 23e and to the proper and related 326RD accumulator magnets.

On deducting operations unwanted back circuits to the carry contacts which might come into action on the entry of the one are prevented in the following manner.

Referring to Fig. 23e, upon subtracting operations the BH8—16 contacts are open. Also the column shift contacts such as 3CS—14 are in shifted position. Such column shift contacts are three-blade contacts and when in shifted position the carry circuit extends through these contacts to the now normally opened contacts of the BH—8—16 group, thereby breaking the carry circuit and preventing undesired back circuits at this point.

*Entry of quotient digit amount upon reducing dividing*

During the comparing cycle current supply was afforded from the "1" contact of the left hand arm (Fig. 23b) and the SB stepping switch to the 5YY—4 contacts which were in the position shown. From such contacts a wire circuit is provided in cable 385, to and through the DM—3 contacts now closed, through the non-shifted BO—5 contacts, the non-shifted BT—16 contacts. the non-shifted BS—18 contacts, to the quotient digit place selecting relay magnet 6Q and back to ground. With such relay 6Q energized, relay contacts 6Q—1 (Fig. 22e) close. With such contacts 6Q—1 closed, a circuit is provided from line 320 (Fig. 22e), through the RD—15 contacts in the position shown, to add emitter 40. Inasmuch as relay coil IX was energized on the comparing cycle, relay contacts IX—13 (Fig. 22e) are closed and accordingly a one representing impulse will flow through IX—13, via the line 387, through the quotient place routing contact 6Q—1, through the BO—19 contacts in the position shown, to the proper order of the 326LQ accumulator magnets.

Referring to Fig. 33, it will be noted that on the first comparison that a quotient digit of one will be entered in the fifth order from the left of the LQ accumulator.

Referring to Fig. 33, the RD accumulator, after the foregoing deducting operation, has standing in it the remainder amount of 12094200. There is now to be another comparison operation and with such comparison operation there is a different comparison portion of the dividend which is selected for comparison. The previous comparison was made of the amount of 360. The second comparison is to be made on the amount of 1209 and 1209 appears relatively one column to the right in RD compared to the orders in which the 0360 amount appears. There must be accordingly a column shift to take a different comparison portion of the dividend from the RD receiving device for the next comparing operation.

At the end of the quotient entering and multiple deducting cycle, upon closure of CC—9 (Fig. 23d), the circuit is established through the various series of contacts 9CU—1, 8CU—1, etc., including the ½CU—1 contacts which are in non-shifted position, through the JJ—2 contacts, to energize the LL relay. LL being energized, contacts LL—1 close, establishing a stick circuit for relay coil LL. Upon closure of CC—14, current supply is supplied through the H—2 contacts to stepping switch magnet 380SB. With switch magnet 380SB energized, the stepping switch arms step to the "2" contact position (Fig. 23b and Fig. 23c). Relay coil BB (Fig. 23b) is energized in the manner previously described, but this time through the "2" contacts of the stepping switch. The upper left arm of the stepping switch is on the "2" contact position and a circuit is provided similar to that previously traced for the "1" position, except in this instance, one column further to the right through the various pyramidical contacts to ultimately energize column shift relay coil 4CS. Likewise supplemental relay coil 4DN becomes energized. The column shift relay 4CS thereupon selects another comparison portion of the dividend for comparison. In this instance the comparison amount is 1209 in the columnar relation shown in Fig. 33.

When this comparison is to be made, circuits are completed from RDR (Fig. 22e), through the 4CS column shift contacts, 4CS5—8, and the various 1AW, 2AW comparing magnets are energized as before, but for the different comparison amount. There is also a setup of the other side of the comparing units under control of the pattern cards in the pin box just as for the previous comparison. The result of this comparison is to ultimately energize comparing relay magnets 5CU and all lower numbered relays 4CU, etc. With relay coil 5CU energized upon the comparing operation, contacts 5CU—1 (Fig. 23d) shift and there is an energization of the 5X relay. This is maintained energized as before and relay MM in circuit therewith is also energized. There follows a further deducting cycle with the entry of a "1" preceding such cycle including the filling out of 9's to the left and there is in this case an energization of the 7Q quotient place relay. Quotient entry of the amount of 5 is provided through the 5X—13 contacts (Fig. 22e).

Referring now to Fig. 33, upon the completion of this deducting and quotient entry cycle, the 5 quotient amount will have been entered in the LQ accumulator in the proper columnar order and the RD accumulator will stand with a remainder amount of a 94200 thereon. The next comparison occurs with the four bracketed orders 0094. It will be noted, however, that 240, the first reducing constant, is greater than 0094. Accordingly, none of the comparison relay coils ICU, 2CU, 3CU, etc., will become energized upon the comparing operation. When such coils ICU, 2CU, etc., fail to energize, their related contacts ICU—I, 2CU—I, etc. (Fig. 23d) remain in the relation shown. At the end of the comparing cycle, upon closure of CC—9 there is a re-energization of the stepping switch magnet 300SB.

At this stage of the operation, the machine will have completed the reducing of pence back to pounds. Its status must now be changed to subsequently utilize the shillings to pence reducing constant and multiples thereof as derived from the pattern card. Also inasmuch as a different number of columns are required for comparison on the reduction of pence to shillings and upon the reduction of pounds to shillings, a different column shift control must be called into action to provide for comparison for a two column amount to the different digital multiples thereof, viz., total of three columns.

This change of control will now be described. Upon the left arm of the stepping switch SB, assuming the "4" contact position (Fig. 23b top) and upon two other arms of the stepping switch (Fig. 23c top) also assuming the "4" contact position a new set of circuits will be established.

Referring to Fig. 23b, relay coil BB will be re-energized as before, but under control of the stepping switch arm in the "4" position.

Referring to Fig. 23b, at this stage of the operation a circuit is established from line 320, through the H—4 contacts now closed, through CC—8, through the BH—6 contacts now closed, to wire 389 (see also Fig. 23c). From wire 389 a circuit is completed through the CM—4 contacts in the position shown, through the left hand arm of the stepping switch to contact position "4," thence through the CM—8 contacts in the position shown, through the IYY—16 contacts in shifted position, through the 2YY—16 contacts in shifted position, through the non-shifted 3YY—16 contacts and the non-shifted 4YY—15 contacts, through the non-shifted 5YY—14 contacts, through the BT—24 contacts in the position shown, through the BS—25 contacts in the position shown, through the CM—3 contacts in the position shown, to energize relay coil CG. CG when energized closes its contacts CG—3, Fig. 21f, to energize relay CV. The stick circuit for CV is through the cam contacts CV—I and contacts FC—17.

It will be recalled that when the pence amounts were being reduced to pounds that the 240 reducing constant was utilized. When such constant is utilized, the relay coil DE (Fig. 22f) is energized. In order to change to another reducing constant, i. e., the pence to shilling constant, provision is made for de-energizing relay DE. This is effected in the following manner. Upon energization of CG (Fig. 23c) in a manner previously explained, relay contacts CG—2 (Fig. 22f) open, thereby breaking the stick circuit for relay coil for DE and causing it to be de-energized.

Referring now to Fig. 21c, with relay coil DE de-energized relay contacts DE1 to 63 shift to the position shown in the circuit diagram. The effect of the shift of these contacts is to cut off the circuits to the fields of the pattern cards which pertain to the pence to pounds constant and to establish circuits to the pattern cards pertaining to the pence to shillings constant.

Contacts DE127 also close to provide a nine circuit to the highest order line of the 347 group through the MM—4 contacts which become closed whenever a subtractive entry is to be effected into RD of an amount derived from the pattern card in the pin box. If reference be made to Fig. 33, it will be noted that following step three, wherein the last comparison was made involving the first reducing constant that there is a column shift effected to the left when the second reducing constant is utilized on the following comparison.

In the present computation the shift back is to the amount of one column. Such one column shift back is required because the first reducing constant comprises three columns and the second reducing constant comprises two columns. If, on the other hand, the second reducing constant only involved a single column, the shift back would be increased by one column and would be to the amount of two columns. Shift back of readout from RD is brought about as follows:

Referring to Fig. 23d, energization of relay coil CG closes relay contacts CG—I. With such contacts closed, there is an energizing circuit provided for relay coil CD and BZ. At this point it may be mentioned that if the second reducing constant was a single column constant relay coil BO would have been previously energized, affording by the closure of contacts BO—2, a circuit for the energization of relay coil CE in addition to CD and BZ. With relay coils CD and BZ energized, there is a shift of the related pyramidical contacts (Fig. 23b), viz., BZ—81—93 shift to reverse position from that shown in the circuit diagram and CD2—14 also shift to reverse position from that shown. Such shift of these contacts re-interrelates the RD readout for the shift back mentioned above.

At this stage of the operation the switch arms of the stepping switch SB (Fig. 23b, upper left) are on the "4" contact position. Accordingly, a circuit will be established from line 320, through the H—4 contacts now closed, through the CC—8 contacts, through the arm of the stepping switch to contact point "4," thence to the IYY—5 contacts in shifted position, to the 2YY—6 contacts in shifted position, through the 3YY—7 contacts in the position shown, through the 4YY—7 contacts in the position shown, through the 5YY—7 contacts in the position shown, through the BT—7 and BS—8 contacts in the position shown, through the BZ—88 contacts in shifted position, through the CD—8 contacts in shifted position, through the CE—14 contacts in the position shown, to the 4CS column shift relay and back to ground. The parallel circuit is established from the 5YY—7 contacts to energize relay coil 9Q at the time 4CS is energized. A circuit to 9Q extends through a wiring in cable 385, through the DM—6 contacts now closed, through the BO—8 contacts in the position shown, through the BT—19 contacts in the position shown, through the BS—21 contacts in the position shown, through the relay contacts DQ—12 in the position shown and to relay coil 9Q. With relay coil 4CS energized, the companion relay coil 4DN will also become energized in the manner previously explained. A further comparison then occurs in the same manner as previously explained, except that the comparing units are set up from the second reducing constant zones of the pattern cards instead of from the first reducing constant zone.

Referring to Fig. 33, step 4, it will be noted that the comparison which is here effected, indicates a "no go" condition. 09 is the amount compared and 12 the second reducing constant is greater than 09. The impulse circuit from the pattern cards goes through the normally closed DE—1—3, 8—10, 15—17 etc., contacts, via lines 383, thence through the cables to Fig. 21d and through the now shifted BZ—9—44 contacts, out via the lines 381 (Figs. 21d and 22d), through certain of the BB1—40 contacts now closed, to the 1AZ, 2AZ comparing magnets and back to ground. Upon a "no go" condition, none of the 1CU, 2CU, 3CU, etc., relays will be energized under control of the comparing commutators. Accordingly, the 1CU—1, 2CU—2, etc., contacts (Fig. 23d) will not be shifted. Upon the next closure of cam contacts CC—9, a circuit will be established through these contacts to again energize the stepping switch magnet 380SB. This advances the arms of the stepping switch to the next contact position, i. e., the "5" position, whereupon a new comparison will be brought about including a further column to the right of RD, i. e., there will be a comparison of 94 with 12, 24, etc. (see Fig. 33). The next comparison will ascertain that the going multiple is 7, 7 will be entered into LQ and 84 will be deducted from the 94 amount in RD by complemental addition in the manner generally explained before. The deducting operation involves the entry of a "9" through the circuit through MM—4 and DE—127. Following the final deducting operation (see Fig. 33b), there is a ten pence remainder standing in RD. Dividing operations, i. e., comparing and deducting, are now to be terminated. Termination of such operations is effected by energizing relay coil H (Fig. 23c). The energizing circuit is from 320 (Fig. 23c) through the CC—17 cam contacts, through the LL—3 contacts now closed, through the CM—2 contacts in the position shown, through the CV—2 contacts now closed, through the arm of the stepping switch SB, to the "5" contact spot, through the 1YY—25 contacts in shifted position, to the 2YY—26 contacts in shifted position, through the 3YY—26 contacts, the 4YY—25, the 5YY—24 contacts in the position shown, through the CJ—3 contacts in the position shown, through the BS—28 contacts in the position shown, through the BT—28 contacts in the position shown, through the BZ—4 contacts in shifted position, through the CD—16 contacts in shifted position, through the CE—2 contacts in the position shown, through the 1DQ, 2D" and 3DQ—23 contacts in the position shown, through the CM—1 contacts in the position shown to energize relay coil H. Relay coil H is maintained energized through the stick circuit afforded through stick contacts H—1 which is completed to line, through the shifted BH—22 contacts and through the CA—13 contacts to line, which contacts are in parallel with CC—36. Energization of relay coil H causes shift of contacts H—2 (Fig. 23d) to reverse from that position now shown.

Accordingly, CC—9 close and there will be an energization of the stepping switch release magnet 381SB, through the now shifted H contacts. There will also be an energization of relay coil LL in the manner previously described. The stepping switch is then automatically restored to normal position. The machine is now ready to transfer the amount of the pence remainder amount standing in RD into the LQ accumulator.

Referring to Fig. 23a, when cam contacts CC—21 close, a circuit is completed through the now shifted H—3 contacts, through the BH—18 contacts now closed, to energize relay CA. Relay CA controls transfer from RD to LQ. Referring to Fig. 22e, upon energization of relay CA, contacts CA—1—10 close. A circuit is afforded to add emitter 40, through the RD—15 contacts in the position shown. The add emitter 40 emits impulses through RDR which impulses flow through the now closed CA—1—10 contacts and the now shifted BH25—34 contacts, to the proper 326LQ accumulator magnets. The contacts BH—25—34 are provided to route the pence entry so that they always appear in the extreme right hand columns of the LQ accumulator.

At this stage of the operation, the RD accumulator may be reset to zero.

Referring to Fig. 22f, with contacts CA—12 closed, a circuit is provided from the grounded line through CC—37, through CA—12, to energize relay coil BA. The stick circuit for relay BA is through stick contacts BA—1, a circuit being provided to ground through CC—38. Energization of relay coil BA will cause closure of contacts BA—2 (Fig. 23a). Upon closure of cam contacts CC—27, a circuit is provided from line through the BA—2 contacts now closed, through the CL—1 contacts in the position shown, to energize a 334RD reset coil. Reset of RD is effected electrically in the manner previously explained.

Final result recording

The machine is now ready to record the final result back on the record from which the terms have been derived. Initiation of such recording operation is brought about as follows: Referring to Fig. 21f, upon closure of contacts RD—16, upon RD reset, a circuit is provided from grounded line 321, through the cam contacts CC—4, through relay contacts CO—4, now closed, through the now closed RD—16 contacts to energize relay coil A. A stick circuit for relay coil A is through the stick contacts A—1, through the LQ—15 contacts which are in shunt with cam contacts CC—19. With relay coil A energized, relay contacts A2—11 (Fig. 23f) close, affording a circuit from the LQ readout to the punch interposer magnets 390. Punch interposer magnet circuits will now be traced.

Referring to Fig. 23f, a circuit extends from line to one side of the interposer magnets 390. A circuit is completed through one of these magnets, through one of the A—2—11 contacts in closed position, to and through LQR, and for the first product punching position to an outgoing line leading to one of the 318 sockets, thence via plug connection from 318 to one of the sockets 319, Fig. 21f. In the punch the usual readout strip and brush commutator device establish a circuit through the usual punch escapement contacts 391, through the A—1 holding contacts now closed, through the circuit previously traced to line 321. The energization of selected ones of the coils 390 will cause closure of the punch interposer control contacts 392, and upon closure of 392 there will be an energization of the punch magnet 393. Punching now takes place for the first result punching position. The usual escapement occurs in the punch and punching occurs for the further orders of LQR.

It may be explained that concurrently with the punching of the result on the record there is a new card feed cycle initiated. Such new card feed cycle occurs upon RD reset.

Referring to Fig. 21f, a circuit is established from line 321, through CC—20, through the CO—2 contacts now closed, through the RD—12 contacts which are closed on RD reset to energize relay coil E. Relay coil E once energized is maintained energized through a circuit extending through stick contacts E—1, cam contacts FC—2. Energization of relay coil E shifts relay contacts E—2 and provides an energizing circuit through the card feed clutch magnet 323. The circuit is established upon closure of cam contacts CC—29, and this circuit need not be traced as it has been previously explained. A new card feed cycle is now brought about and a new set of calculating operations pertaining to a new record card initiated.

In the customary way, the punch control contacts P—5 become closed (Fig. 22f) on the card reaching the beyond the last column position and closure of such contacts brings about an energization of relay coil B. Energization of relay coil B closes relay contacts B—1 and a circuit is completed through the usual eject magnet 394 (Fig. 21f). Upon eject of the card under the control of the eject magnet 394, the usual punch control contacts P—3 become closed. With the card in the beyond the last column position in the punch, the relay coil B will be energized and with a card in the receiving tray of the punch relay coil D will become energized since card lever contacts 330 (Fig. 22f) will have become closed. With relay coils D and B thus energized, relay contacts B2 and D—2 (Fig. 23a) will become closed and with such contacts closed, the 334LQ reset relay will have been energized through the circuit path previously traced. Reset of the LQ accumulator will then be brought about in the manner previously explained and such reset will initiate a new computing operation in the manner previously explained. During LQ reset contacts LQ—15 (Fig. 21f) open, thereupon breaking the stick circuit for relay coil A.

On the initiation of a new card feed cycle, certain relays are de-energized preparatory to a new computation. The opening of cam contacts FC—16 (Fig. 21f) de-energize relay coils BH and CO. The opening of cam contacts FC—17, de-energizes relay coil CV. The opening of contacts BH—35 upon the de-energization of BH causes de-energization of relay DL. The opening of BH—36 de-energizes relay DM. The opening of the BH—24 de-energizes relay coil BG. The opening of relay contacts BH—2 de-energizes BJ. The opening of contacts BH—4 (Fig. 22f) de-energizes the 1YY and the 2YY relay coils.

*One-half cent pickup*

For augmenting the result amount to the nearest one-half, a plug connection can be established from socket 395 to a selected one of the sockets 396 (Fig. 23e). A further plug connection will be established from socket 397 (Fig. 23f) to one of the sockets 300. With the plug connection established between 397 and 300 when one of the 1MS, 2MS, etc., relays are energized, there is also an energizing circuit established to energize relay DP. Relay DP has stick contacts DP—1 connecting to the same holding circuit for the stick circuits of the 1MS, 2MS relays, etc. Upon the LQ reset cycle, which precedes the regular multiplying phase, contacts LQ—17 (Fig. 23e) close, providing a circuit from line 320, through cam contacts CC—49, which are timed to close at the "5" index time in the cycle, through the relay contacts DP—2 now closed, through the LQ—17 contacts now closed, through the plug connection from socket 395 to the selected one of the 396 sockets and to one of the 326RD accumulator magnets. Accordingly a current impulse will flow at the "5" index point time in the cycle to the selected 326RD accumulator magnet. This will provide for the rounding off of the product result in the usual manner.

*Calculations for compound denominate numbers having lesser number of units*

The previous calculation which was described was one wherein two reducing constants were involved in reducing the compound denominate number units. The machine may also be operated with compound denominate numbers where there is only one reducing constant. In such case the proper related pattern cards would be placed in the pin box unit. The machine would also be re-plugged to compute with the computing calculation involving a single reducing constant. For example, let it be assumed that the compound denominate term includes pounds and shillings, but no pence.

Referring to Fig. 22f, a plug connection will be established from socket 307 to 307b with a further plug connection between 306 and 306a. With such plug connections established there would be an energization of relay coils BC and BD on the LQ reset cycle preceding the reducing multiplying phase. There would then subsequently be an energization of relay coils of DF and DE under control of the BC—3 and BD—3 contacts. The ultimate effect of such controls is to cause the machine at the beginning of the reducing multiplying phase to immediately commence operations pertaining to the first reducing constant instead of working first with the second reducing constant which in this event is non-existent. The first reducing constant would be available on the pattern card, which in a pounds and shilling amount would equal 20, there being twenty shillings in a pound. The amount of twenty and the various digital multiples thereof will occupy the zone on the pattern cards previously occupied by the 240 constant which is required in a pounds, shillings and pence calculation.

In handling a two-unit compound denominate number calculation, for example, a multiplication of an amount, seven pounds, seventeen shillings times 2.58, the operator must otherwise prepare the machine for such type of calculation. The entry circuits from the brushes which sense the shillings amount on the record card must be re-plugged so that the shillings amount can be directly entered from the record into RD. For this purpose plug connections are made between the sockets 314 (Fig. 23a) pertaining to the shillings columns or orders of the record to sockets 317 (Fig. 23e). This will provide for the entry of the shillings amount of seventeen shillings in the typical computation mentioned in RD accumulator. The entry will be effected in RD in the extreme right hand columns pertaining to the converted amount in shillings.

In preparing the machine for this type of calculation, another plug connection must be made to change the operation terminating control which is effective on the reducing dividing phase. In the previously described calculation the reducing dividing phase comprises two steps or stages one for a pence to pounds conversion and the other for a pence to shillings conversion.

In the present calculation there is only one stage or step of operation comprising the reducing of shillings to pounds. The terminating control must therefore be modified. Such modification is afforded by connecting a plug connection between sockets 399 and 400 (Fig. 22f). With this plug connection established upon energization of the BH relay which is energized at the beginning of the reducing dividing phase, the BH—23 contacts will close thereby energizing relay CM. Relay CM upon being energized, shifts its contacts CM—1—12 (Fig. 23c) to reverse position from that shown. The effect of the shift of these contacts is to provide a different initiating circuit for the energization of the terminating relay H. With the CM contacts shifted the pickup circuit for this relay H is via the circuits through the pyramidical contacts which previously energized the relay CG and such pickup energization of H occurs at an earlier machine cycle, vis. during the machine cycle in which reducing dividing operations by the first constant are completed. The new initiating circuit for H will now be traced in detail, referring to Fig. 23c.

It will be assumed that the stepping switch arms are on the "2" contact position. This is the position which these switch arms assume on the completion of the reducing dividing operation for the problem given above of multiplying seven pounds, seventeen shillings by 2.58. With the arms on the second contact position, a circuit is completed from line 320 (Fig. 23c) through cam contacts CC—17, through the LL—3 contacts now closed, through the CM—2 contacts in shifted position, through the CM—4 contacts in shifted position, via the stepping switch arm to the "2" contact position, thence through the CM—6 contacts in shifted position, through the IYY, 2YY, 3YY and 4YY—15 now in shifted position, through the 5YY—15 contacts in non-shifted position, through the BT—25 contacts in the position shown, through the BS—25 contacts in shifted position, through CM—3 contacts in shifted position, through the CM—1 contacts in shifted position to and through the relay coil H. Energization of relay H terminates operations in the manner previously described. On this particular problem the pattern cards are tested to ascertain the number of columns in the first constant. This involves the BS relay control which has been previously explained.

For recording the result from a problem involving a two unit number plugging of the two columns previously utilized for shillings is omitted and the shillings amount is derived from the two columns previously associated with the pence amount.

*Dividing a compound denominate number by a regular number*

Figure 34:
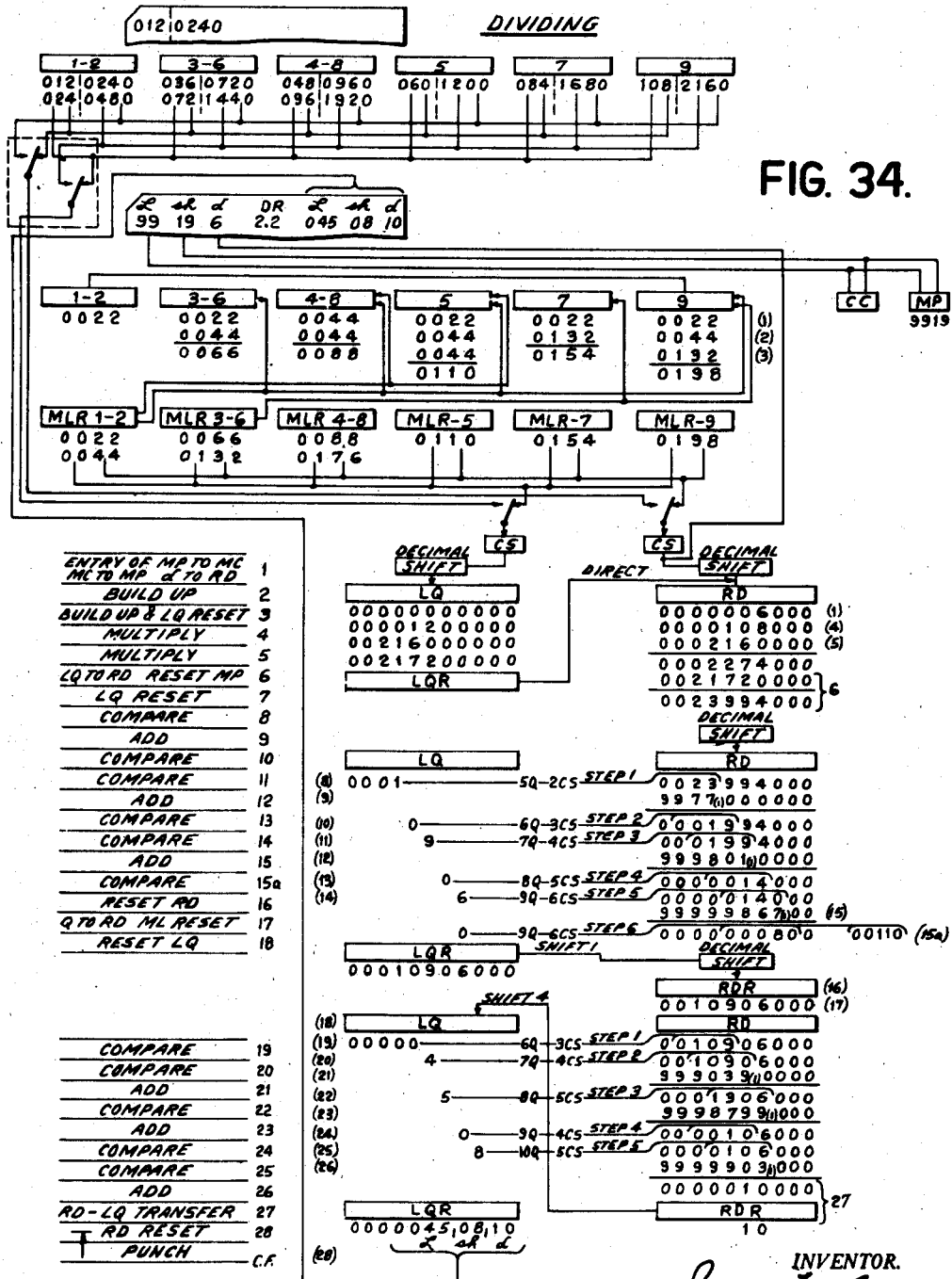
Figure 35:
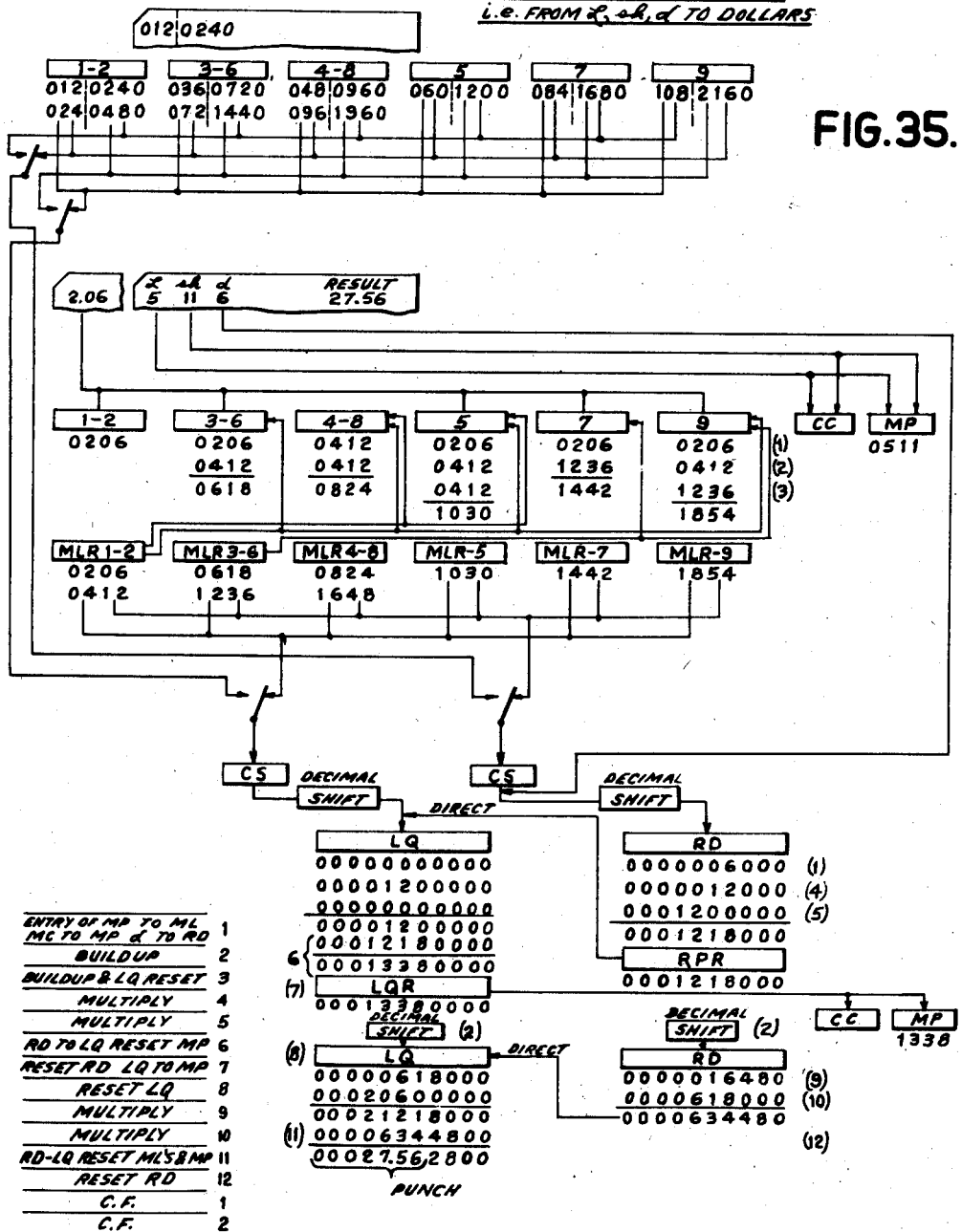
Figure 36:
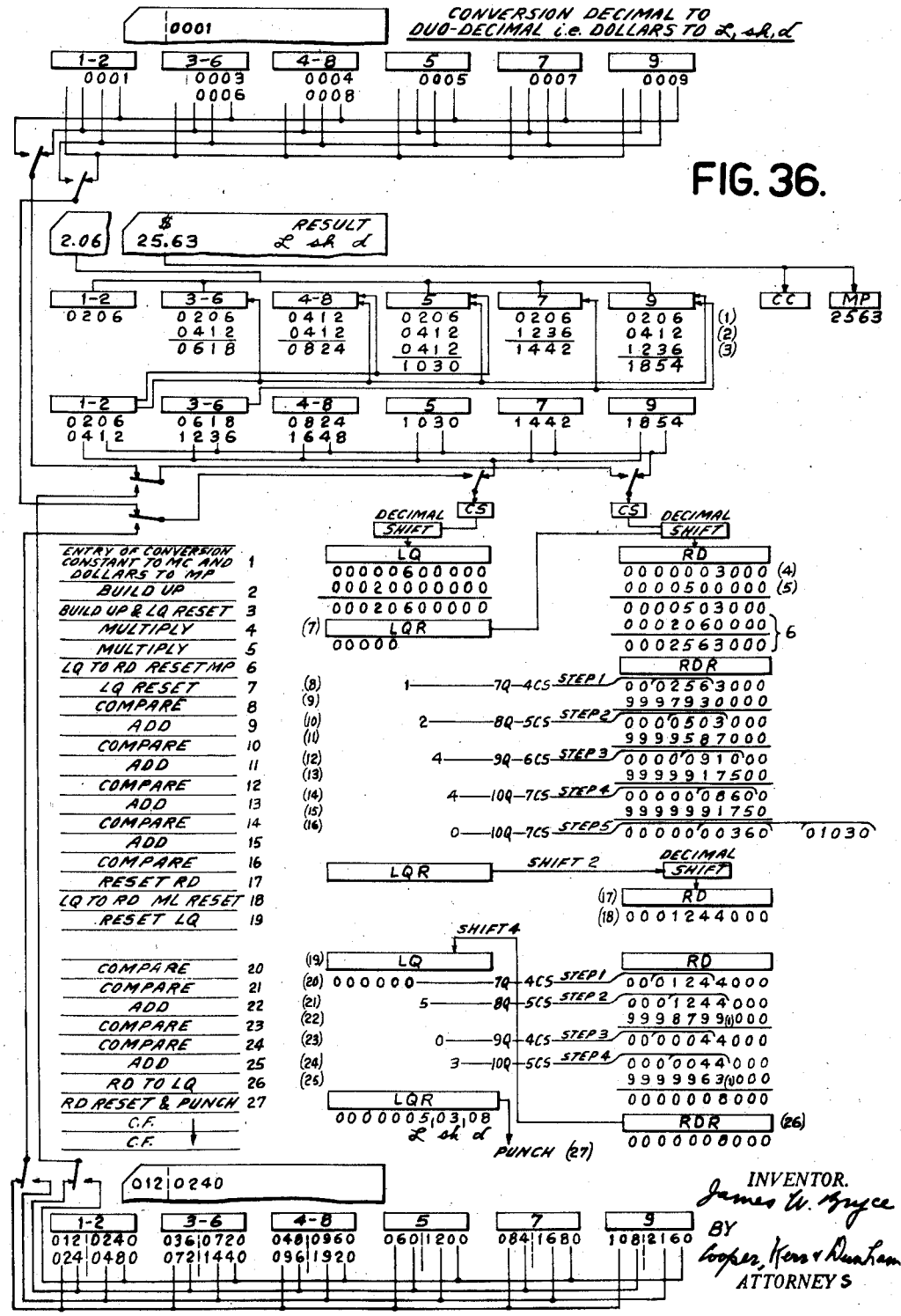
Figure 37:
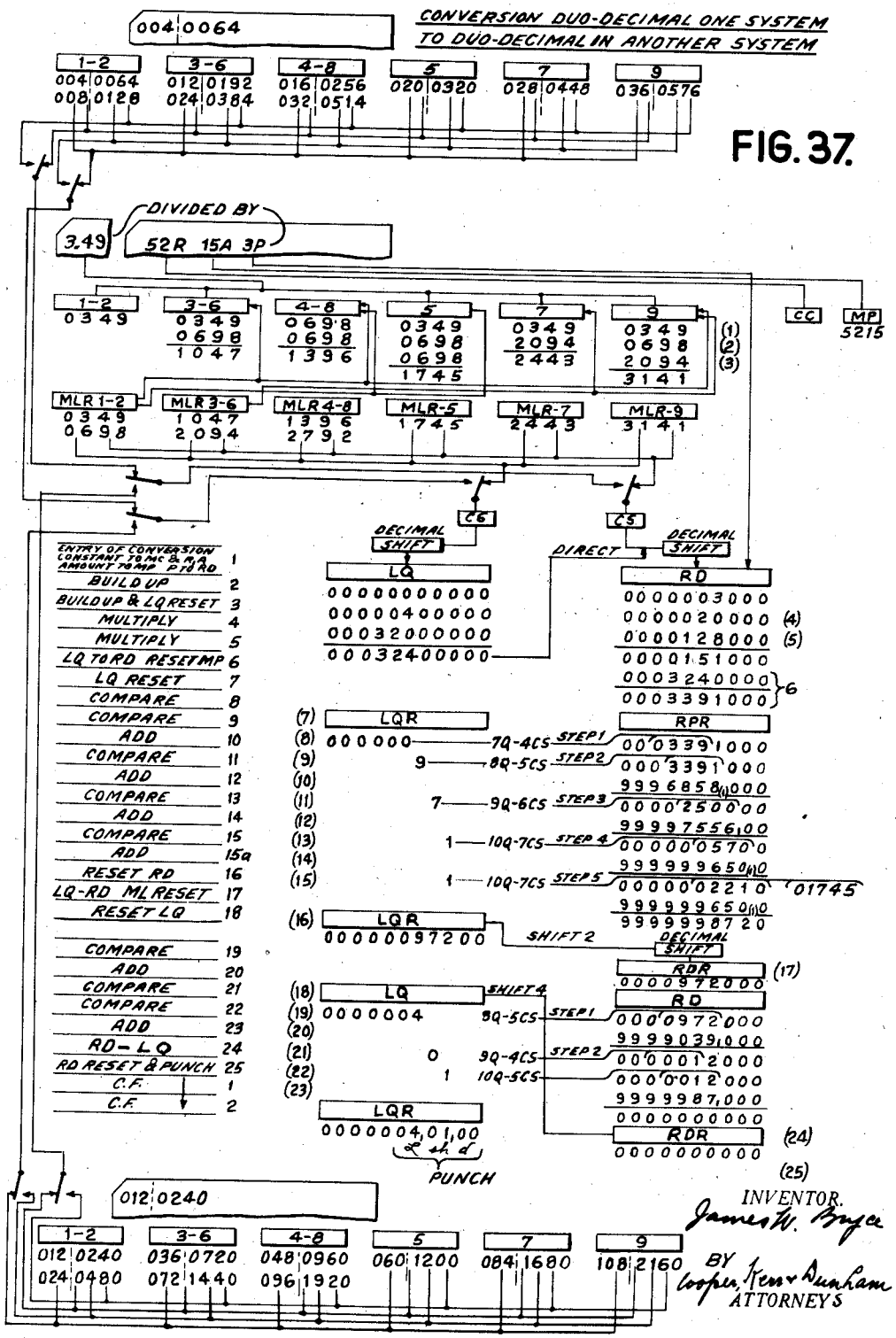

Referring now to Fig. 34, this illustrates diagrammatically a calculating operation wherein an amount of 99 pounds, 19 shillings and 6 pence is taken from the card, the same being a dividend amount and wherein the divisor amount DR on the card is 2.2. The general steps of procedure will first be explained (see also Fig. 29). On the card reading cycle the dividend amount pertaining to pounds and shillings will be read from the card and entered into MP. This is the same as in multiplication. The pence amount will be read from the card and entered into RD. The divisor amount will be entered in certain of the ML receiving devices. Following this machine cycle in which amounts are derived from the record card, the customary buildup cycles ensue. Multiples of the divisor are built up in the ML receiving devices and two machine cycles are utilized for such buildup. Following such buildup cycles, reducing multiplying cycles follow just as in multiplication. There is a reduction of the pounds and shillings amounts to pence as in multiplication. The first and second reducing constants are derived from the pattern cards. Following the reducing multiplying cycles which occur just as in the multiplying calculation there is a slight change in procedure. In multiplying the amount in RD is transferred to LQ. However, on a dividing calculation, the transfer is in reverse direction, viz., from LQ to RD. At the conclusion of such transfer cycle the machine is ready to proceed with regular dividing operations. The procedure is to compare a comparison portion of the pence product amount which is now the dividend and standing in RD with the various multiples of the divisor standing on the MLR readouts. Successive comparing and deducting cycles ensue and quotient entries are successively received in LQ. The final quotient result and remainder which is set up in LQ is a quotient result expressed in pence. Having obtained the quotient result in pence further reducing dividing operations must follow to reduce the pence quotient amount to pounds, shillings and pence. To provide for this operation following the last step of regular dividing, there is a reset of the RD accumulator. Following such reset cycle the quotient pence result in LQ is transferred over to RD. Thereafter the LQ accumulator is reset. Following such LQ reset cycle the regular reducing dividing operations again occur. These operations are identical with those in multiplication. The ultimate result including a pence remainder if any, is transferred to the LQ accumulator and following this is the usual recording operation followed by a re-initiation of card feed for a new calculation pertaining to a new record.

In order to prepare the machine for a dividing calculation, certain conditioning controls must be established. First a plug connection is made from socket 401 to 402 (Fig. 22f). This plug connection energizes relay CZ which may be termed a "master dividing relay." Also on dividing, different decimal point or place relays must be plugged up than those used for multiplication. The decimal point place relays for division are DQ, 1DQ, 2DQ and 3DQ (Fig. 23f). If the regular number is a whole number involving no decimal place at all, the DQ relay is plugged in circuit via a plug connection from one of the 403 sockets to the socket 404. If there is a maximum of one decimal place in the divisor, the DQ and 1DQ relays are brought into circuit by a two plug connection from 403 to 404 and 405. If there is a maximum of two decimal places in the divisor, three plug connections are employed, viz. those previously mentioned and an extra plug connection from socket 403 to 406, to bring the 2DQ relay in circuit. If the maximum number of decimal places is three in the divisor, all of the foregoing are plugged up and an additional relay is brought into circuit by a plug connection between sockets 407 and 403. The entry circuits from the record card are plugged just as in multiplying and these need not be re-described. A further plug connection is made from socket 403 to socket 408 to energize relay CJ.

On dividing operations reducing multiplication steps are identical with those in multiplication and these steps need not be repeated.

Following the reducing multiplying steps an LQ to RD transfer is to be brought about which is a different transfer than used in multiplying.

Referring to Fig. 23a, the energization of the master dividing relay CZ shifts the contacts CZ—2 to reverse position from that shown. With such contacts shifted and upon completion of the reducing multiplying phase the circuit which previously extended to transfer controlling relay CA which relates to the circuits for an RD to LQ transfer is now completed to relay coil BU which relates the circuits for an LQ to RD transfer. Relay BU is energized at the time and in the manner described for relay CA on multiplying. BU once being energized is retained energized by a stick circuit from stick contact BU—12, the stick circuit extending to line from cam contacts CC—5. With BU energized, relay contacts BU—1—10 close (Fig. 23f). With such contacts closed, the LQR readouts are related with the lines 460 which ultimately extend to the RD accumulator magnets, Fig. 23e, so that with the add emitter 46 in operation there will be a transfer of the amount standing in LQ to RD.

As in multiplying, MP reset occurs during the transfer cycle. Following such transfer cycle, the LQ accumulator is reset to zero. During the transfer cycle, relay contacts BU—11, Fig. 22f, close affording an energizing circuit for relay BE, the circuit being completed through CC—37. Relay BE is the initiating relay for LQ reset, such relay upon being energized, closes contacts BE—2 (Fig. 23a) and affording a circuit to the 334LQ reset relay. Electrical reset of LQ when the reset relay is energized is the same as before. The machine has now reached a stage in its operation wherein dividing operations may commence on the following machine cycle (see Fig. 29).

Regular dividing phase

It will be recalled that on reducing dividing operations in multiplying calculations that the RD accumulator readout RDR was tested for the presence and location of zeros to the left of the highest significant digit. On regular dividing operations a similar test must be made of such RD accumulator. Different controls for such test circuit are provided as follows:

Referring to Fig. 21f, an energizing circuit is provided for relay coil CH, through the CZ—3 contacts controlled by the master dividing relay and the BF—4 contacts which latter contacts were closed on the LQ reset cycle following card feed. With relay coil CH energized, a stick circuit is afforded through stick contacts CH—1 and the RD—19 contacts. Relay contacts CH—2 close to provide a holding circuit in conjunction with the C27 contacts for the 1YY, 2YY, etc., relay coils.

With relay coil BE energized, relay contacts BE—3 close and with CZ energized, relay contacts CZ—6 close. Such contacts provide a test circuit through the readout RDR of the RD accumulator. On reducing dividing operations relay contacts BH—3 are closed.

In the previous description of reducing dividing operations on multiplying calculations, the divisor multiples were derived from pattern cards in the pin box. In the instant operation, such divisor multiples are derived from the various MLR readouts in place of being derived from the pattern cards in the pin box. To shift the control so that the multiples can be derived from the MLR devices instead of from the pattern cards, contacts CH—3—42 close upon energization of relay CH (Fig. 22d). With such contacts CH—3—42 (Fig. 22d) closed, the comparing magnets 1AZ, 2AZ, etc., are connected up to the related MLR readouts. Circuits to the pattern cards are cut off inasmuch as relay coil BJ is de-energized, thereby leaving contacts BJ1—36 in open condition, thus interrupting the pattern card circuits.

On reducing dividing operations for multiplying there was a test for the size of the divisor by a pin box test of the pattern cards. On regular dividing operations there has to be a similar test for the size of the divisor, but this test is made from the MLR readouts instead of from the pattern cards.

The relays which were previously used on multiplying to test for the size of the divisor on the pattern cards were relays BQ and BR (Fig. 21c). On regular dividing such relays are out of circuit and their place is taken by relays CP and CQ (Fig. 21d).

With master dividing relay CZ energized, relay contacts CZ—4 close (Fig. 22c). With such contacts closed, upon the MP reset cycle, contacts MP—13 are also closed and at the proper time, the AV—37 contacts are likewise closed. A circuit is accordingly completed from line 320, through MP—13, AV—37, CZ—4, through the AV—32 contacts in shifted position, to the zero bus of MLR—1.

With the problem under consideration, the divisor amount is 022, there is one zero to the left of the highest significant digit. Accordingly, a zero test circuit through MLR is completed out on line 405, which line extends (see Figs. 22d and 21d) through the now closed AV—34 contacts to and through relay coil CP and back to ground. If the divisor amount was an amount such as 002, the 405 circuit would be energized and the 406 circuit would also be energized. With 406 and 405 both carrying current, the CP and CQ relays would both be energized. It will be noted that relay CP has contacts CP—1 which are in the energizing circuit for relay CQ. These contacts prevent the energization of CQ unless there is a zero in the extreme left hand order. The 406 circuit to relay CQ extends through the now closed AV—35 contacts.

With the problem under consideration the CP relay only is energized. Such zero test relay upon being energized, closed contacts CP—2 (Fig. 23d). With such contacts closed, an energizing circuit is provided through the BU—14 contacts now closed, through the CP—2 contacts now closed for relay coil BS. Relay coil BS being energized, it is maintained energized through the stick circuit having stick contacts BS—1. If there were two zeroes preceding the highest significant digit in the divisor BS would be energized and the BT relay coil would also be energized, this being energized because of the closure of CQ—1 due to the energization of CQ. Relay coil BS has its contact points which function just as in reducing dividing. In general, it may be stated that BS, when energized, controls the selection of which column shift relays are to be energized for the dividend comparison. Relay BS also controls which of the 1Q, 2Q, 3Q quotient entry coils are to be energized and it also controls the time of energization of relay H. On regular dividing operations contacts BS—25 are not utilized because the CG relay is cut out of circuit.

In the description of reducing dividing relay BH becomes energized for a certain control in dividing operations. On regular dividing, relay BH remains de-energized and in lieu thereof a relay CK becomes energized (see Fig. 22f). The energizing circuit for relay CK is from grounded line 321, through the CC—46 cam contacts, the CH—43 relay contacts now closed, the BE—4 contacts to relay CK and back to line. A stick circuit for relay CK is through contacts CK—1 and the BH—19 contacts now closed.

As before on LQ reset relay JJ (Fig. 22f) became energized. This is the computation initiating relay. With JJ thus energized relay contacts JJ—2 (Fig. 23d) close and with CK energized in the manner previously explained, relay contacts CK—2 shift to reverse position from that shown. With such contact shifted, the circuit is provided from line 320, through cam contacts CC—9, through all the ICU—1, 2CU—1 contacts in non-shifted position, through the JJ—2 contacts now closed, to the relay coil LL. A branch circuit is also completed through CC—14 to energize the stepping relay switch 380SB. With LL and 380SB dividing operations now follow just as in reducing dividing. Successive comparison and deductions ensue as shown in Fig. 34. Quotient entries are made into LQ and finally the quotient pence result appears in LQ as indicated. The only difference in this regular dividing calculation over reducing dividing is in the source of the multiples of the divisor. In the present instance, the source is from the MLR devices instead of from the pattern cards as in the reducing dividing comparison. With the foregoing exception, regular dividing operations are effected in the manner explained in detail for "reducing driving."

Special rounding off

The present machine capacity on regular dividing operations is limited to a pence digital amount.

Provision is not made in the instant machine for carrying the computations to a limit of farthings. However, in place of carrying regular dividing to a farthing limit, provision is made for rounding off the last pence digit to the nearest one-half. If the computation was carried further and there was found to be a remainder of $\frac{1}{10}$ of a pence, i. e., two farthings or a greater fraction, the machine in effect, by a test, ascertains the value of such decimal remainder and rounds off the units order of the quotient result. In lieu of carrying the computation to a further pence decimal order and then rounding off the result in the quotient accumulator accordingly, provision is made to test the final pence remainder obtained after the quotient entering and multiple deducting cycle and to compare such pence remainder with one-half the divisor. If the pence remainder is equal to or greater than one-half of the divisor the pence quotient digital result is augmented by one. On the other hand if it is less than one-half the value of the divisor there is no augmentation in the pence quotient result.

The manner in which this rounding off is effected will now be described.

Referring to Fig. 34, after the fifth quotient digit entry is made and upon the following deducting step, the remainder standing in RD is 008 pence. The divisor amount is 22 and one-half the divisor amount is 11. 8 is then compared with 11 to see whether such 8 amount is equal to or greater than 11. It is ascertained that it is not equal to or greater than 11 so there is no augmentation effected. The manner in which such comparison is made will now be described.

Referring to Fig. 21f, closure of cam contacts CC—45, establishes a circuit through the 3DQ—17 contacts, the 2DQ—17 contacts both in the position shown, through the now shifted IDQ—17 contacts, through the 6CS—15 contacts now closed, through the closed LL—4 contacts, the closed CJ—8 contacts to energize relay coil CW. The stick circuit for CW is provided through CW—1 and cam contacts CC—50. Cam contacts CC—51 upon closing establish a circuit through the now closed CW—2 contacts to energize relay CL, which coil remains energized by the stick circuit afforded through contacts CL—1, relay contacts RD—18 which are shunted by CC—43.

On step 6 in regular dividing (see Fig. 34), a circuit is completed (see Fig. 23b) to again energize relay coil 6CS. The circuit is completed from line 320, through relay contacts H—4, through CC—8 now closed through the "6" contact position of the upper left hand SB switch, through the shifted IYY—7 contacts, the shifted 2YY—8 contact, the non-shifted 3YY—9 contacts, the non-shifted 4YY—9 contacts and the non-shifted 5YY—9 contacts, through the non-shifted BT—9 contacts, through the shifted BS—10 contacts, the non-shifted BZ—89 and the non-shifted CD—10 contacts, the non-shifted CE—17 contacts, through the closed CL—3 contacts, through the 2DQ—14 contacts in the position shown, through 6CS and back to ground. A branch circuit is also completed from 6CS back through the closed DQ—15 contacts, through the CE—16 contacts, the CD—9 contacts, the BZ—88 contacts, all in the position shown, through the BS—9 contacts in shifted position, through the BT—8 contacts in the position shown, to a wire in cable 385, thence down through the DM—7 contacts now closed, through the BO—9 contacts in the position shown, through the BT—20 contacts in the position shown, through the shifted BS—22 contacts, through the now closed IDQ—13 contacts to relay coil 9Q. Relay DM (Fig. 21f) was energized upon closure of contacts CK—18.

Referring to Fig. 22d, closure of the CL—6 relay contacts renders the one-half comparing commutator effective upon the next comparing cycle. On such comparing cycle a comparison is made of the amount stored in the times five readout MLR—5 with the comparison portion of the dividend standing on RD.

The wiring relations intermediate the one-half AZ comparing magnets and the MLR—5 readout is such that there is in effect a comparison of 00110 with 00080. The result of this comparison made by the comparing units is to ascertain that 00080 is less than 00110. Accordingly, due to the commutator test there is no energization of the ½CU relay coil and dividing operations terminate without any augmentation effect. If, on the other hand, the amount of the remainder was greater than the amount compared from MLR—5, ½CU would have been energized and there would be the augmentation effect in the quotient. If ½CU had been energized, the ½CU—1 contacts (Fig. 23d) would have been shifted and there would have been an energization of the IX relay coil which would have brought an entry of the quotient digit of 1 in the proper quotient place in RD.

Termination of dividing operations is afforded since with ½CU not energized, a circuit is afforded through ½CU—1 contacts, Fig. 23d, in the position shown to energize the LL relay coil and with LL energized the H relay will be energized as previously explained. The H relay upon energization terminates dividing operations.

Figure 29:
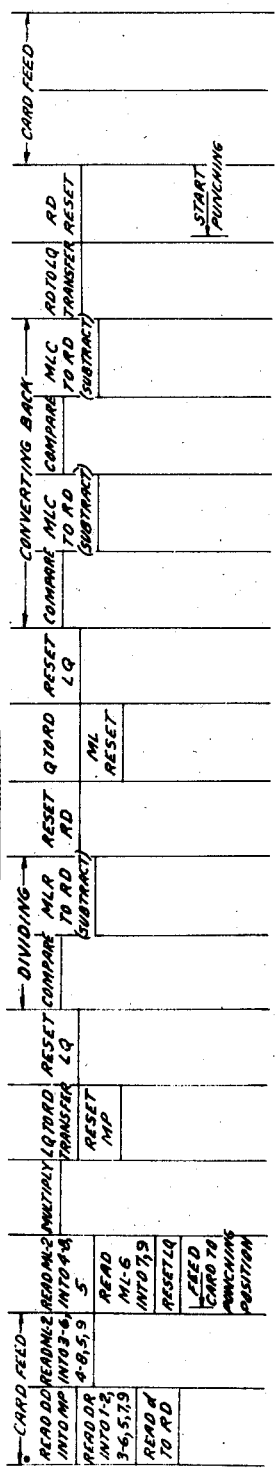

Referring to Fig. 29, the machine is now ready to reset the RD accumulator.

With relay coil H energized as mentioned above, a circuit will be completed through relay contacts H—3 (Fig. 23a), through the CL—7 contacts now in shifted position, to energize the 334RD reset relay coil. Electrical reset of this accumulator now occurs in the customary manner.

On the following machine cycle there is a transfer of the amount standing in LQ to the now reset RD accumulator and the various ML devices are reset to zero. The controls for the LQ to RD transfer comprise the following: Upon the RD reset cycle and upon closure of cam contacts CC—44 (Fig. 21f) a circuit is completed through the now closed RD—21 and CK—3 contacts to energize relay coil BL. A stick circuit is afforded for BL, through CC—47. With BL energized, relay contacts BL—2 (Fig. 23a) shift to reverse position and upon closure of cam contacts CC—27, relay coil BU becomes energized. This coil is maintained energized through stick contacts BU—12 and cam contacts CC—5.

Referring to Fig. 23a, with the BL relay energized as previously explained, a branch circuit is provided through the Dd—3 contacts, the now closed BL—3 contacts to energize the 334ML reset relay. Such relay becomes energized at the time relay coil BU is energized. With reset relay 334ML energized, electrical reset of all of the ML devices occurs in the customary manner. Contacts of the 334ML relay condition certain controls preparatory to reducing dividing operations. These controls have been briefly explained in the description of reducing dividing pertaining to multiplying operations.

During the cycle at the completion of regular dividing when the transfer from LQ to RD is effected, the 334ML relay is energized. Accordingly, with the ML—31 relay contacts closed, a circuit is provided from line 320, through the CZ—14 and ML—31 contacts now closed, through the IDQ—1 contacts closed, to energize the IDS relay (Fig. 23f). Shift of the IDS1—10 contacts (Fig. 23e) provide for the transfer from the LQR to RD in the proper columnar relation to account for the decimal place in the regular number divisor amount.

With relay coil BU energized contacts BU1—10 (Fig. 23f) close and add emitter 46 emits impulses through LQR which flow through the BU1—10 contacts, via lines 460 (Figs. 23f and 23e), through the cable 374 through certain IDS1—10 contacts now shifted to the proper 326RD accumulator magnets. In this way the amount standing in LQ is transferred over to RD.

Referring to Fig. 29, the machine has new reached a stage in which the LQ accumulator can be reset. With relay coil BU energized, relay contacts BU—11 (Fig. 22f) close and upon closure of CC—37, relay coil BE becomes eneregized. The stick circuit for BE is through BE—1 and CC—38. Referring to Fig. 23a, closure of relay contacts BE—2 upon closure of cam contacts CC—27 energize the 334LQ reset relay coil. With such relay energized, electrical reset of LQ occurs in the customary manner.

Figure 28:
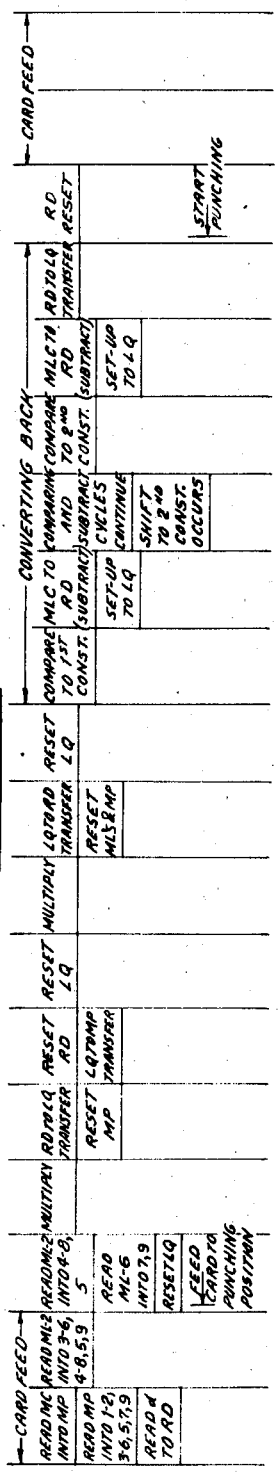

Referring to Figs. 29 and 28, the operations on dividing that follow LQ reset are the same as described for the reducing dividing operations upon the multiplying calculations previously described in detail.

It is sufficient to state that the reducing dividing phase follows, that the final result becomes set up in the LQ accumulator, and that recording of such final result is effected on the record card. Following this, operations pertaining to a new card are initiated. The only difference of the reducing dividing phase over that previously described is that upon the RD reset cycle (see Fig. 29), relay coil CL (Fig. 21f) becomes deenergized due to the opening of the RD—18 reset relay contacts.

*Conversion of compound denominate number to a regular number*

The next problem to be described will be one wherein it is desired to convert a compound denominate number to a regular number. In this type of calculation the compound denominate number amounts to be converted are disposed on a field of the record cards which are run through the machine. A set of reducing constant cards are placed in one of the pin box sections.

A further conversion ratio card is placed in another pin box section. This conversion ratio card is perforated with perforations which represent the ratio of the value of cents to a pence. At a determined rate of exchange for example, one pound equals $4.9525. 2.06¢ equals one pence approximately. Such amount of 2.06¢ would be perforated in the conversion ratio card placed in the pin box. The reducing constants in the other pin box are those for the first and second conversion factor for example, constants to reduce pounds to pence and shillings to pence.

Before tracing the operation in detail, on the circuit diagram, the general sequence of operations can be briefly expained. The compound denominate number is read from each card and entered into the compound denominate number receiving means, viz., into MP. The pence amount of the compound denominate number is also entered into RD and through it ultimately becomes received in LQ. Reducing multiplying operations follow, the reducing constants being derived from the pattern cards in the pin box and operations being controlled by these cards and under the control of the MP receiving device. Ultimately the converted result in pence becomes completely set up in LQ. Following this the amount in LQ is transferred into the MP accumulator, such accumulator having been previously reset. There then follows a regular multiplying phase wherein the amount in MP is multiplied by a conversion ratio amount, such conversion ratio number is derived from the conversion ratio card in the pin box and the digital multiples thereof are set up on the various ML receiving devices. The regular multiplying operation follows and ultimately the final result becomes set up in LQ. This in the calculation under consideration is a dollars and cents amount and LQ then controls result recording which is effected upon the record from which the compound denominate number amount is derived.

Figure 30:
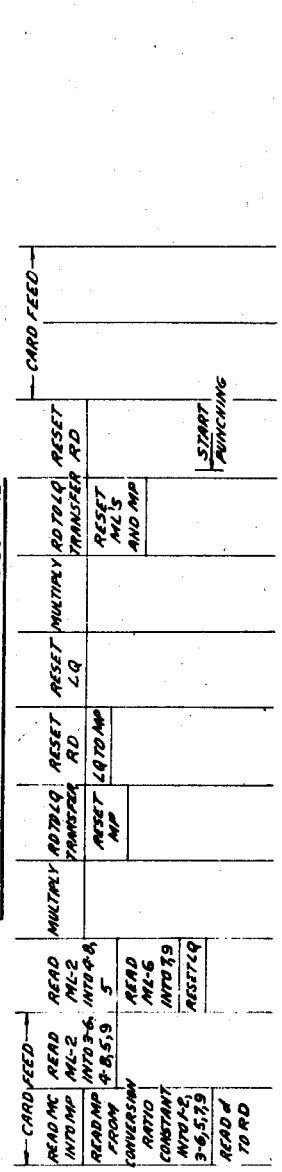

If reference be made to Fig. 30, it will be noted that the operations for this type of calculation are identical with those for a multiplying calculation of Fig. 28, which has been previously described up to and including the LQ reset cycle which occurs in the seventh machine cycle from the left in both sequence diagrams (Figs. 28 and 30). Description of such operations will not therefore be repeated in detail. There is, however, one change in the circuit relations which occurs when the computation of Fig. 30 is being carried out. It will be recalled that in connection with reducing multiplying phase that an energization of relay coil CA was effected to bring about an RD to LQ transfer following the fourth cycle from the left in Fig. 28 which is a multiplying cycle. Energization of CA is also required for the transfer from RD to LQ in the same cycle in Fig. 30, but the energizing circuit for CA is as follows: From line 320, through H—3 and KK—2 now closed, through Dd—2, shifted, to energize CA and back to ground. Contacts BF—7 are open at this time preventing energization of 334ML.

In order to condition the machine for performing the calculation of Fig. 30, certain conditioning controls must be set up.

Referring to Fig. 22f, a plug connection is made between sockets 411 and 412 to energize the relay coil Dd. Plug connections will also be made for properly controlling recording in the proper columns, such connections will be established between sockets 318 (Fig. 23f) and the proper 319 sockets (Fig. 21f). These plug connections, it may be stated, are placed in a somewhat different columnar relation than those employed on regular dividing and regular multiplying.

Referring to Fig. 23a, plug connections are provided between sockets 413, which connect to the pin box for the conversion ratio number to sockets 315ML (Fig. 22b). Such connection when made provides for the entry of the conversion ratio number from its source in the pattern card into the ML devices for subsequent build up of multiples therein.

The manner in which the conversion ratio number is transferred will be readily understood. With the G relay energized (Fig. 23a) the G—1 contacts will be closed and upon closure of cam contacts FC—6, current will be supplied to add emitter 42. Such add emitter will emit impulses through the conversion ratio number pattern card in the pin box and impulses will flow via plug connections, via plug 413, through the 315ML sockets (Fig. 22b), from these sockets they will flow to the various ML receiving devices in the manner previously explained for previous calculations wherein the amount to be introduced in ML was derived from a regular card.

Referring to Fig. 30, following the LQ reset, regular multiplying operations are initiated in the manner previously explained. However, in the present instant, such regular multiplying operations involve a multiplication based on the amount in MP and upon the amount in the ML devices. The amounts in the ML devices comprise all of the different digital multiples of the conversion ratio number which was derived from the conversion ratio pattern card. It will not be necessary to re-explain such multiplying operations because they merely derive a different number from a different original source (see Fig. 35). There is a change in machine control however, following the multiple entry cycle (see Fig. 30) as compared to Fig. 29. In Fig. 28, for regular multiplying the ninth cycle from the left is an LQ to RD transfer cycle. In Fig. 30, the ninth cycle is an RD to LQ transfer cycle, the transfer being in reverse direction. The control which alters this transfer relation and brings about an RD to LQ transfer will now be described.

At the completion of regular multiplying operations, that is, upon the completion of the entry of the selected multiples, relay coils H and KK will be energized in the manner previously explained. With such relays energized (see Fig. 23a) relay contacts H—3 and KK—2 will be closed. Accordingly, a circuit is provided through the now shifted Dd—2 relay contacts to energize relay coil CA. Another circuit is completed through BF—7, the now shifted Dd—3 contacts and the CZ—9 contacts to energize the 334ML reset relay coil. The energization of relay coil CA directs an RD to LQ transfer whereas previously on multiplication such relay CA was not energized and relay BU was energized which directed an LQ to RD transfer. Relay coil CA being energized, it remains energized by the circuit through stick contacts CA—11, the circuit going to line through CC—5. Referring to Fig. 22e, with relay coil CA energized, relay contacts CAI—10 close and afford impulse circuits from RDR, which ultimately extend to the 326LQ relay magnets. The impulses for transfer come from the add emitter 40, flowing through RDR, etc. This brings about a transfer of the amount standing in RD to LQ.

Referring again to the sequence diagram (Fig. 30) ML reset is brought about upon energization of 334ML, the energizing circuit having been previously traced. The energizing circuit for 334MP to reset the MP receiving device is the same as before, but a different circuit is provided for energizing the 334ML reset relay, such circuit extending through the shifted Dd—3 contacts.

Referring again to Fig. 30, and comparing it with Fig. 28, the cycle which follows the ML reset cycle in Fig. 30 is an RD reset cycle. In Fig. 28, LQ reset follows ML reset. To change the control when calculating according to the Fig. 30 problem and bring about RD reset the following circuits and relays are provided.

Referring to Fig. 22f, with relay coil CA energized, which is its status for this calculation, relay contacts CA—12 close, affording an energizing circuit for relay coil BA upon closure of cam contacts CC—37. The stick circuit for BA is through BA—1 and cam contacts CC—38. With relay coil BA energized, relay contacts BA—2, Fig. 23a, become closed and afford an energizing circuit for the 334RD reset relay. Accordingly, RD reset occurs on the following cycle, whereas previously with regular multiplication there was no energization of 334RD, but in lieu thereof there was an energization of LQ through the BE—2 contacts.

In Fig. 28, a reducing dividing phase follows in ensuing machine cycles. With the calculation of Fig. 30, such reducing dividing phase is to be suppressed. Accordingly, relay contacts Dd—1 (Fig. 21f) are in open position and no energizing circuit is provided for relay coil BH. Such relay coil BH on the previous calculation initiated reducing dividing operations.

Referring now to Fig. 23f, the relay contacts Dd—4 when in shifted position shifts the holding circuit control for the DP, 1MS, 2MS, 3MS relays from the status in which the BU—15 contacts control such holding circuit to a status in which the CA—15 contacts control the holding circuit. Accordingly, upon energization of relay coil CA in the manner previously explained the various DP, 1MS, 2MS and 3MS relays will be de-energized since their holding circuit is open.

As previously described for regular multiplication RD reset initiates punching operations and a re-initiation of calculations occurs for a following card as before described.

Conversion of a regular number to a compound denominate number

In this calculation the regular number is perforated on the cards which are run through the machine. In the pin boxes there after placed two sets of pattern cards, one set has a set of constants which are used in the reducing multiplying phase of the calculation. Such constants in effect provide a dummy multiplying operation by one. A conversion ratio number card is also placed in one of the pin box units. This conversion ratio card bears a number for converting a regular number amount to pence, for example, and for taking into account a current rate of exchange. With this problem also, other reducing constant cards are provided in the pin box units to reduce a calculated pence amount to pounds, shillings and pence.

In general, the calculating procedure for this calculation is closely akin to that used on regular dividing. On regular dividing the divisor amount which becomes set up in the ML devices according to different digital multiples was derived from the regular card. In the present case the divisor amount is the conversion ratio number and such conversion ratio number is derived from the conversion ratio number card in its pin box. Such amount is entered into the ML devices. Multiples thereof are built up and these multiples are utilized during the dividing calculation. As in the dividing calculation of Fig. 29, there is a reducing multiplying phase. The regular number is introduced into the MP receiving device. The reducing constants on the pattern card comprise one and all the 1 to 9 digital multiples thereof, viz., 1 to 9. Reducing multiplying operations ensue and the ultimate result becomes set up in the RD accumulator. This ultimate result is actually the same as the regular number derived from the record card. Following this reducing multiplying operation, dividing operations ensue under the control of the ML devices and the RD accumulator. The quotient amount becomes entered into LQ. Following this there is a transfer of the quotient amount from LQ to RD. Thereafter reducing dividing operations ensue, the reducing constants being derived from the other set of pattern cards. There is a setup of the final result in LQ and the ultimate recording of such result on the record card.

Referring now to Fig. 31 and comparing it with Fig. 29, there will be a difference of procedure noted in the first machine cycle to the left of each diagram. The conversion number amount is derived from the pattern card in the first mentioned diagram in the first machine cycle and entered into the proper ones of the ML devices instead of entering a divisor amount from the record card in such devices as in dividing (Fig. 29). Accordingly, to condition the machine for the Fig. 31 calculation certain controls and plug connections are established. In order to provide for the entry of the conversion number into the ML devices, plug connections are effected between the sockets 413 (Fig. 23a) and the 315ML sockets (Fig. 22b). Control plug connections are also changed as follows: A plug connection is made between sockets 414 and 415 (Fig. 22f) to energize relay coil dD. A plug connection is also established between 401 and 402 to energize the master dividing relay CZ. The operations pertaining to this calculation (Fig. 21b) are generally similar to those in dividing with the exceptions previously explained. However, the energization of relay coil dD shifts relay contacts dD—1 (Fig. 21f) to reverse position from that shown. Accordingly, when relay BH is energized, which relay controls reducing dividing operations, the contacts BH—2 close and the circuit is completed from grounded line through the BH—2 contacts now closed, through the now shifted dD—1 contacts in shifted position to energize a relay coil BK. Energization of BK closes contacts BK—1—36 (Fig. 21d). The effect of the closure of these contacts provides for the readout of reducing constants from the supplemental cards in the pin box units diagrammatically shown on Fig. 21e to the 381 lines leading to the comparing magnets. Such supplemental pattern cards are utilized on the reducing dividing phase of the calculation. Shift of the contacts BK—37—44 provide for the readout of the reducing constants and multiples thereof from the supplemental set of pattern cards indicated diagrammatically on Fig. 21e, on dividing calculations wherein divisor amounts are to be subtracted. Shift of the contacts BK—45—47 (Fig. 21c) associate the BM, BQ and BR relay coils with the pattern cards in the pin box units diagrammatically indicated on Fig. 21e. The relays BM, BQ and BR (Fig. 21c) are utilized to test for the size of the reducing constants which are upon the pattern cards in the pin boxes indicated in Fig. 21e.

As stated before in handling the problem of Fig. 31, the general procedure is substantially identical with that of handling the problem of Fig. 29, i. e., dividing. In the reducing dividing phase with the problem of Fig. 29, the reducing constants were derived from the pattern cards shown in Fig. 21c. In handling the problem of Fig. 31, the contacts BJ—1—36 remain open since relay contacts dD—1 are in shifted position keeping relay coil BJ out of circuit. However, on this problem as explained before, relay contacts BK—1—36 close to connect the pattern cards of Fig. 21e to the lines 381.

Converting a compound denominate number in one system to a compound denominate number in another system In computing calculating operations wherein a compound denominate number in one system is to be converted into a compound denominate number in the other system, the regular cards are provided with one compound denominate number, for example, it may be expressed in Indian currency. A conversion ratio card is placed in the pin box of Fig. 23a. This conversion ratio card is perforated with perforations representing the conversion ratio of pice to pence at a given rate of exchange. That is to say, if an amount in pice is to be divided by 3.49, the result will be in pence. A further set of pattern cards are placed in the pin box units diagrammatically shown in Fig. 21c. Such conversion ratio constants are the constants for the Indian system of currency for converting annas to pice and rupees to pice. Another set of pattern cards containing reducing constants are placed in the pin box of Fig. 21e and such pattern cards contain the reducing constants pertaining to the British currency system for reducing shillings to pence and pounds to pence. With such pattern cards in the pin box the operation is identical with that of Fig. 31 so far as machine operations are concerned. In general the procedure is as follows: The machine is plugged up as described for the problem of Fig. 31. The compound denominate number amount, for example, the Indian currency amount, is read from the regular record card and the rupee and anna components are entered into MP. The pice component is entered into RD. The conversion ratio number is entered into the ML devices from the pattern card in the pin box of Fig. 23a. A reducing multiplying operation then ensues and ultimately the reduced pice amount stands in RD. Regular dividing operations then ensue. The dividing amounts of the divisor and multiples thereof being derived from the MLR devices which have been previously built up so that the various digital multiples of the conversion ratio number are available thereon. Upon such dividing operations the quotient is entered in the LQ accumulator and finally the RD accumulator is cleared and thereafter the quotient result amount which is still in pice is transferred over to RD. The reducing dividing phase then follows. In this phase the reducing constants are derived from the pattern cards and pin boxes of Fig. 21e. The quotient amount expressed in pounds, shillings and pence become set up in LQ and finally there is a recording of this pound, shilling and pence amount back on the original record card from which the Indian currency compound denominate number amount was derived.

*Alternate conversion of a compound denominate number in one system to a compound denominate number in another system utilizing multiplication*

In the foregoing description of Fig. 32 conversion from one system to another was effective by division processes. It is also possible to convert a compound denominate number from one system to another system by a multiplying procedure. In general the procedure is the same as explained for regular multiplication with the following changes. In regular multiplication both the compound denominate number and the regular number term were derived from the regular record card. With the other conversion problem the regular number term becomes a conversion ratio number and such conversion ratio number is upon a pattern card placed in the pin box of Fig. 23a. The conversion ratio number on the pattern card in such pin box is a number which can be used with multiplication to convert pence to pice, that is, if the compound denominate number on the regular card is expressed in pounds, shillings and pence the conversion ratio number would be a number by which the amount expressed in pence can be multiplied by to obtain an amount expressed in pice taking into account the current rate of exchange. The reducing constants on the pattern card in the pin box of Fig. 21c would be the same as used in the regular multiplying operation involving British currency amounts, that is there would be reducing constants for converting shillings to pence and for converting pounds to pence. In computing the conversion ratio number would be read from the pattern card and entered into the ML receiving devices and multiples of such conversion number built up. The British currency amount derived from the record card would be entered with the pounds and shillings in MP as in regular multiplication and the pence amount would be directed through RD to LQ. A reducing multiplying phase would follow wherein the pounds and shillings amounts were reduced to pence and entered into LQ. As in regular multiplication the amount of pence in LQ would ultimately be transferred to the MP device after this had been cleared. A regular multiplying phase would then follow wherein the pence amount in LQ was multiplied by the conversion ratio number. As a result of this operation an intermediate result would be set up in RD comprising the result of the computation expressed in pice. There would then follow a reducing dividing phase just as in regular multiplication except that the reducing constants would be derived from cards in the pin box of Fig. 21e which cards would have thereon the reducing constants to convert pice to annas and rupees, etc. The final result in annas, rupees and pice would be set up in LQ and there would be final recording.

A special plugging required for this type of calculation is as follows: Referring to Fig. 22f, a plug connection will be established between 414 and 415 to energize relay coil dD. With this plugging reducing dividing is brought about with the derivation of the reducing constants from the pattern cards in the pin box of Fig. 21e.

*Conversion (4a) regular number to compound denominate number by multiplying*

The conversion of a regular number to a compound denominate number may also be effected by utilizing a regular multiplying phase in lieu of a regular dividing phase. The machine functions as described previously for this conversion with the following modifications. A plug connection is made between sockets 414 and 415 to energize relay coil dD. The plug connection between sockets 401 and 402 is omitted, thereby de-energizing coil CZ and causing the machine to go through a regular multiplying operation. Following the so-called idle reducing multiplying phase wherein the regular number is multiplied by "1" the machine multiplies the proper conversion ratio constant by the regular number, thus obtaining a pence product when the £, sh. and d. system is used. The pence product is reduced by the proper constants as previously described for the reducing dividing phase. The £, sh. and d. result amount is then recorded back on the card.

*Conversion of a compound denominate number to a regular number by dividing*

A compound denominate number may be converted to a regular number by using a regular dividing phase in lieu of the regular multiplying phase as previously explained for this conversion. To effect such an operation the machine is plugged for dividing. The relay CZ is energized via a plug connection between sockets 401 and 402 and in addition the relay dD is energized via a plug connection between sockets 414 and 415. The constants for reducing the compound denominate number to its lowest unit value are provided in one set of pattern cards and a single set of constants ("1" and its multiples) are provided in the other set of pattern cards for reducing dividing. Such "1" multiples are provided in the columns for the first constant. The machine is also plugged so as to reduce the quotient from the regular dividing operation in a series of dividing steps with this first constant as previously shown in the section "problem with less than 3 units." This is effected as previously described by a plug connection between sockets 399 and 400 and accordingly the compound denominate number is entered from the card into MP. Using the conversion constants of the first set of pattern cards this amount is reduced to its lowest unit value.

There then follows a regular dividing phase wherein the lowest unit value is divided by the conversion ratio constant set up in the ML devices. The quotient from this result is the compound denominate number expressed in its equivalent decimal value. There then follows an idle reducing dividing phase in which the equivalent decimalized result value is set up in LQ. The usual recording from LQ back to the card then occurs.

General summary

The operations which the machine is adapted to perform may now be briefly summarized. In such summary reference will be made to Figs. 38 to 43 of the drawings.

Figure 38:
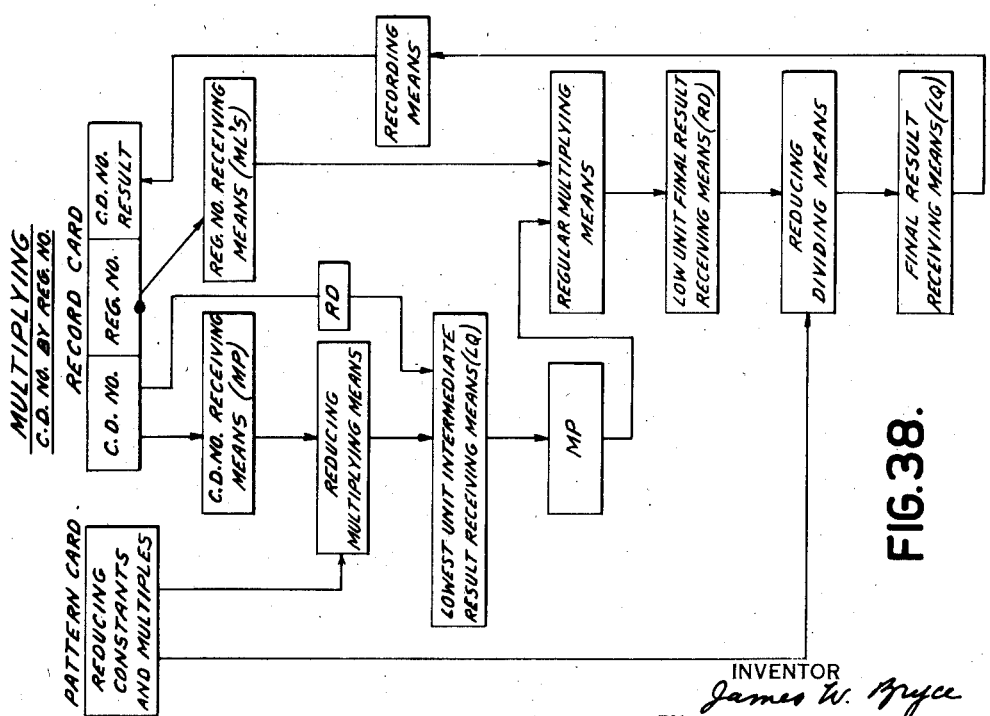

In multiplying a compound denominate number by a regular number the larger units of the compound denominate number are introduced from the card into MP (see Fig. 38). The pence unit is introduced into RD and through it into LQ. The regular number is introduced into the ML devices and multiples of such regular number are built up and representations thereof stored therein. A reducing multiplying phase ensues, the reducing constants and multiples thereof being derived from the pattern cards in the pin box and affording one control of the reducing multiplying means. The other control is afforded by MP. The result of this reducing multiplying operation is to set up the lowest unit intermediate result in LQ. After MP reset, the amount in LQ is introduced in MP. Following this, a regular multiplying phase ensues. The regular multiplying means is controlled by MP and by the ML receiving devices and their readouts. As a result of this regular multiplying operation the low unit final result becomes set up in RD. Following this a reducing dividing phase ensues, the reducing dividing means being controlled from the reducing constants on the pattern cards and from the RD accumulator. As a result of the reducing dividing operation the final result such as the result in pounds, shillings and pence becomes set up in LQ. Finally the result is recorded back on the original record, the recording means being controlled from LQ.

Figure 39:
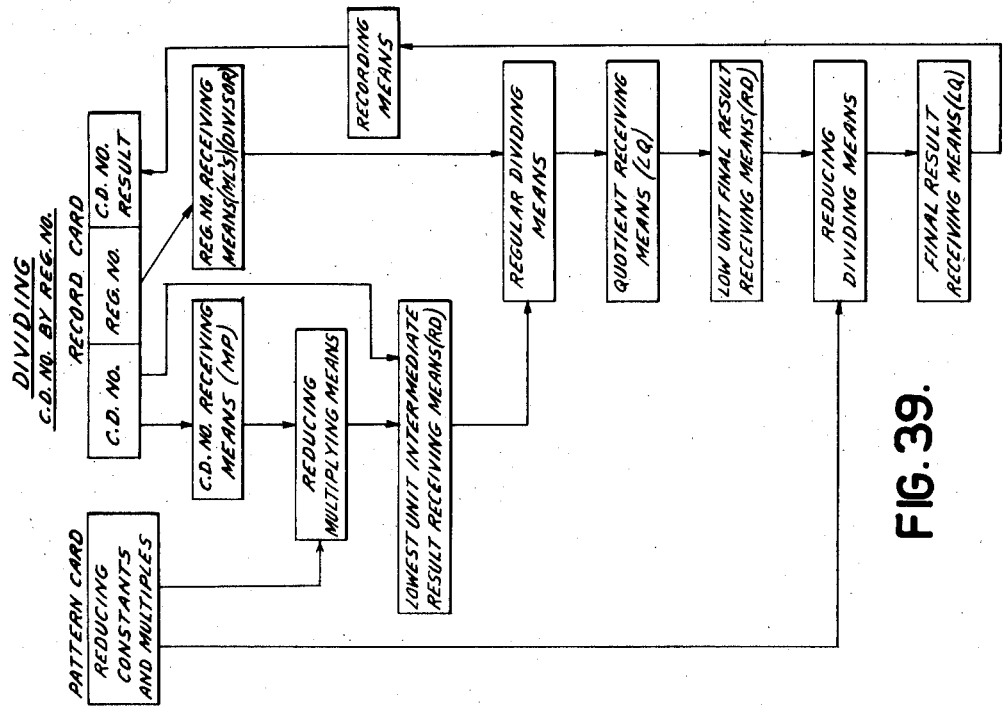

If a compound denominate number is to be divided by a regular number, the representations of reducing constants and multiples thereof are provided in the pattern cards which are sensed by the pin box (see Fig. 39). The compound denominate number larger units are entered into MP and the smallest unit directly into RD. The regular number is entered into the ML receiving devices and multiples thereof are built up and representations thereof stored therein. A reducing multiplying phase follows exactly as in the calculation previously described. Control of the reducing multiplying means is afforded by the pattern cards in the pin box and by the MP receiving device. The lowest unit intermediate result becomes set up in RD. Following this dividing operations ensue. The dividing means is controlled by the RD accumulator and by the ML receiving devices and their multiple representation storing readouts. As a result of dividing the quotient becomes set up in LQ. There follows a transfer cycle in which the amount in LQ is transferred into RD. A following reducing dividing operation ensues in which the low unit result in RD is reduced by dividing. For such dividing the constants are derived from the pattern cards in the pin box and the dividing means is also controlled by RD. As a result of such reducing dividing a final result, which is expressed as a compound denominate number is set up in LQ. Thereafter recording follows, the recording means being controlled from LQ with the result being punched back upon the record card.

Figures 40, 41:
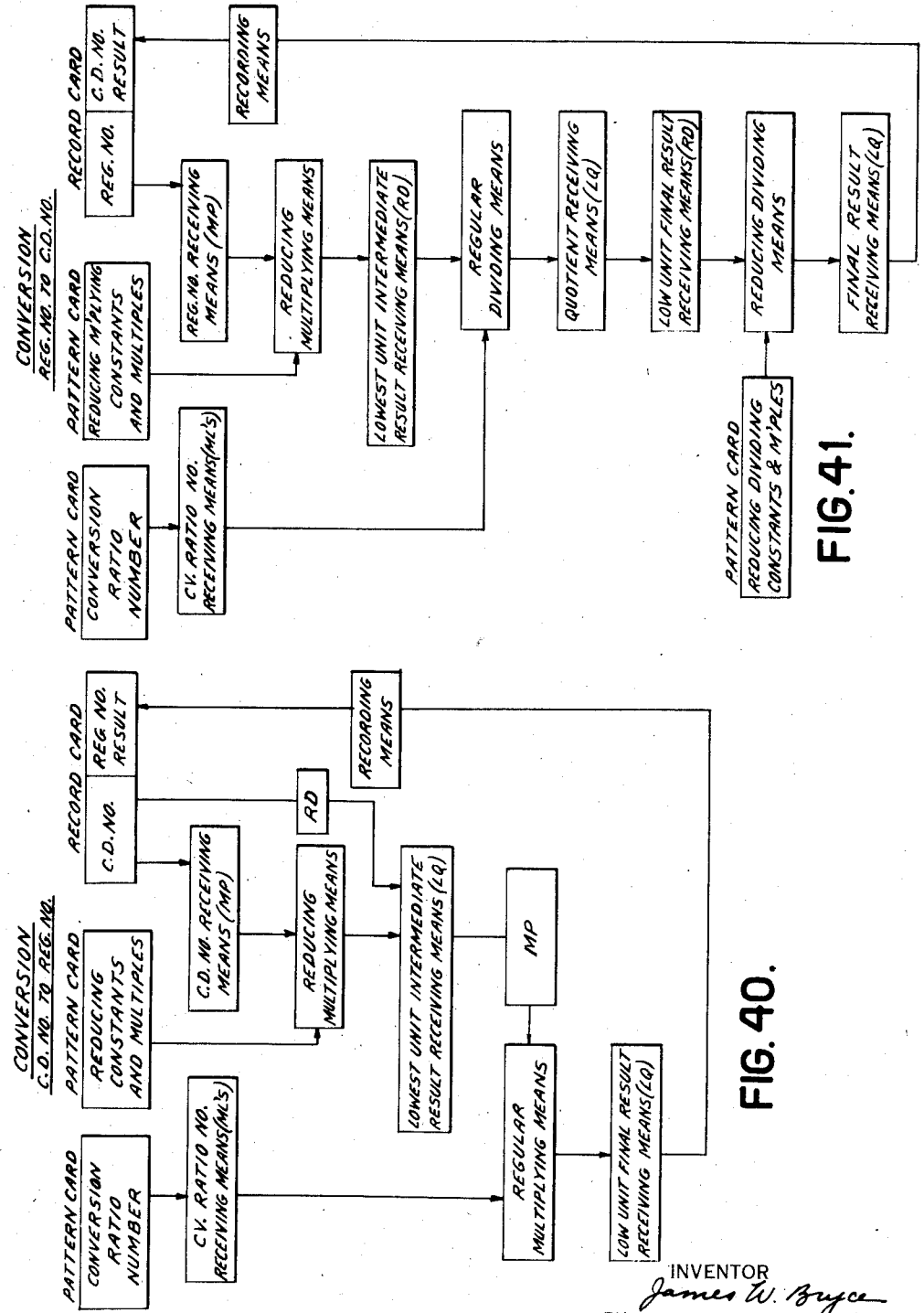

In converting a compound denominate number to a regular number a conversion ratio number is provided on a pattern card in one of the pin box units (see Fig. 40). Reducing constant multiples are provided on other pattern cards as before. The compound denominate number amount larger units are entered into MP as before. The smallest compound denominate unit is read from the card, entered into RD and through it entered into LQ. The reducing multiplying phase follows. The reducing multiplying means is controlled by the pattern cards provided with reducing constants and by the MP receiving means. The lowest unit result is entered into LQ. Following MP reset there is a transfer of the amount from LQ into MP. Thereafter a regular multiplying phase follows. In this case the control of the regular multiplying means is afforded from the ML devices which have received their original settings from the conversion ratio card in the pin box. As a result of the regular multiplying operation the final result is set up in LQ which is thereafter recorded back upon the card.

Referring now to the conversion of a regular number to a compound denominate number (see Fig. 41) the regular number is read from the card and entered into MP. A conversion ratio pattern card is provided in one pin box and reducing multiplying constants in the multiple pattern cards are provided in the other pin box units. The conversion ratio is received in the ML devices and multiples are built up and representations thereof stored. The reducing multiplying phase follows in which the regular number goes through an idle reducing cycle involving a times one operation. This ultimately sets the regular number result previously in MP in RD. Following this a regular dividing operation follows. The dividing means is controlled from RD and from the ML devices and their readouts. As a result of such operation a quotient result, which is the regular number converted into the lowest unit of the compound denominate number becomes set up in LQ. The LQ to RD transfer follows. Following this there is a reducing dividing phase wherein the reducing dividing mechanism is controlled by a second set of pattern cards with their reducing constants in one of the pin boxes and by the RD accumulator. The final result expressed as a compound denominate number becomes set up in LQ. Following this, recording occurs under control of LQ with the perforating of the result back on the original record.

Referring now to Fig. 42, when it is desired to convert a compound denominate number in one system into a compound denominate number in another system by dividing the procedure is as follows: The compound denominate number in one system is read from the regular record card, its larger units being introduced into MP and its smaller unit being directed into RD. The conversion ratio number is available on the pattern card in one of the pin boxes and such conversion ratio number is entered into ML, etc., and multiples thereof are built up. A reducing multiplying phase follows in which the control of the reducing multiplying means is from the pattern cards affording the reducing constants and also under the control of MP. The result of such reducing multiplying operation is set up in RD. Following this a regular dividing phase ensues. The dividing means is controlled from the ML devices and also from RD. The quotient result is set up in LQ and subsequently transferred to RD. Following this operation there is a reducing dividing phase wherein the reducing dividing means is controlled by another set of pattern cards in one of the pin boxes and by RD. The final result is set up in LQ and recording follows under the control of LQ to record back on the record card the compound denominate number amount in the other system.

Referring now to Fig. 43 wherein conversion from a compound denominate number amounts in one system is to be effected to a compound denominate number amount in a different system by multiplying, the general procedure is as follows: The larger units of the compound denominate number are derived from the record card and entered into MP. The smallest unit is entered into RD and through it into LQ. The conversion ratio number is available on a pattern card in the pin box and representations of such conversion ratio number and multiples thereof become stored upon the ML devices and readouts. The reducing multiplying phase follows wherein the control of the reducing multiplying means is afforded from the reducing multiplying constants pattern cards and multiple cards in one of the pin box units with further control from MP. The result of the reducing multiplying operation is set up in LQ and after MP reset the result is transferred from LQ to MP. A regular multiplying phase ensues, the multiplying means being controlled from the ML devices and from MP with the ultimate setting up of the result in RD. Following this operation a reducing dividing phase ensues wherein the reducing dividing constants are derived from a second set of pattern cards in the pin box and wherein another control for the reducing dividing means is afforded from RD. The ultimate quotient result is set in LQ and such LQ device controls the final result recording.

When a regular number is to be converted to a compound denominate number by multiplying, the general sequence of procedure is like that described for Fig. 41, except the regular dividing means is replaced by a regular multiplying means and the quotient receiving means LQ is replaced by a result receiving means RD. The lowest unit intermediate result receiving means RD of Fig. 41 becomes LQ also. In this calculation the regular number is read from the regular record card and introduced into MP. Representations of reducing constants and digital multiples thereof are provided on one set of pattern cards and representations of the conversion ratio number is provided on another pattern card. Reducing multiplying operations ensue, the control of the reducing multiplying means being afforded from the MP receiving device and from the pattern cards provided with reducing multiplying constants and multiples thereof. The result of the reducing multiplying operation becomes available in LQ. There is also a derivation of the conversion ratio from its pattern card and a building and storing of representations of such conversion ratio number and the various digital multiples thereof in the ML receiving devices. A regular multiplying phase ensues, control of the regular multiplying means being afforded from the various ML readouts and from MP. The result of regular multiplying becomes set in RD and following this there is a reducing dividing phase. The reducing dividing means is controlled by a second set of reducing dividing constants and multiples afforded by a second set of pattern cards and also with a further control of the reducing dividing means from RD. The final result becomes set in LQ, which result is recorded back on the regular card.

When a compound denominate number is to be converted to a regular number by dividing, the compound denominate number is read from the regular record card and entered into MP. Pattern cards are provided for the conversion ratio number and for reducing constants and multiples thereof. There is also provided a second set of pattern cards for reducing dividing constants and multiples thereof. After the compound denominate number is received from the regular record a reducing multiplying phase ensues. The reducing multiplying means is controlled by MP and by the pattern cards affording representations of reducing constants and multiples thereof. The result of this reducing multiplying phase becomes set in RD, thereafter a regular dividing phase ensues, the dividing means being controlled from the ML devices and their readouts and from RD. It will be understood that the conversion ratio is previously read from the conversion ratio pattern card and multiples thereof built up with representations stored in the ML devices. The result of the regular dividing operation becomes set in LQ and there is a subsequent transfer of this result to RD. A reducing dividing phase ensues wherein the reducing dividing means is controlled by RD and by the pattern cards affording reducing constants and multiples thereof. The final result becomes set in LQ and the ultimate converted regular number result is recorded back on the record card.

What I claim is:

1. A calculating machine with division mechanism, including the dividend receiving means, means to enter the dividend therein, source means for representations of the different digital multiples of the divisor, and comparing means between said source means and the dividend receiving means for comparing a selected comparison portion of the dividend with said digital multiples and including in combination therewith, sensing means to sense the position of the highest significant digit in the dividend receiving means, sensing means to also sense the highest significant represented digit on the source means, and column shift means controlled by both of the last mentioned sensing means for selecting the comparison portion by variably columnarily relating the source means through the comparing means with the dividend receiving means.

2. A calculating machine having a rounding off mechanism for a quotient receiving device of a dividing mechanism, said dividing mechanism having a dividend receiving device and source means for representations of all digital multiples of the divisor and including in combination control means for said rounding off mechanism, comparing means cooperating with the dividend receiving device of the dividing mechanism and with the source means which represents a times 5 divisor multiple for ascertaining whether the remainder amount in the dividend receiving device is equal to or greater than or less than the divisor multiple, and means controlled by said comparing means upon ascertaining an equal to or greater than condition to influence the control means to cause the rounding off operation, said means controlled by the comparing means upon the comparing means ascertaining a less than condition influencing the control means to suppress a rounding off operation.

3. A machine for effecting a reducing multiplying calculation to reduce a compound denominate number to lowest unit amount, an intermediate regular dividing calculation involving the reduced lowest unit amount as the dividend and a regular number as a divisor to obtain a calculated lowest unit quotient result, and a reducing dividing calculation to reduce the calculated lowest unit quotient result to a compound denominate number, said machine comprising multiplying calculating means including factor manifesting means for one factor and elements controlled thereby for coacting with another factor source to determine product entries and also including product entry receiving means, means to set the factor manifesting means according to a compound denominate number, preset source means for reducing constants cooperable, as said factor source, with the said factor manifesting means to enable the multiplying mechanism to effect the reducing multiplying calculation involving the compound number according to which the manifesting means is set and involving reducing constants derived from the preset source means so as to obtain a lowest unit reduced result amount and to enter such amount in the product receiving means, dividend manifesting means for receiving said lowest unit reduced result amount under control of the product entry receiving means, dividing calculating mechanism including said dividend manifesting means for coacting with a divisor factor source to determine quotient amounts, regular number source means cooperable as a divisor factor source with the dividend manifesting means of the dividing calculating mechanism to effect the intermediate regular dividing calculation involving the regular number and the reduced lowest unit result amount to obtain a calculated lowest unit quotient result, means for re-transmitting the calculated lowest unit quotient result to the dividend manifesting means of the dividing calculating mechanism, control means for effecting the cooperation of the preset source means with the factor manifesting means of the multiplying means for the reducing multiplication and the cooperation of the regular number source means with the dividend manifesting means of the dividing calculating means for the intermediate calculation in automatic succession, means to manifest completion of the intermediate calculation, and means controlled thereby for cooperatively relating the preset source means as a divisor factor source with the dividend manifesting means, now set with the calculated lowest unit result, to enable the dividing mechanism to effect reducing dividing operation for reducing the calculated lowest unit result according to constants from the preset source means to a compound denominate number.

4. A calculating machine comprising preset source means for reducing constants, entry receiving means, means for entering a compound denominate number therein, product entry forming and transmitting means coacting with the preset source means and with the receiving means for effecting a reducing multiplying operation to reduce the compound denominate number to a lowest unit reduced amount and entering said amount in the receiving means, regular number source means, dividing mechanism including quotient determining and transmitting means controlled by the receiving means according to the reduced lowest unit amount therein and by the regular number source means according to a regular number therein for effecting a regular dividing operation to form a calculated lowest unit quotient result which comprises the quotient obtained by dividing the lowest unit reduced amount by the regular number, means for entering the calculated quotient result in the receiving means, means for operating the dividing mechanism under control of the preset source means according to the reducing constants and under control of the receiving means according to the calculated quotient result therein for effecting a reducing dividing operation to reduce this quotient result to compound denominate number terms, and controls effective automatically for causing reducing multiplying, regular dividing and reducing dividing operations to be effected automatically in succession.

5. A calculating machine comprising preset source means for a plurality of reducing constants and their digital multiples, entry receiving and accumulating means, means to enter a compound denominate number therein, means to carry out a reducing multiplying calculation including product entry transmitting and routing means coacting with the preset source means and controlled by the receiving means first according to one higher term of the compound denominate number for transmitting and routing to the receiving means selected multiples of one of the reducing constants and thereafter according to another higher term of the compound denominate number for transmitting and routing to the receiving means selected multiples of another of the reducing constants, with the receiving means accumulating such entries to form a lowest unit reduced amount equivalent of the compound denominate number, regular number source means, product entry forming and transmitting means coacting with the regular number source means and controlled by the receiving means according to the lowest unit reduced amount entered therein for effecting a regular multiplying operation to form a calculated low unit result comprising the product of the regular number and reduced lowest unit amount and means for entering the calculated low unit result in the receiving means, means for determining quotient digits by comparison of multiples of reducing constants serving as divisors and taken from the preset source means with a comparison portion of the intermediate calculated lowest unit result in the receiving means serving as a dividend and means for controlling said determining means so that the intermediate calculated lowest unit result amount and an obtained remainder are respectively successively compared with different reducing constant divisors whereby reducing dividing operations are effected to obtain the final result on the receiving and accumulating means in compound denominate number form, and control means for automatically causing the reducing multiplying, intermediate calculation, and reducing dividing operations to be effected automatically in succession.

6. In a calculating machine having reducing multiplying mechanism for reducing a number by related reducing constants and means for controlling said mechanism, including in combination, manifesting means for a compound denominate number amount, means to set it, source means for representations of a plurality of different reducing constants and for all of the different digital multiples thereof, accumulating means, means to transmit and route entries determined as to amount by said source means to said accumulating means, and means automatically acting for connecting the transmitting and routing means first to the source means for one reducing constant and for the proper digital multiples thereof according to the term of one notation of the compound denominate number and for thereafter connecting the transmitting and routing means to the source means for another reducing constant and for the proper digital multiples thereof according to the term of another notation of the compound denominate number and connecting means controlled by the manifesting means to selectively cause the transmitting and routing means to transmit from the source means only the multiple or multiples related to the manifested compound denominate number digit or digits to the accumulating means.

7. A calculating machine for converting an amount expressed in a uniform notation to an equivalent amount in a non-uniform notation, comprising an accumulator set according to the amount to be converted, preset source means for a plurality of reducing constants and for all of the different digital multiples thereof, a result receiving device, means for determining quotient digits and for controlling the setting up of said digits in said receiving device, said determining means including means to compare multiples taken from the preset source means with a comparison portion of a dividend in said accumulator and means for subtracting selected multiples for obtaining remainders, means to cause such comparison first for one reducing constant, until the remainder has been reduced to an amount less than said constant, and thereafter for a different reducing constant until the remainder has been reduced to an amount less than that constant.

8. A calculating machine having reducing mechanism for reducing a lowest unit amount to equivalent compound denominate number terms in a compound denominate number notation and including in combination, a dividend receiving device to receive the lowest unit amount, result receiving means, source means for representations of first and second reducing constants, dividing mechanism comprising said source means and means controlled by said lowest unit amount receiving device and by said source means according to first and second reducing constants for transmitting entries to the result receiving means so as to reduce the lowest unit amount to compound denominate number form, in the result receiving means, operation terminating controls for said dividing mechanism for terminating reducing operations pertaining to the first and second reducing constants, and means for controlling said last named controls to terminate dividing for each constant under control of the source means for each constant and according to the columnar magnitude of the amount in the low unit result receiving device whereby reducing dividing operations for each different constant are terminated with determined fixed columnar entry relations in the final result receiving device.

9. A machine for effecting a reducing multiplying calculation to reduce a compound denominate number to lowest unit amount, an intermediate multiplying calculation to obtain a calculated lowest unit result of which the reduced lowest unit amount and a regular number are factors, and a reducing dividing calculation to reduce the calculated result to a compound denominate number, said machine comprising multiplying calculating means including factor manifesting means for one factor, other factor-related value source means, product entry receiving means, and means controlled by coaction of the manifesting means and the value source means to read product entries into the said receiving means to form the product therein, means to set the manifesting means according to a compound denominate number, said value source means comprising preset source means for reducing constants and cooperable with said manifesting means to cause said product entry reading in means to read product entries, determined as to amount by the compound denominate number and by the reducing constants, into the product entry receiving means, whereby the multiplying means performs the reducing multiplying calculation at the termination of which the reduced lowest unit amount is in the receiving means, means automatically effective upon termination of the reducing multiplying calculation to transfer the lowest unit amount from the receiving means to the said manifesting means, said value source means further comprising regular number source means, means automatically effective after transfer of the lowest unit amount to the manifesting means for bringing about cooperation of the regular number source means with the manifesting means to control the said product entry reading in means to read in product entries, determined as to amount by the regular number and by the reduced lowest unit amount, into the product entry receiving means, whereby the multiplying means performs the intermediate multiplying calculation at the end of which the calculated lowest unit result is in the receiving means, dividing calculating means including quotient determining means, said preset source means, and dividend manifesting means for coacting with the preset source means to control the quotient determining means, means for transmitting the calculated lowest unit result to said dividend manifesting means, means to automatically manifest completion of the intermediate calculation, and means controlled thereby for transmitting the calculated lowest unit result to the dividend manifesting means and thereafter cooperatively relating the preset source means with the dividend manifesting means to control the quotient determining means to determine quotients forming the compound denominate number reduced from the calculated result, whereby the dividing means effects the said reducing dividing calculation.

10. A machine for effecting a reducing multiplying calculation to reduce a compound denominate number to lowest unit amount, an intermediate calculation involving the reduced amount and a regular number to obtain a calculated lowest unit amount, and a reducing dividing calculation to reduce the latter amount to a compound denominate number, said machine comprising multiplying calculating means including factor manifesting means for one factor, other factor related value reflecting means, product entry receiving means, and product entry determining means controlled by coaction of the manifesting means with said value reflecting means to determine product entries and cause the receiving means to be set with the product of factors, means to set the factor manifesting means according to a compound denominate number, dividing calculating means including dividend manifesting means, divisor value reflecting means, and quotient entry determining means controlled by coaction of the dividend manifesting means and the divisor value reflecting means, the value reflecting means of each of the calculating means including preset source means for reducing constants and which in coaction with the factor manifesting means of the multiplying means causes the product entry determining means to determine product entries according to the reducing constants and the compound denominate number terms so that the product entry receiving means is set with the reduced lowest unit amount, whereby the reducing multiplying calculation is effected, the value reflecting means of one of said calculating means further including regular number value reflecting means cooperable with the manifesting means of the latter calculating means to cause the entry determining means thereof to operate in accordance with the reduced lowest unit amount and the regular number to form a calculated lowest unit result amount, whereby the intermediate calculation is effected, means for previously to the latter calculation setting the latter manifesting means with the reduced lowest unit amount under control of the product entry receiving means, means for transmitting the calculated lowest unit amount to the dividend manifesting means, control means to effect the cooperation of the preset source means with the factor manifesting means of the multiplying means for the reducing multiplication and the cooperation of the regular number value reflecting means with the manifesting means of said one calculating means for the intermediate calculation in automatic succession, means to manifest completion of the intermediate calculation, and means brought into operation thereby for cooperatively relating the preset source means with the dividend manifesting means, now set with the calculated lowest unit result, to cause the quotient entry determining means to provide quotient entries, determined as to amount by the reducing constants and the calculated lowest unit result, and forming the reduced compound denominate number corresponding to the calculated lowest unit amount, whereby the reducing dividing calculation is effected.

11. A machine for effecting a reducing multiplying calculation to reduce a compound denominate number to lowest unit amount, an intermediate calculation involving the reduced lowest amount and a regular number to obtain a calculated lowest unit result amount, and a reducing dividing calculation to reduce the calculated lowest unit result to a compound denominate number, said machine comprising multiplying calculating means including factor manifesting means for one factor, product entry effecting means and product entry receiving means to receive product entries determined in part by the aforesaid factor manifesting means, means to set the factor manifesting means according to a compound denominate number, said multiplying means also including preset source means for reducing constants cooperable with the said factor manifesting means to determine product values and cause the product entry effecting means to enter the product values in the product entry receiving means whereby reducing multiplying calculation is effected and the latter means is set with the reduced lowest unit amount, control means initially effecting coaction of the preset source means with the said factor manifesting means and initiating said reducing multiplying calculation, dividing calculating means including dividend manifesting means, said preset source means, quotient entry determining and entry effecting means which in coaction with the dividend manifesting means and the preset source means effects the reducing dividing calculation so as to reduce a calculated lowest unit result to compound denominate number terms, one said calculating means also including regular number source means cooperable, in place of the preset source means, with the manifesting means of the said one calculating means and with the entry effecting means thereof to effect the intermediate calculation whereby the calculated lowest unit result amount is obtained, means automatically effective upon termination of the reducing multiplying calculation, to set the latter manifesting means with the reduced lowest unit amount under control of the product entry receiving means and thereafter initiating the intermediate calculation, means for manifesting completion of the intermediate calculation, and means automatically brought into operation thereby for setting the dividend manifesting means with the calculated lowest unit result, obtained by the intermediate calculation cooperatively relating the preset source means with the other elements of the dividing means and initiating reducing dividing operations thereof to reduce the calculated lowest unit result to compound denominate number terms.

12. A calculating machine for converting a regular number in one value notation to compound denominate number terms of a compound denominate number notation and comprising calculating mechanism having in combination preset source means for a conversion ratio number, settable source devices settable to render available all the different digital multiples of the conversion ratio number, means controlled by the said preset source means according to the conversion ratio number for setting the settable source devices to render the digital multiples of the conversion ratio number available, entry and result receiving and manifesting means, means for entering a regular number in certain of the receiving means, calculating devices for performing converting calculating operation under control of the settable source devices and the entry receiving and manifesting means in which the regular number has been entered and including entry routing and transmitting means to enter a converted result amount of the regular number in certain of the receiving means, means for transferring the converted result amount to another of the receiving means to serve as a dividend therein, a second preset source means for reducing constants and digital multiples thereof, automatic means brought into operation in response to completion of converting calculating operations for initiating reducing dividing calculations of the calculating mechanism, said mechanism including comparing means for comparing the reducing constant multiples, derived from the second preset source means, with the converted result amount serving as a dividend in the receiving means to which said amount has been transferred, and quotient entering means controlled by the comparing means for entering a quotient determined by comparison operations into certain of the receiving means so as to form therein compound denominate number terms equivalent to the converted amount, whereby reducing calculations for reducing the converted amount to a compound denominate number are performed.

13. A calculating machine for converting a regular number in one value notation to compound denominate number terms of a compound denominate number notation and comprising calculating mechanism to perform multiplication and division, entry and result receiving means, preset source means for a conversion ratio number, settable source devices, means controlled by the preset source means according to the conversion ratio number for setting the settable source devices to render available the digital multiples of the conversion ratio number, means for setting the regular number in certain of the receiving means, means for causing the calculating mechanism to effect converting calculating operations to convert the regular number to a lowest unit amount in the compound denominate number notation, said calculating means including product entry transmitting means for transmitting multiples of the conversion ratio number to certain of the result receiving means to form therein the lowest unit amount and means controlled by the regular number receiving means for selecting the multiples so transmitted, means for transferring the lowest unit amount from the receiving means therefor to another of the receiving means, means to manifest completion of converting calculating operations, means thereupon brought into operation for initiating reducing dividing operations of the calculating mechanism, said calculating mechanism including therein the receiving means to which the converted lowest unit amount has been transferred and including also preset source means for reducing constants and their digital multiples, comparing means for comparing the reducing constant multiples with the lowest unit amount serving as a dividend, and quotient determining means controlled by the comparing means for entering a quotient determined by comparison operations of the comparing means into certain of the receiving means so as to set the latter according to terms of the compound denominate number equivalent to the converted lowest unit amount.

14. A calculating machine for converting a regular number in one value notation to a compound denominate number in another compound denominate number notation and comprising calculating mechanism for performing multiplication by accumulation of multiplicand multiples selected by multiplier digits and including preset source means for a conversion ratio number to serve as a multiplicand, settable source devices, means under control of the preset source means for setting the source devices to render concurrently available the digital multiples of the conversion ratio number, means set to manifest the digits of a regular number to serve as multiplier digits, result registering means, entry transmitting means for transmitting conversion ratio number multiples from the settable source devices to the registering means, means controlled by the regular number manifesting means according to the digits of such regular number to select the conversion ratio number multiples transmitted to the registering means whereby converting multiplying calculation is effected at the end of which the registering means is set according to a reduced lowest unit amount in the compound denominate number notation, said calculating mechanism also performing division and including a second preset source means for reducing constants and digital multiples thereof and further including comparing means to compare the digital multiples of the reducing constants with the lowest unit amount in the registering means and quotient and remainder determining means controlled by the comparing means to determine and manifest quotients and a remainder which make up the terms of the compound denominate number equivalent to the lowest unit amount, whereby reducing dividing calculation is effected and control means for causing the calculating mechanism to perform the multiplying and dividing calculations in automatic succession.

15. A machine according to claim 14, wherein the source means for the conversion ratio number and the reducing dividing constants comprise pattern cards which are retained in pin box units, said pin box units including means to sense data upon the pattern cards for controlling readouts therefrom.

16. A calculating machine for converting an amount expressed in a uniform notation to an equivalent amount in a non-uniform notation, comprising means registering an amount to be converted, source means for a plurality of reducing constants and the different digital multiples thereof, a result receiving device, means for determining quotient digits and for controlling the setting up of said digits in said receiving device, said determining means including means to compare multiples taken from the source means with a comparison portion of a dividend in said registering means and means for subtracting selected multiples for obtaining remainders, means to cause such comparison first for one reducing constant, until the remainder has been reduced to an amount less than said constant, and thereafter for a different reducing constant until the remainder has then been reduced to an amount less than that constant.

17. A calculating machine to reduce a given compound denominate number to a uniform amount, effect an intermediate calculation involving the reduced amount and a regular number to obtain a calculated uniform amount, and to reduce the calculated amount to a compound denominate number result, comprising source means for a plurality of reducing constants and their digital multiples, entry receiving and accumulating means, means to enter a compound denominate number therein, means to carry out a reducing multiplying calculation including product entry transmitting and routing means coacting with the source means and controlled by the receiving means first according to one higer term of the compound denominate number for transmitting and routing to the receiving means selected multiples of one of the reducing constants and thereafter according to another higher term of the compound denominate number for transmitting and routing to the receiving means selected multiples of another of the reducing constants, with the receiving means accumulating such entries to form a reduced uniform amount equivalent to the compound denominate number, control means effective upon completion of reducing multiplying calculation to cause the intermediate calculation to take place and set up the calculated uniform amount in the receiving and accumulating means, means for determining quotient digits including means to effect comparison of multiples taken from the source means with a comparison portion of the calculated uniform amount in the receiving means serving as a dividend and means for subtracting selected multiples for obtaining remainders, means to cause such comparison first for one reducing constant until the remainder has been reduced to an amount less than said constant, and thereafter for a different reducing constant until the remainder has been reduced to an amount less than that constant whereby reducing dividing operations are effected to obtain the final result in the receiving and accumulating means in compound denominate number form, and control means for causing the reducing dividing calculation to follow automatically after the intermediate calculation, said source means affording two separate sets of reducing constants and their multiples, one set being utilized for reducing multiplying operations and a separate set being utilized for the reducing dividing operations, whereby the final result is manifested in a different compound denominate number notation than the compound denominate number notation in which the first mentioned compound denominate number is manifested.

18. In a calculating machine, reducing multiplying mechanism for reducing a compound denominate number, by reducing constants related to the higher terms of the compound denominate number, to a lowest unit amount and comprising in combination, manifesting means having one part settable with one higher term and another part settable with another higher term of the compound denominate number, source means for digital multiples of the different constants related to the different higher terms, accumulating means, means to transmit and route entries of multiples from the source means and selected by the manifesting means to the accumulating means, means for connecting the transmitting and routing means first to the source means for multiples of one reducing constant and thereafter to the source means for multiples of another reducing constant, column shift means for placing the selection of multiples under control of first one part and then another part of the manifesting means according to the digits of the higher terms in said parts of the manifesting means, and means automatically controlled by the column shift means concomitantly with shifting selection of multiples from one part to another part of the manifesting means for causing the connecting means also to shift connection of the routing and transmitting means from the source means for multiples of the constant related to the higher term in said one part of the manifesting means to the source means for multiples of the constant related to the higher term in said another part of the manifesting means.

19. A calculating machine having multiplying means for effecting reducing multiplication to reduce a compound denominate number to a lowest unit amount and thereafter to effect regular multiplication to multiply the reduced amount by a regular number and including in combination, number receiving means, settable source means, means controlled by the regular number receiving means for building up and rendering available upon the settable source means the digital multiples of the regular number, preset source means for reducing constant digital multiples, multiplier receiving means, result receiving means, product entry transmitting and routing means for entering products into the result receiving means and including one section connected to the settable source means and another section connected to the preset source means, each section including multiples selecting means controlled by the multiplier receiving means, means for entering a compound denominate number in the multiplier receiving means, means initially rendering the section of the entry transmitting and routing means connected to the settable source means ineffective while rendering the section connected to the preset source means effective to transmit and route reducing constant multiples, selected by the multiplier receiving means according to the digits of the compound denominate number entered therein, to the result receiving means to form therein the reduced lowest unit amount, means to automatically manifest completion of the reducing multiplication calculation, and means automatically brought into operation thereby for transferring the reduced amount from the result receiving means to the multiplier receiving means, and means also controlled thereby for rendering the section connected to the preset source means ineffective while rendering only the section of the transmitting and routing means connected to the settable source means effective to transmit and route regular number multiples, selected by the multiplier receiving means according to digits of the reduced amount, to the result receiving means, whereby the result of regular multiplication calculation is formed in the result receiving means.

20. A calculating machine in which a given compound denominate number is reduced to a lowest unit amount, an intermediate calculation performed involving the lowest unit amount and a regular number to obtain a calculated lowest unit result, and a reducing dividing calculation then effected to reduce the calculated lowest unit result to compound denominate number form; said machine comprising in combination, entry and result receiving and accumulating means, multiplier receiving means settable with the given compound denominate number, multiplying mechanism including product entry transmitting and routing means to transmit and route product entries to the accumulating means, dividing mechanism including means for determining quotients and remainders and for controlling the setting up of the quotients and a final remainder in the result receiving means, preset source means for a plurality of different reducing constants, said preset source means being alternatively cooperable with the product entry transmitting and routing means to serve as an element of the multiplying mechanism or with the quotient and remainder determining means to serve as an element of the dividing mechanism, control means for initially causing the preset source means to serve as an element of the multiplying mechanism and for initiating reducing multiplying operations of the latter, said product entry transmitting and routing means being controlled, during the reducing multiplying operations, jointly by the preset source means, according to the reducing constants, and by the multiplier receiving means, according to the given compound denominate number, to transmit and route product entries to the accumulating means, whereby the accumulating means by accumulation of the product entries is set with the reduced lowest unit amount, control means automatically effective upon completion of the reducing multiplying operations to cause the intermediate calculation to occur and form the calculated lowest unit result in the entry receiving means to serve as a dividend, means acting automatically upon completion of the intermediate calculation for automatically shifting said preset source means into the dividing mechanism to serve as an element thereof and for initiating reducing dividing calculations of the dividing mechanism, said quotient and remainder determining means being jointly controlled, during the reducing dividing calculation, by the preset source means according to the reducing constants and the dividend receiving means according to the calculated lowest unit result to determine quotients and remainders and means in the dividing mechanism for causing such determination first according to one reducing constant until the obtained remainder is less than this constant and thereafter according to another reducing constant until the final remainder is less than the latter constant, whereby the terms of the compound denominate number, equivalent to the calculated lowest unit result, are derived in succession.

JAMES W. BRYCE.